(12) United States Patent
Joseph

(10) Patent No.: US 6,293,778 B1
(45) Date of Patent: *Sep. 25, 2001

(54) AUTOMATICALLY BALANCING A BLOWER IN A BLOWN FILM EXTRUSION LINE

(76) Inventor: Daniel R. Joseph, 8416 Creekbluff Dr., Dallas, TX (US) 75249

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/800,665

(22) Filed: Feb. 14, 1997

(51) Int. Cl.⁷ .................................................. B29C 47/90
(52) U.S. Cl. ........................ 425/72.1; 425/140; 425/141; 425/326.1
(58) Field of Search ................................ 425/140, 141, 425/326.1, 72.1, 392

(56) References Cited

U.S. PATENT DOCUMENTS

| | | |
|---|---|---|
| 3,011,518 | 12/1961 | Day et al. . |
| 3,593,645 | 7/1971 | Day et al. . |
| 3,901,071 | 8/1975 | Hansen . |
| 3,955,425 | 5/1976 | Corneau . |
| 4,137,025 | 1/1979 | Graves et al. . |
| 4,152,380 | 5/1979 | Graves et al. . |
| 4,189,288 | 2/1980 | Halter .................................. 425/72.1 |
| 4,243,363 | 1/1981 | Mulcahy ............................... 425/140 |
| 4,246,212 | 1/1981 | Upmeier et al. ..................... 264/40.6 |
| 4,366,704 | 1/1983 | Sato et al. . |
| 4,377,540 | 3/1983 | Cluett et al. . |
| 4,402,656 | 9/1983 | Schott, Jr. ............................ 425/140 |
| 4,517,837 | 5/1985 | Oyama et al. . |
| 4,520,672 | 6/1985 | Saint-Amour . |
| 4,740,146 | 4/1988 | Angelbeck ............................. 425/71 |
| 5,048,327 | 9/1991 | Atwood . |
| 5,104,593 | * 4/1992 | Joseph ................................ 425/326.1 |
| 5,179,858 | 1/1993 | Atwood . |
| 5,352,393 | * 10/1994 | Joseph ................................ 425/326.1 |
| 5,525,277 | * 6/1996 | Joseph ................................ 425/326.1 |

OTHER PUBLICATIONS

SW–FLC–105 "Front Line Control System for Blown Film" (English translation of abstract only) (Undated).
Film Extrusion Manual, Chapter 12, Richard R. Knittel and Richard J. DeJonghe, Jr. "*Blown Film Cooling Systems*" pp. 261–293 (Undated).
Fan Engineering, Buffalo Forge Company, Chaps. 1 and 2, edited by Robert Jorgensen, "Properties of Air and Other Gases", Chapter 1, and "Fluid Flow", Chapter 2 (Undated).

(List continued on next page.)

*Primary Examiner*—Nam Nguyen
*Assistant Examiner*—Joseph Leyson
(74) *Attorney, Agent, or Firm*—Melvin A. Hunn

(57) ABSTRACT

The present invention is directed to an apparatus for startup of extruded film tubes. A controller member is utilized to provide control signals to a supply blower which supplies air to the extruded film tube in an amount corresponding to a supply control signal, and an exhaust blower which exhausts air from the extruded film tube in an amount corresponding to an exhaust control signal. The controller member executes program instructions which define at least one control routine for automatic and coordinated control of the supply blower and the exhaust blower during starting of the extruded film tube, by directing a series of supply control signals to the supply blower and exhaust control signals to the exhaust blower. When a valve is utilized to control the flow of air from the supply blower to the extruded film tube, the controller is also utilized to adjust the supply blower and the exhaust blower in order to optimize operation of the valve by placing the valve in a substantially linear operating range. Additionally, the controller member may be utilized to execute program instructions in order to implement a bubble break detection routine which utilizes software timers in combination with monitoring of a position signal in order to determine collapse or break of the extruded film tube.

43 Claims, 56 Drawing Sheets

OTHER PUBLICATIONS

Modern Plastics Mid–Oct. Encyclopedia Issue, pp. 262–266 (Undated).

Modern Plastics, Jun. 1989, p. 83.

The Uni–Flo "Micro 500" and Micro 1000 Microprocessor Controlled Internal Bubble Cooling System, Uni–Flo, Inc. (Undated).

Micro 500–1 System Schematic, Uni–Flo Design, Inc. (Undated).

Micro 1000 System Schematic, Uni–Flo Design, Inc. (Undated).

Model M–4000 Ultrasonic Measurement & Control System, Massa Products Corporation (Undated).

Model–4000 Ultrasonic Measurement & Control System Options, Massa Products Corporation (Undated).

Ultrasonic Measurement & Control System Model M–4000, Massa Products Corporation (1988).

Polaroid Ultrasonic Ranging System Handbook Application Notes/Technical Papers, Polaroid Corporation (Undated).

IBC system optimizes film quality, Modern Plastics, Jun. 1989, p. 134.

Addex: new name in blown film systems, Modern Plastics, May 1990, p. 28.

Sona–Tronix (Undated).

Blown Film, Non–contact IBC system has tighter layflat control, Plastics World, Feb. 1990.

Product Brochure, "The Unique Pneumavalve", Connor Corporation U.S.A., 1991.

* cited by examiner

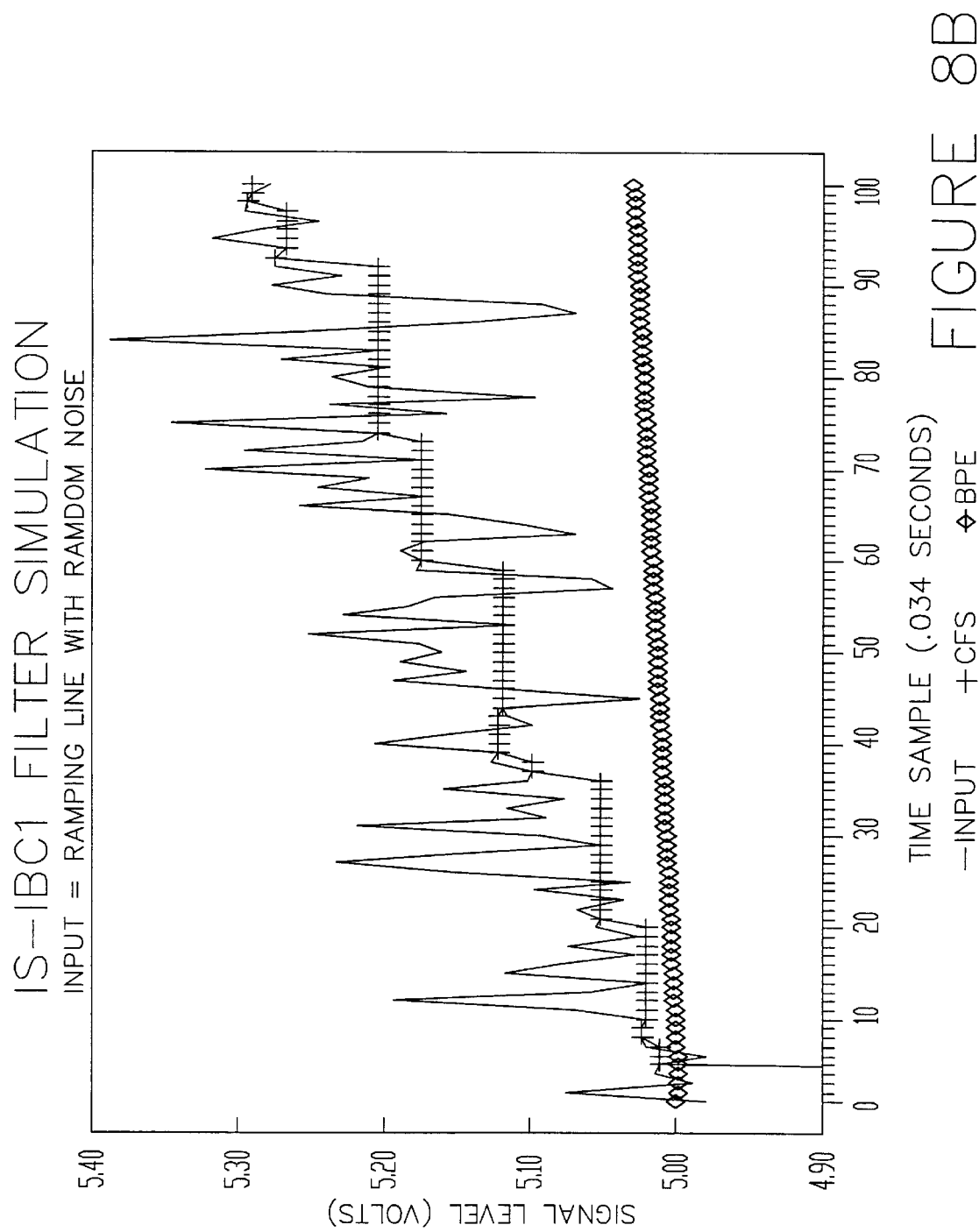

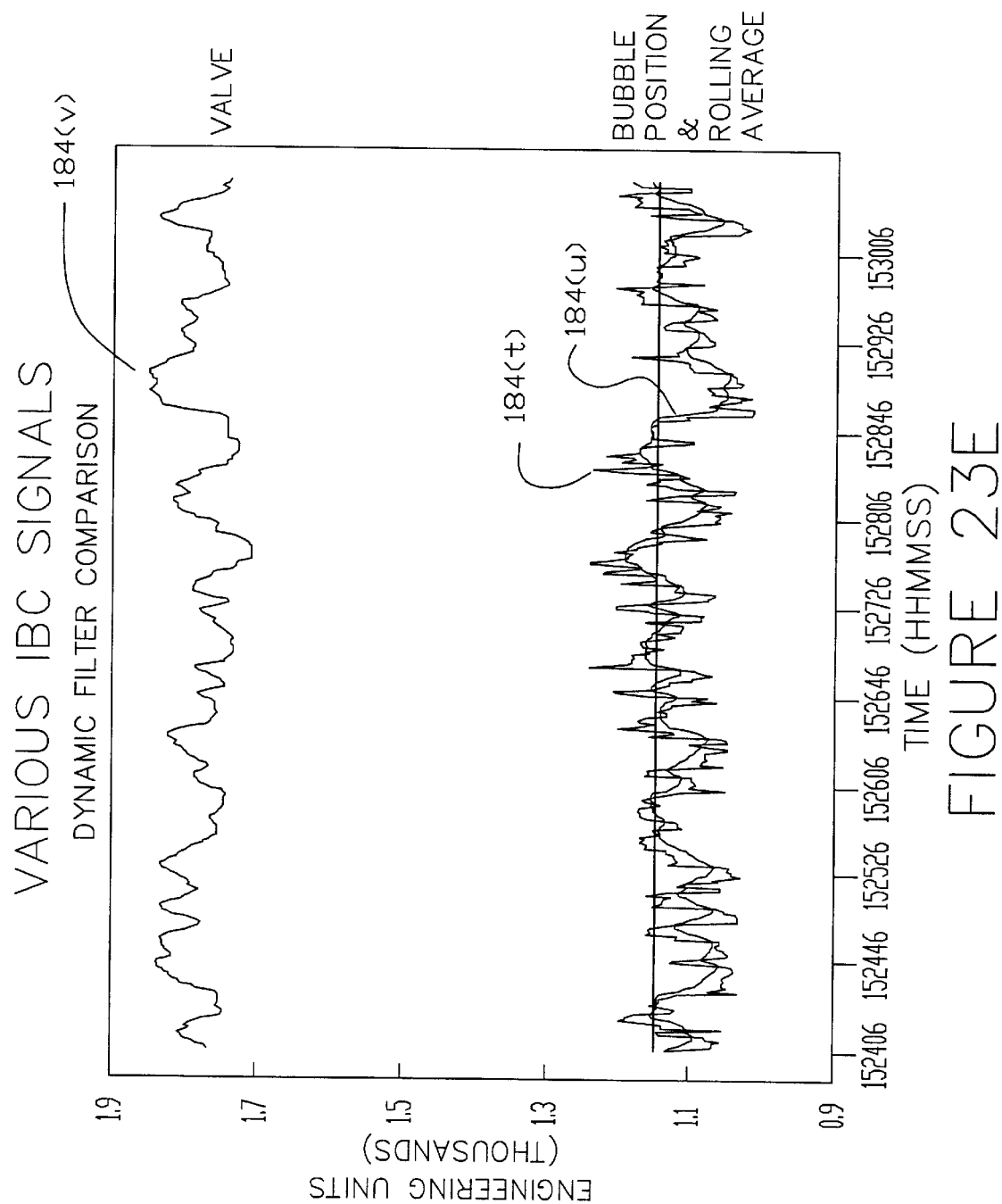

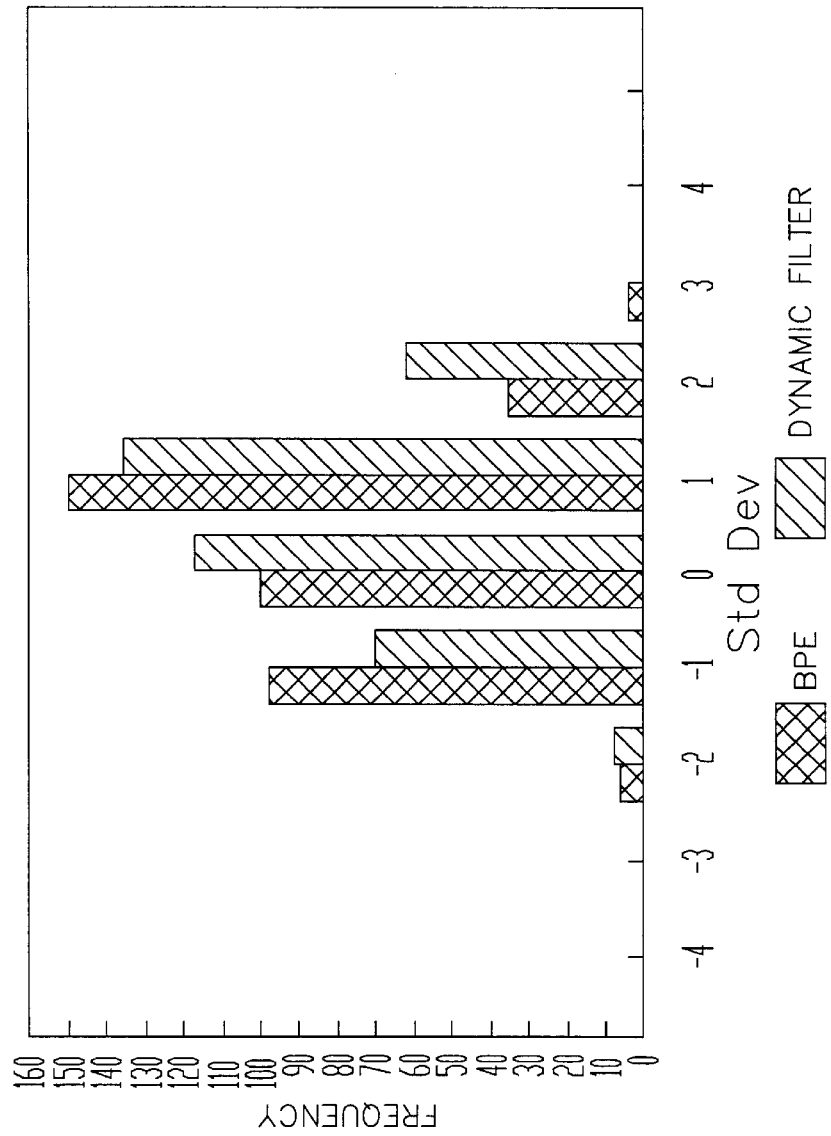

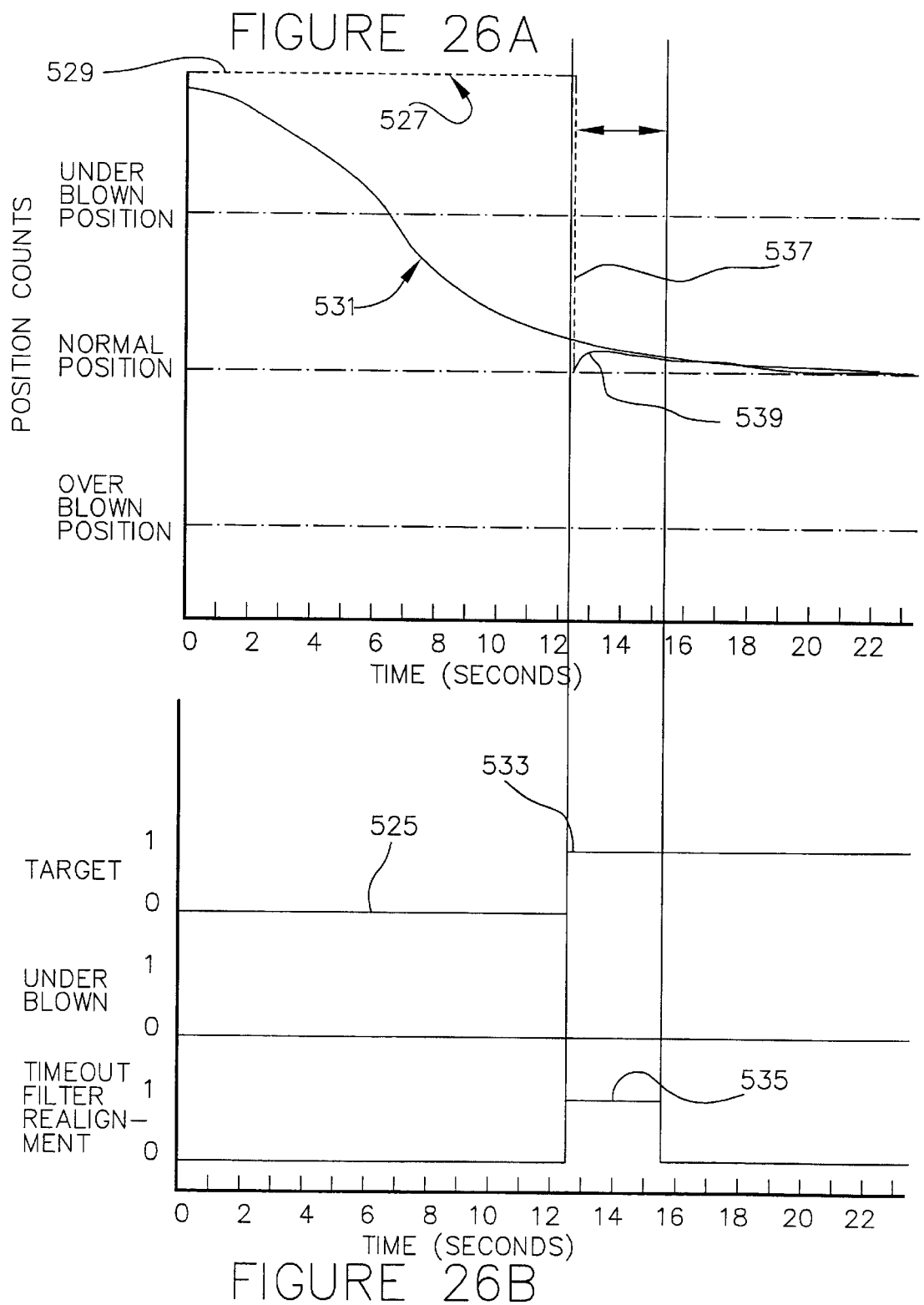

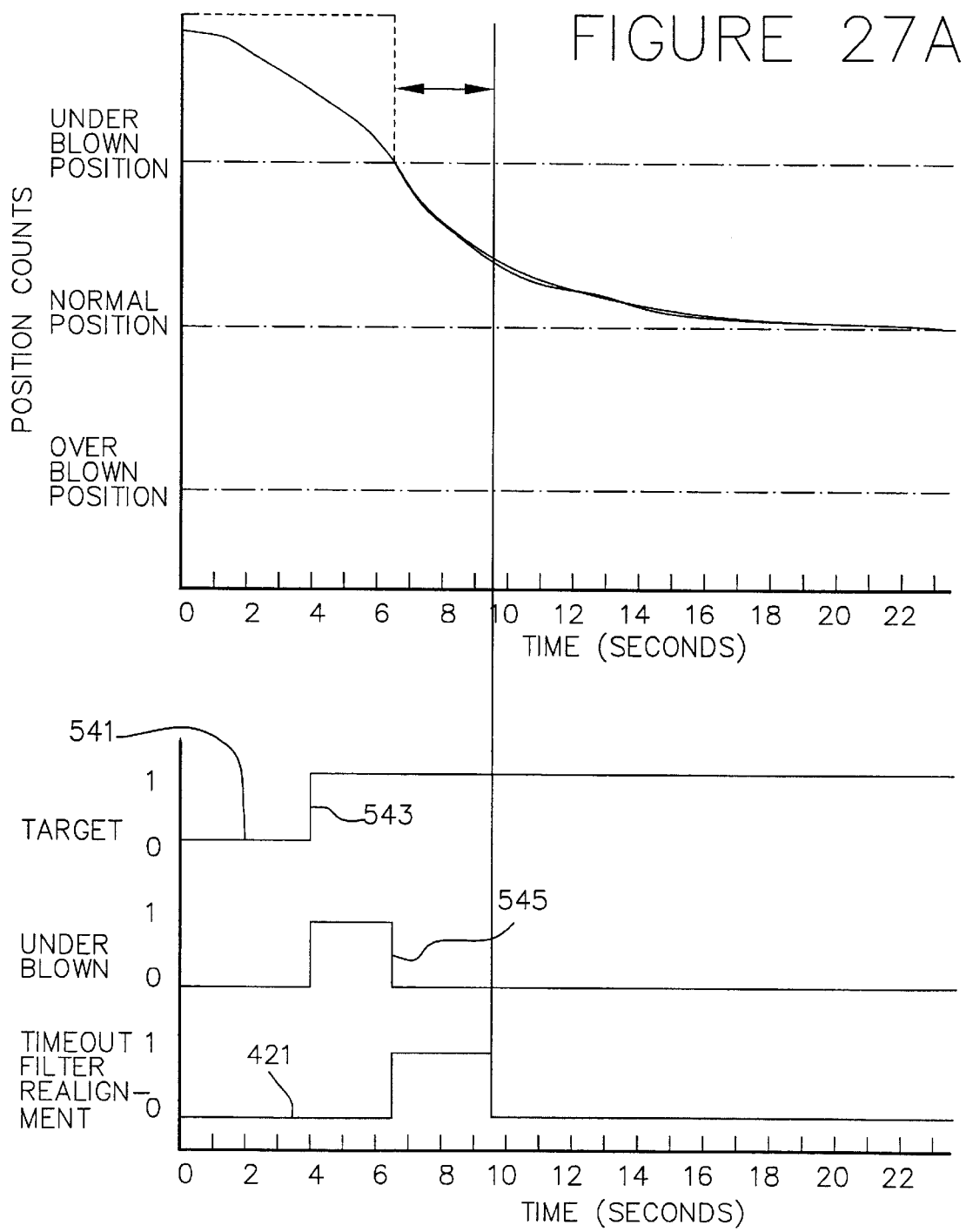

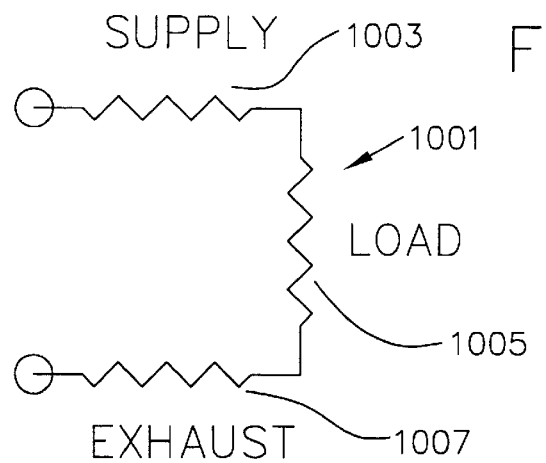
FIGURE 37A (PRIOR ART)
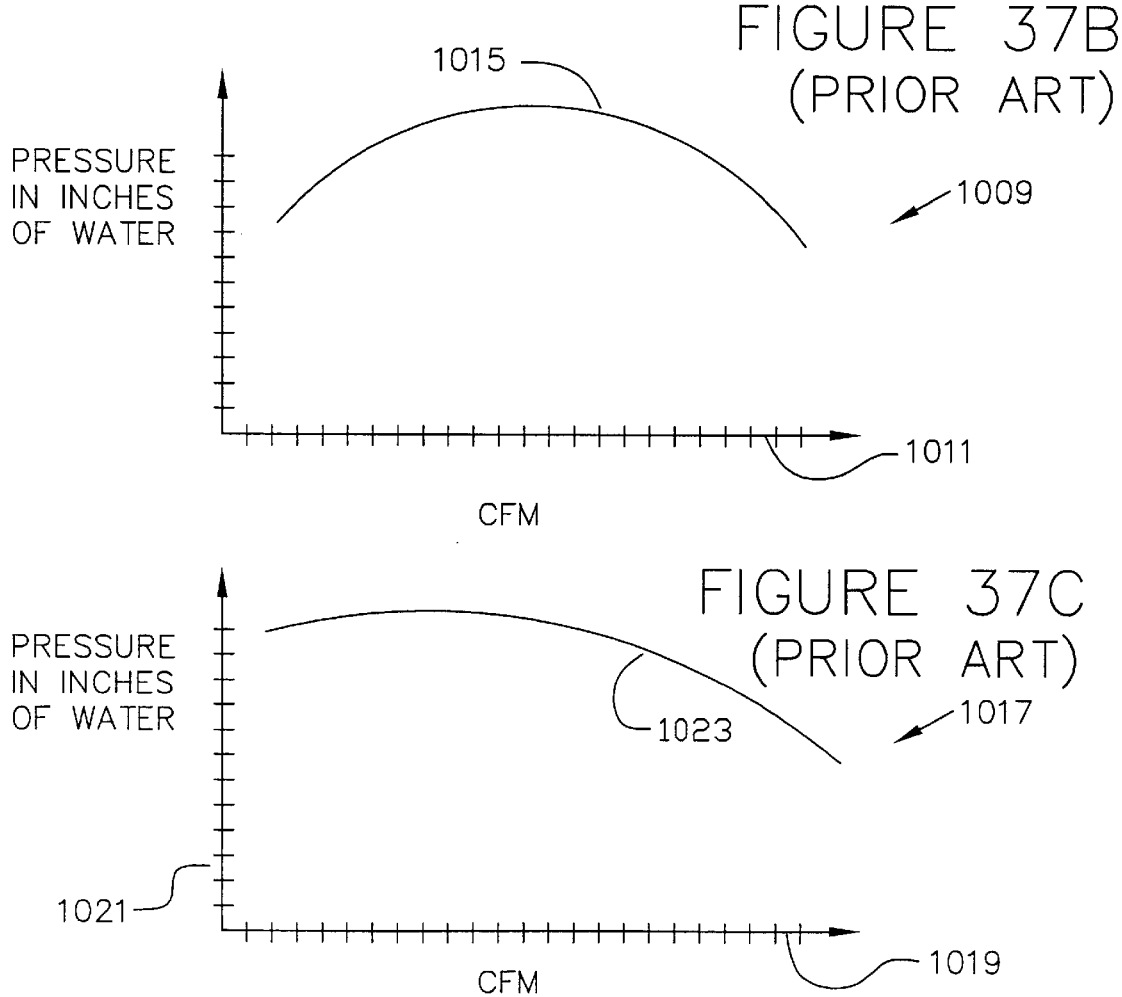
FIGURE 37B (PRIOR ART)
FIGURE 37C (PRIOR ART)

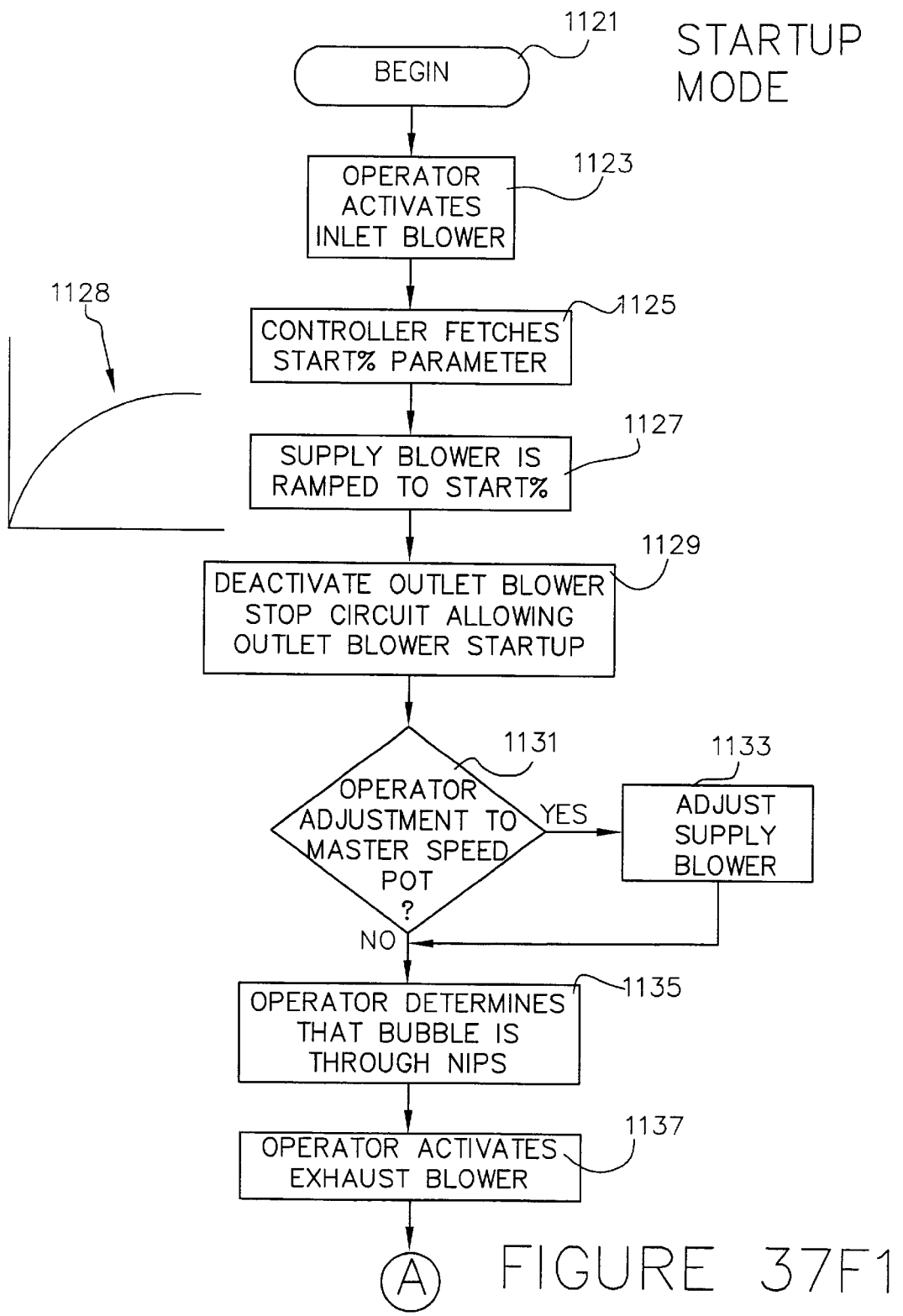
FIGURE 37F1

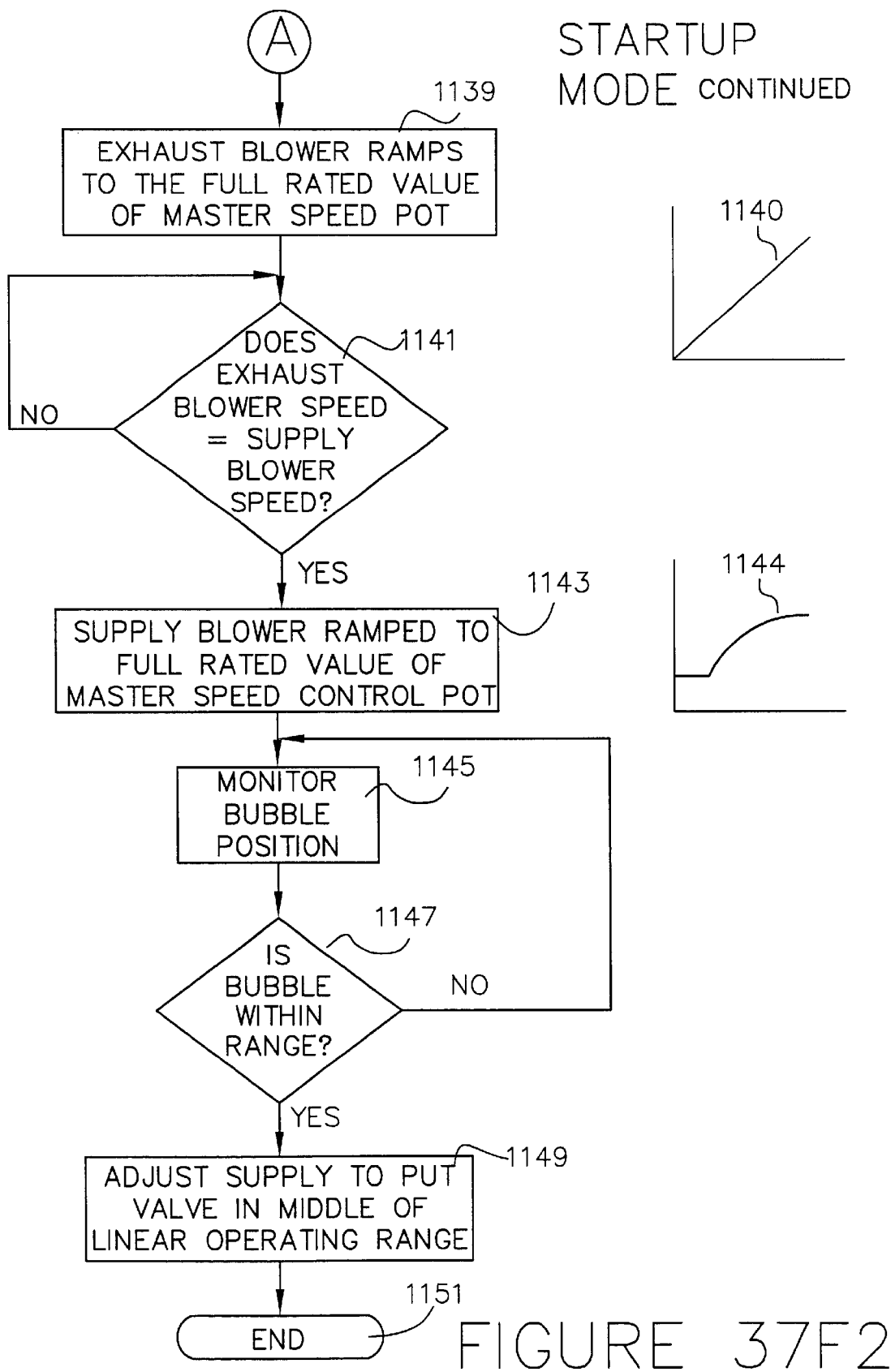
FIGURE 37F2

AUTOMATICALLY BALANCING A BLOWER IN A BLOWN FILM EXTRUSION LINE

CROSS REFERENCE TO RELATED APPLICATION

This patent application includes a disclosure which, in large portion, is similar to the disclosure in U.S. patent application Ser. No. 08/658,369, entitled "Method and Apparatus for Cooling Extruded Film Tubes", which was filed on Jun. 5, 1996, now U.S. Pat. No. 5,891,383. However, this application is not a continuation or continuation-in-part of this co-pending application.

BACKGROUND OF THE INVENTION

1. Field of the Invention

This invention relates generally to blown film extrusion lines, and specifically to operations of the inlet and outlet blowers of blown file systems.

2. Description of the Prior Art

Blown film extrusion lines are used to manufacture plastic bags and plastic sheets. A molten tube of plastic is extruded from an annular die, and then stretched and expanded to a larger diameter and a reduced radial thickness by the action of overhead nip rollers and internal air pressure. Typically, air is entrained by one or more blowers to provide a cooling medium which absorbs heat from the molten material and speeds up the change in state from a molten material back to a solid material. Additionally, blowers are used to provide air pressure which is utilized to control the size and thickness of the film tube. One type of blown film extrusion line utilizes an air flow on the exterior surface of the film tube in order to absorb heat. A different, and more modern, type of blown film extrusion line utilizes both an external flow of cooling air and an internal flow of cooling air in order to cool and size the film tube.

As stated above, blowers are utilized to provide air to the interior of the film tube. Typically, a supply blower is provided in order to supply air to the interior of the film tube, and an exhaust blower is provided in order to exhaust air from the interior of the film tube. Typically, the supply blower and exhaust blower are under electrical control during production operations. However, during startup of the extrusion process, in the prior art, a great deal of human intervention is required in order to establish the bubble. Typically, a human operator will first control the supply blower until the extruded film tube is closed at its upper end by engagement with the overhead nip rollers. Then, the exhaust blowers utilized to remove air in order to prevent expansion and eventual breaking of the extruded film tube. A balance between the supply blower and the exhaust blower must be obtained in order to allow for continuous production of the extruded film tube. The startup of an extruded film is a relatively difficult operation to perform, and generally requires a relatively highly-skilled employee to oversee or perform the startup operations.

SUMMARY OF THE INVENTION

It is one objection of the present invention to provide a method and apparatus for startup of an extruded film tube which includes a supply blower, an exhaust blower, and a controller member, including executable program instructions which define at least one control routine for automatic and coordinated control of the supply blower and the exhaust blower during startup.

The control routines may comprise a startup routine which is utilized in initiating the extruded film tube, a blower optimization routine which is utilized to optimize the operating speeds of either or both of the supply blower and the exhaust blower, and a valve optimization routine wherein an operating condition is established for either or both of the supply blower and the exhaust blower in a manner which optimizes operation of a valve member which is utilized to control the application of air from the supply blower to the extruded film tube.

It is yet another objective of the present invention to utilize prior recorded operating conditions for either or both of the supply blower and exhaust blower in order to take advantage of the value of prior experience with a particular blown film line.

It is yet another objective of the present invention to provide an additional routine which can be utilized to detect bubble breaks during and after the startup operations.

These and other objectives are achieved as is now described.

A method and apparatus is provided for startup of an extruded film tube. The method and apparatus is used in a blown film extrusion apparatus in which film is extruded as a tube from an annular die and pulled along a predetermined path. A means is provided for varying a quantity of air within the extruded film tube. Preferably, the means includes a supply blower which supplies air to the extruded film tube in an amount corresponding to a supply control signal, and an exhaust blower which exhausts air from the extruded film tube in an amount corresponding to an exhaust control signal. A controller member is provided. The controller member includes executable program instructions which define at least one control routine for automatic and coordinated control of the means for varying during startup of the extruded film tube. The controller directs a series of supply control signals to the supply blower and exhaust control signals to the exhaust blower in order to set their optimum operating conditions. In the preferred embodiment, a control interface is provided for receiving operator instructions during startup of the extruded film tube. The controller further includes program instructions for receiving the operating instructions and integrating the operating instructions into the at least one control routine. In the preferred embodiment, a valve member is provided between the supply blower and the extruded film tube. The valve member is under control of the controller member, and is utilized for varying admission of air into the extruded film tube and for controlling the circumference of the extruded film tube after startup of the extruded film tube.

In the preferred embodiment, a variety of control routines may be provided. In a startup routine, the controller member initiates operation of the supply blower and the exhaust blower by first initiating operation of the supply blower in accordance with at least one predetermined operating parameter, and then initiating the exhaust blower in accordance with at least one predetermined parameter.

In a blower optimization routine, at least one of the supply control signal and the exhaust control signal is determined, at least in part, from at least one prior recorded control signal. Preferably, a table is generated in controller memory which records over time the optimum settings of the supply blower and exhaust blower. During startup, the blower optimization routine may be utilized to take advantage of the prior historical knowledge of the blown film apparatus.

In a valve optimization routine, an operating condition is established for at least one of the supply blower and the exhaust blower in a manner which optimizes operation of the valve member. In the preferred embodiment of the present invention, the objective is to allow the valve member to operate in a preferred and substantially linear range of closure conditions.

In a bubble break detection routine, a position signal (which indicates the position or size of the bubble) is utilized in combination with at least one software timer in order to detect a break in the extruded film tube. In the preferred embodiment of the present invention, one software timer is utilized to suppress operation of the bubble break detection routine until a portion of the startup routine is completed. Then, a second software timer is utilized in order to identify unacceptably long intervals of interruption in the position signal, which is interpreted to identify a break or collapse of the extruded film tube.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 8B is a graphic depiction of the operation of the filtering system;

FIGS. 23A through 23G depict the preferred software routines utilized in the present invention, including a first filter routine which is utilized during relatively unstable intervals of operation, and a second dynamic filtering routine which is utilized during relatively stable intervals of operation;

FIG. 26A is a graph which depicts the emergency condition control mode of operation response to the detection of an underblown condition, with the X-axis representing time and the Y-axis representing position of the extruded film tube;

FIG. 26B is a graph of the binary condition of selected operating blocks of the block diagram depiction of FIG. 22, and can be read in combination with FIG. 26A, wherein the X-axis represents time, and the Y-axis represents the binary condition of selected operational blocks;

FIG. 27A is a graph which depicts the emergency condition control mode of operation response to the detection of an underblown condition, with the X-axis representing time and the Y-axis representing position of the extruded film tube;

FIG. 27B is a graph of the binary condition of selected operating blocks of the block diagram depiction of FIG. 22, and can be read in combination with FIG. 27A, wherein the X-axis represents time, and the Y-axis represents the binary condition of selected operational blocks;

FIG. 37A is a schematic representation of the prior art control of supply and exhaust blowers;

FIG. 37B and FIG. 37C are graphical representations of the performance curves for supply and exhaust blowers;

FIGS. 37F(1)–37F(2) is a flowchart representation of the startup mode of operation of FIG. 37E;

FIGS. 37G through 37J are flowchart representations of the run mode of FIG. 37E;

DETAILED DESCRIPTION OF PREFERRED EMBODIMENT

In this detailed description of the invention, FIGS. 1 through 29, and accompanying text, provide a very detailed overview of an internal-bubble-cooling blown film extrusion system which is equipped with a preferred sizing control system. FIGS. 30 through 36, and accompanying text, provide a description of the preferred method and apparatus for cooling extruded film tubes of the present invention used either in combination with the preferred sizing control apparatus, or alone.

Figure 1:
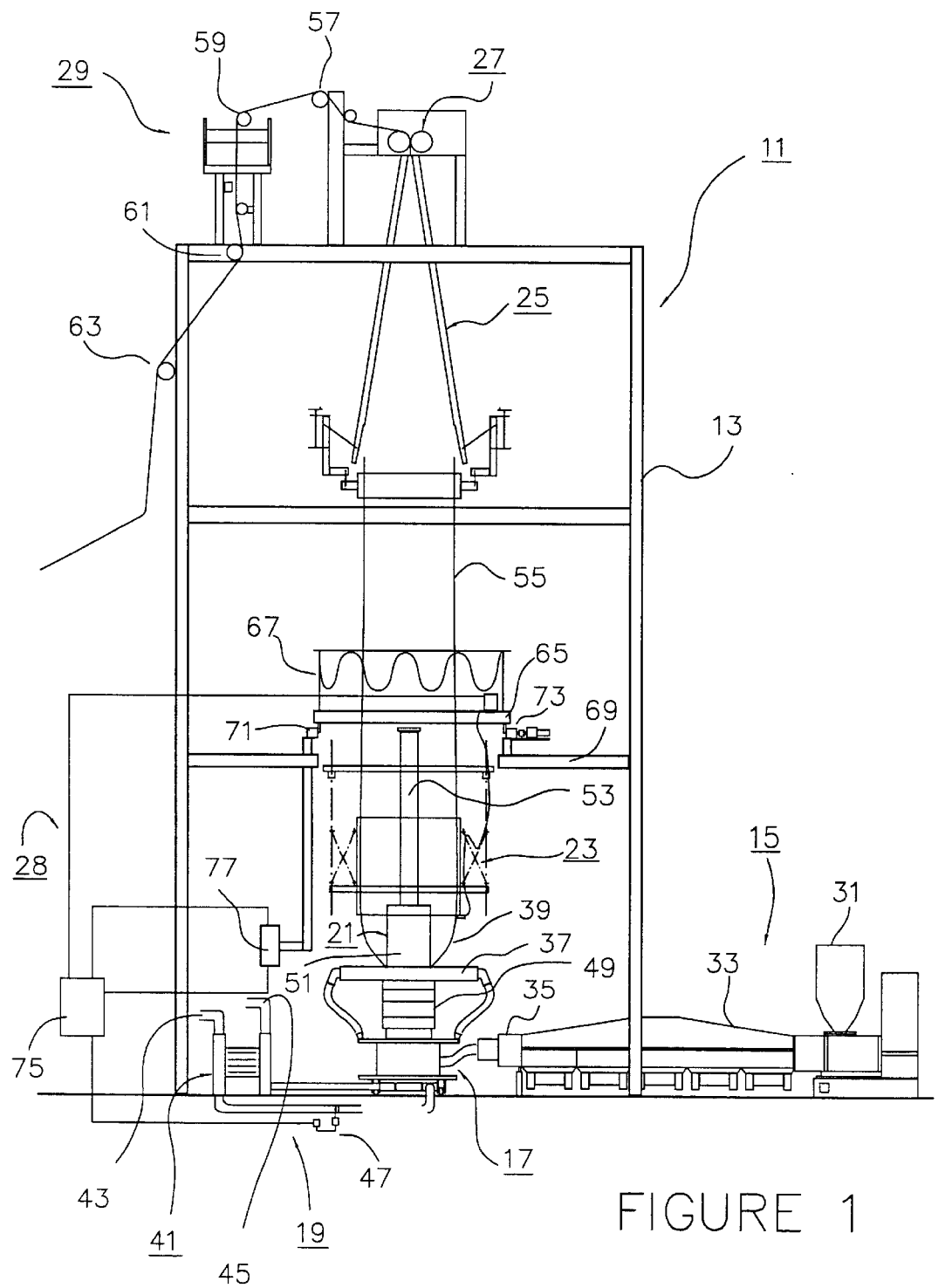
FIG. 1 is a view of a blown film extrusion line equipped with the improved control system of the present invention.

FIG. 1 is a view of blown film extrusion line 11, which includes a number of subassemblies which cooperate to produce plastic bags and the like from plastic resin. The main components include blown film tower 13, which provides a rigid structure for mounting and aligning the various subassemblies, extruder subassembly 15, die subassembly 17, blower subassembly 19, stack 21, sizing cage 23, collapsible frame 25, nips 27, control subassembly 28 and rollers 29.

Plastic granules are fed into hopper 31 of extruder subassembly 15. The plastic granules are melted and fed by extruder 33 and pushed into die subassembly 17, and specifically to annular die 37. The molten plastic granules emerge from annular die 37 as a molten plastic tube 39, which expands from the die diameter to a desired final diameter, which may vary typically between two to three times the die diameter.

Blower subassembly 19 includes a variety of components which cooperate together to provide a flow of cooling air to the interior of molten plastic tube 39, and also along the outer periphery of molten plastic tube 39. Blower subassembly includes blower 41 which pulls air into the system at intake 43, and exhausts air from the system at exhaust 45. The flow of air into molten plastic tube 39 is controlled at valve 47. Air is also directed along the exterior of molten plastic tube from external air ring 49, which is concentric to annular die 37. Air is supplied to the interior of molten plastic tube 39 through internal air diffuser 51. Air is pulled from the interior of molten plastic tube 39 by exhaust stack 53.

The streams of external and internal cooling airs serve to harden molten plastic tube 39 a short distance from annular die 37. The line of demarcation between the molten plastic tube 39 and the hardened plastic tube 55 is identified in the trade as the "frost line." Normally, the frost line is substantially at or about the location at which the molten plastic tube 39 is expanded to the desired final diameter.

Adjustable sizing cage 23 is provided directly above annular die 38 and serves to protect and guide the plastic tube 55 as it is drawn upward through collapsible frame 25 by nips 27. Afterwards, plastic tube 55 is directed through a series of rollers 57, 59, 61, and 63 which serve to guide the tube to packaging or other processing equipment.

In some systems, rotating frame 65 is provided for rotating relative to blown film tower 13. It is particularly useful in rotating mechanical feeler arms of the prior art systems around plastic tube 55 to distribute the deformations. Umbilical cord 67 is provided to allow electrical conductors to be routed to rotating frame 65. Rotating frame 65 rotates at bearings 71, 73 relative to stationary frame 69.

Control subassembly 28 is provided to monitor and control the extrusion process, and in particular the circumference of plastic tube 55. Control subassembly 28 includes supervisory control unit, and operator control panel 77.

Figure 2:
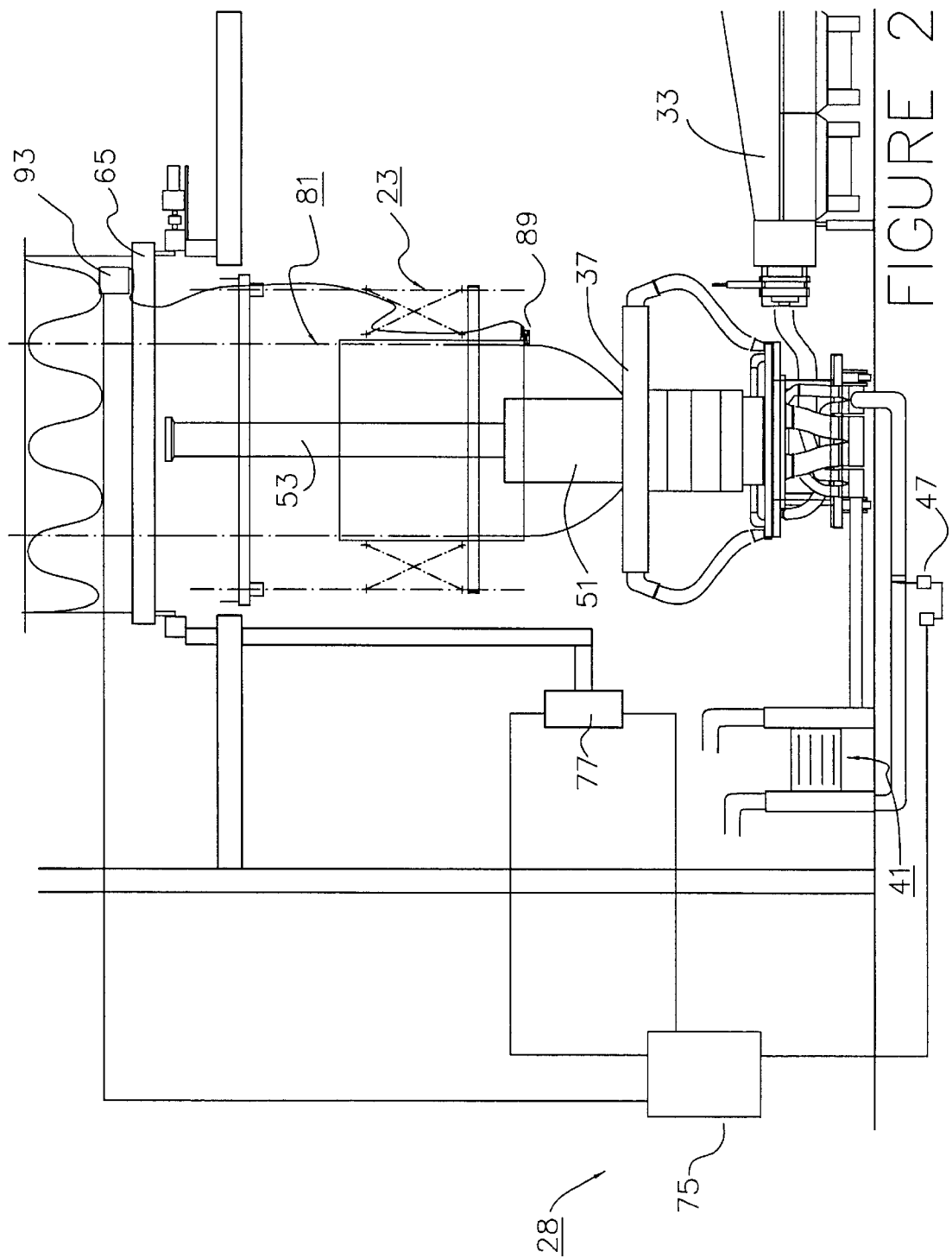
FIG. 2 is a view of the die, sizing cage, control subassembly and rotating frame of the blown film tower of FIG. 1.

FIG. 2 is a more detailed view of annular die 37, sizing cage 23, control subassembly 28, and rotating frame 65. As shown in FIG. 2, supervisory control unit 75 is electrically coupled to operator control panel 77, valve 47, and acoustic transducer 79. These components cooperate to control the volume of air contained within extruded film tube 81, and hence the thickness and diameter of the extruded film tube 81. Valve 47 controls the amount of air directed by blower 41 into extruded film tube 81 through internal air diffuser 51.

If more air is directed into extruded film tube 81 by internal air diffuser 51 than is exhausted from extruded film tube 81 by exhaust stack 43, the circumference of extruded film tube 81 will be increased. Conversely, if more air is exhausted from the interior of extruded film tube 81 by exhaust stack 53 than is inputted into extruded film tube 81 by internal air diffuser 51, the circumference of extruded film tube 81 will decrease.

In the preferred embodiment, valve 41 is responsive to supervisory control unit 75 for increasing or decreasing the flow of air into extruded film tube 81. Operator control panel 77 serves to allow the operator to select the diameter of extruded film tube 81. Acoustic transducer 79 serves to generate a signal corresponding to the circumference of extruded film tube 81, and direct this signal to supervisory control unit 75 for comparison to the circumference setting selected by the operator at operator control panel 77.

If the actual circumference of extruded film tube 81 exceeds the selected circumference, supervisory control unit 75 operates valve 47 to restrict the passage of air from blower 41 into extruded film tube 81. This results in a decrease in circumference of extruded film tube 81. Conversely, if the circumference of extruded film tube 81 is less than the selected circumference, supervisory control unit 75 operates on valve 47 to increase the flow of air into extruded film tube 81 and increase its circumference. Of course, extruded film tube 81 will fluctuate in circumference, requiring constant adjustment and readjustment of the inflow of air by operation of supervisory control unit 75 and valve 47.

Figure 3:
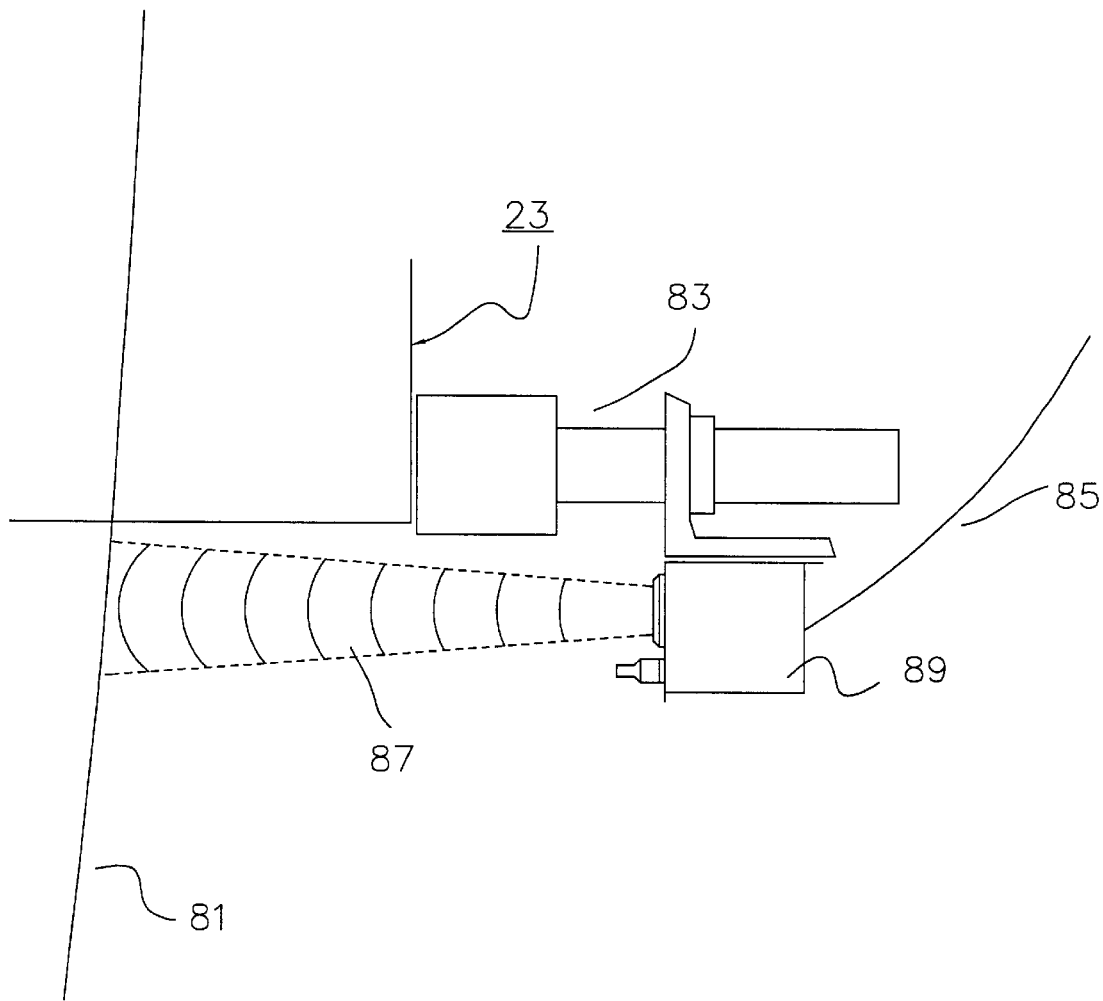
FIG. 3 is a view of the acoustic transducer of the improved control system of the present invention coupled to the sizing cage of the blown film extrusion line tower adjacent the extruded film tube of FIGS. 1 and 2.

FIG. 3 is a view of ultrasonic sensor 89 of the improved control system of the present invention coupled to sizing cage 23 adjacent extruded film tube 81. In the preferred embodiment, acoustic transducer 79 comprises an ultrasonic measuring and control system manufactured by Massa Products Corporation of Hingham, Mass., Model Nos. M-4000, M410/215, and M450, including a Massa Products ultrasonic sensor 89. It is an ultrasonic ranging and detection device which utilizes high frequency sound waves which are deflected off objects and detected. In the preferred embodiment, a pair of ultrasonic sensors 89 are used, one to transmit sonic pulses, and another to receive sonic pulses. For purposes of simplifying the description only one ultrasonic sensor 89 is shown, and in fact a single ultrasonic sensor can be used, first to transmit a sonic pulse and then to receive the return in an alternating fashion. The elapsed time between an ultrasonic pulse being transmitted and a significant echo being received corresponds to the distance between ultrasonic sensor 89 and the object being sensed. Of course, the distance between the ultrasonic sensor 89 and extruded film tube 81 corresponds to the circumference of extruded film tube 81. In the present situation, ultrasonic sensor 89 emits an interrogating ultrasonic beam 87 substantially normal to extruded film tube 81 and which is deflected from the outer surface of extruded film tube 81 and sensed by ultrasonic sensor 89.

The Massa Products Corporation ultrasonic measurement and control system includes system electronics which utilize the duration of time between transmission and reception to produce a useable electrical output such as a voltage or current. In the preferred embodiment, ultrasonic sensor 89 is coupled to sizing cage 23 at adjustable coupling 83. In the preferred embodiment, ultrasonic sensor 89 is positioned within seven inches of extruded film tube 81 to minimize the impact of ambient noise on a control system. Ultrasonic sensor 89 is positioned so that interrogating ultrasonic beam 87 travels through a path which is substantially normal to the outer surface of extruded film tube 81, to maximize the return signal to ultrasonic sensor 89.

Figure 4:
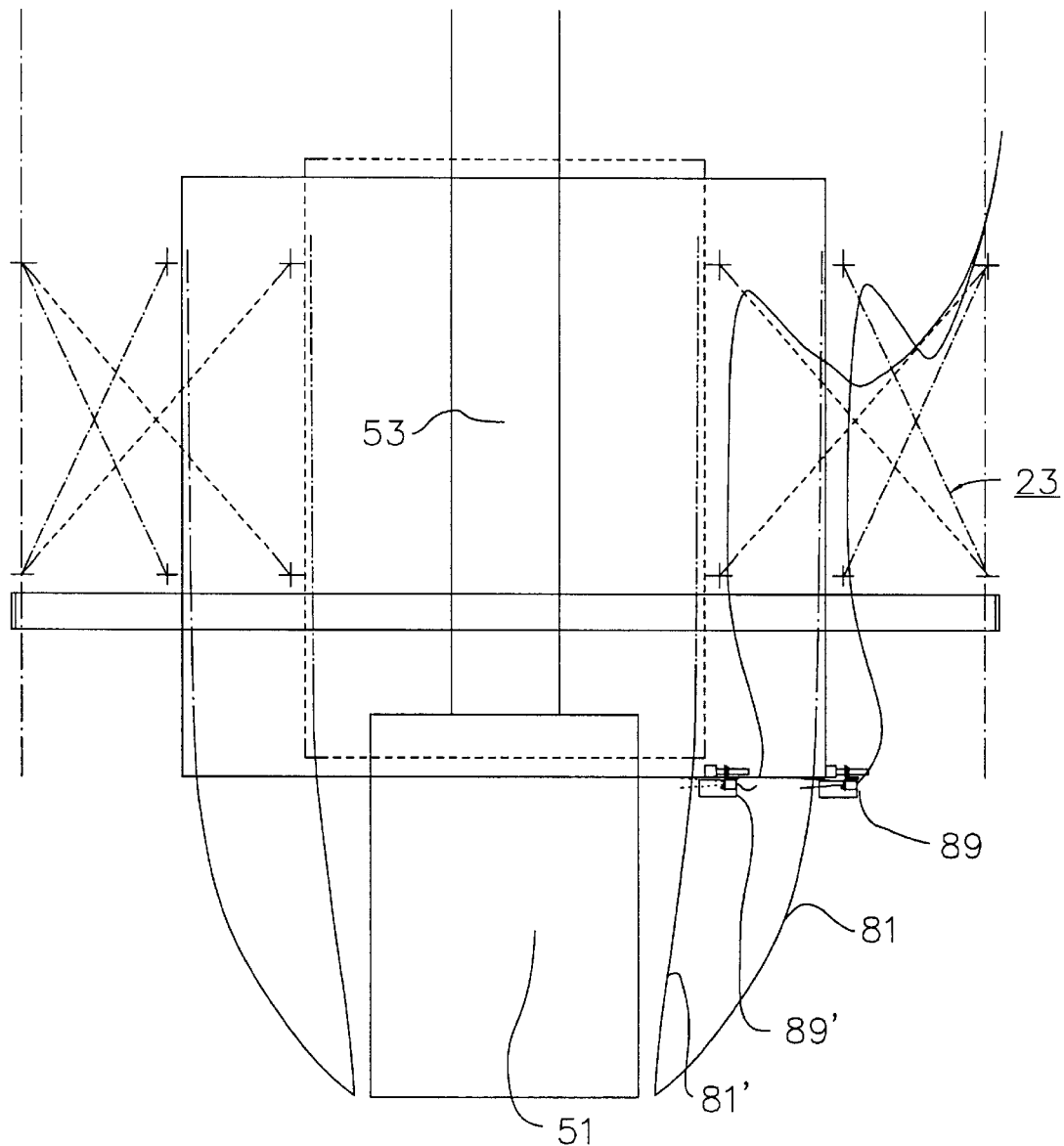
FIG. 4 is a view of the acoustic transducer of FIG. 3 coupled to the sizing cage of the blown film tower, in two positions, one position being shown in phantom.

FIG. 4 is a view of ultrasonic sensor 89 of FIG. 3 coupled to sizing cage 23 of the blown film tower 13, in two positions, one position being shown in phantom. In the first position, ultrasonic sensor 89 is shown adjacent extruded film tube 81 of a selected circumference. When extruded film tube 81 is downsized to a tube having a smaller circumference, ultrasonic sensor 89 will move inward and outward relative to the central axis of the adjustable sizing cage, along with the adjustable sizing cage 23. The second position is shown in phantom with ultrasonic sensor 89 shown adjacent extruded film tube 81 of a smaller circumference. For purposes of reference, internal air diffuser 51 and exhaust stack 53 are shown in FIG. 4. The sizing cage is also movable upward and downward, so ultrasonic sensor 89 is also movable upward and downward relative to the frostline of the extruded film tube 81.

Figure 5:
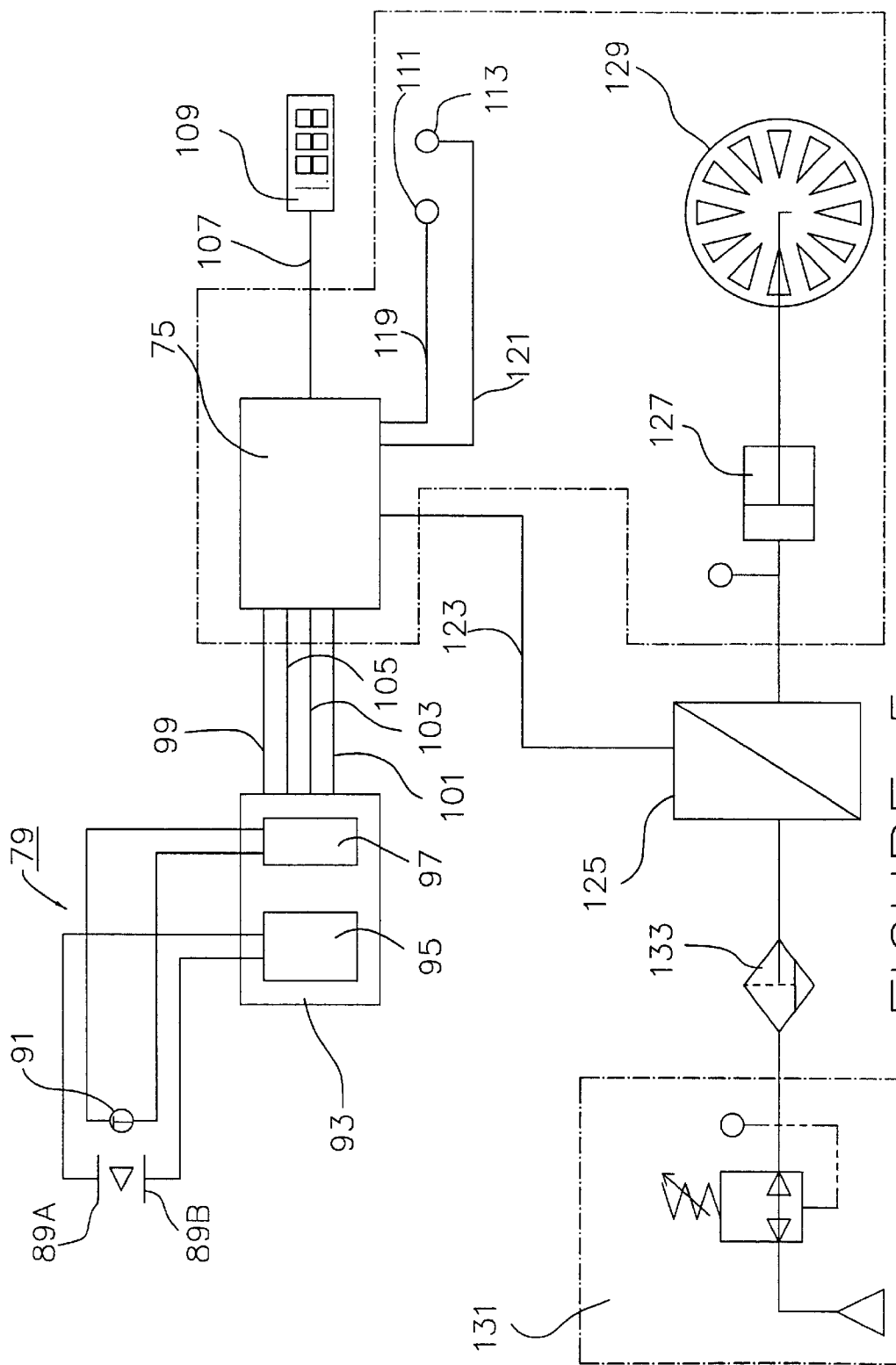
FIG. 5 is a schematic and block diagram view of the preferred control system of the present invention.

FIG. 5 is a schematic and block diagram view of the preferred control system of the present invention. The preferred acoustic transducer 79 of the present invention includes ultrasonic sensor 89 and temperature sensor 91 which cooperate to produce a current position signal which is independent of the ambient temperature. Ultrasonic sensor 89 is electrically coupled to ultrasonic electronics module 95, and temperature sensor 91 is electrically coupled to temperature electronics module 97. Together, ultrasonic electronics module 95 and temperature electronics module 97 comprise transducer electronics 93. Four signals are produced by acoustic transducer 79, including one analog signal, and three digital signals.

As shown in FIG. 5, four conductors couple transducer electronics to supervisory control unit 75. Specifically, conductor 99 routes a 0 to 10 volts DC analog input to supervisory control unit 75. Conductors 101, 103, and 105 provide digital signals to supervisory control unit 75 which correspond to a target present signal, maximum override, and minimum override. These signals will be described below in greater detail.

Supervisory control unit 75 is electrically coupled to setpoint display 109 through analog display output 107. An analog signal between 0 and 10 volts DC is provided to setpoint display 109 which displays the selected distance between ultrasonic sensor 89 and extruded film tube 81. A distance is selected by the operator through distance selector 111. Target indicator 113, preferably a light, is provided to indicate that the target (extruded film tube 81) is in range. Distance selector 111 is electrically coupled to supervisory control unit 75 by distance setting conductor 119. Target indicator 113 is electrically coupled to supervisory control unit 75 through target present conductor 121.

Supervisory control unit 75 is also coupled via valve control conductor 123 to proportional valve 125. In the preferred embodiment, proportional valve 125 corresponds to valve 47 of FIG. 1, and is a pressure control component manufactured by Proportionair of McCordsville, Ind., Model No. BB1. Proportional valve 125 translates an analog DC voltage provided by supervisory control unit 75 into a corresponding pressure between 0.5 and 1.2 bar. Proportional valve 125 acts on rotary valve 129 through cylinder 127. Pressurized air is provided to proportional valve 125 from pressurized air supply 131 through 20 micron filter 133.

Figure 6:
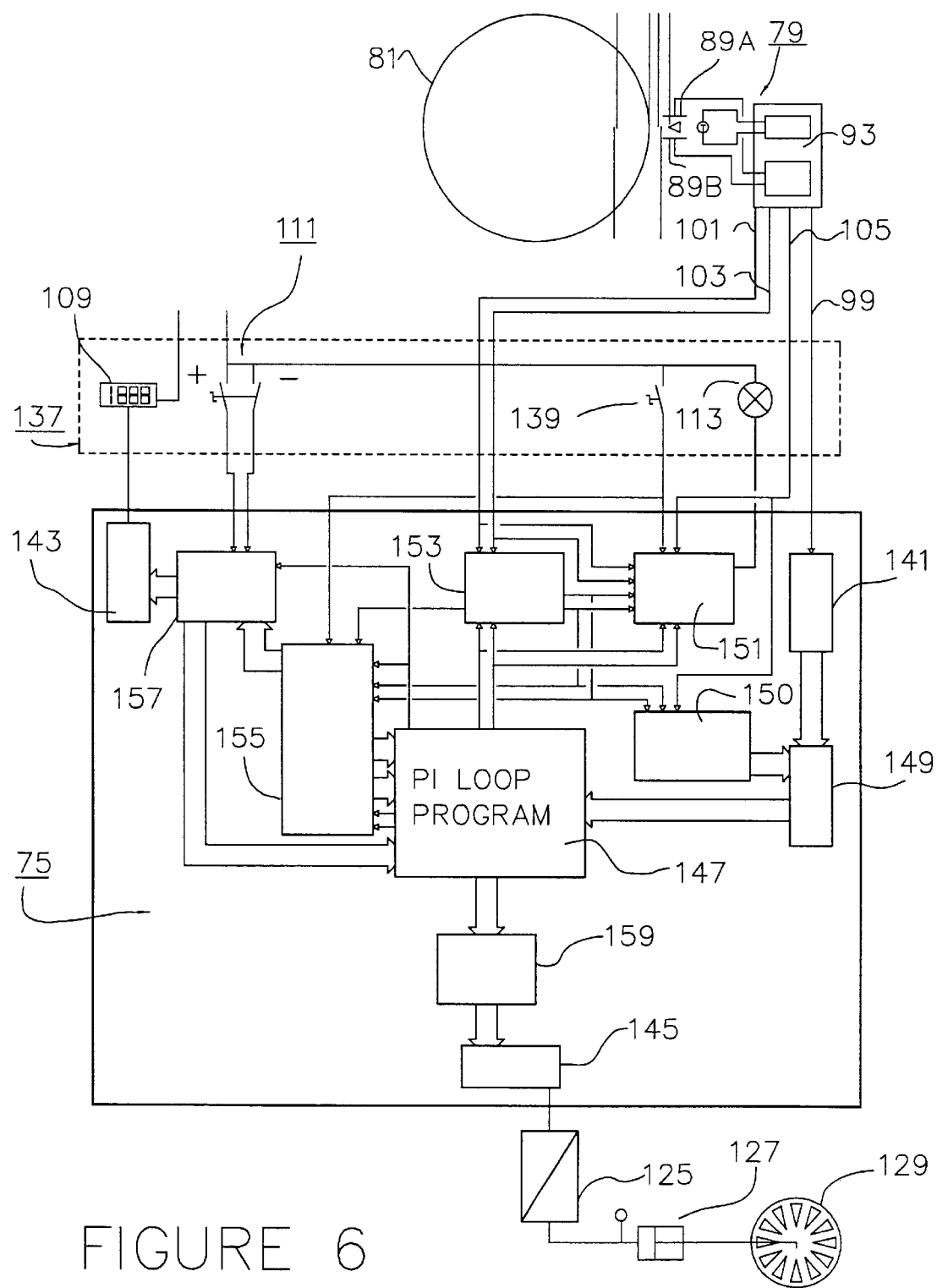
FIG. 6 is a schematic and block diagram view of the preferred control system of FIG. 5, with special emphasis on the supervisory control unit.

FIG. 6 is a schematic and block diagram view of the preferred control system of FIG. 5, with special emphasis on the supervisory control unit 75. Extruded film tube 81 is shown in cross-section with ultrasonic sensor 89 adjacent its outer wall. Ultrasonic sensor 89 emits interrogating pulses which are bounced off of extruded film tube and sensed by ultrasonic sensor 89. The time delay between transmission and reception of the interrogating pulse is processed by transducer electronics 93 to produce four outputs: CURRENT POSITION signal which is provided to supervisory control unit 75 via analog output conductor 99, digital TARGET PRESENT signal which is provided over digital output 105, a minimum override signal (MIO signal) indicative of a collapsing or undersized bubble which is provided over digital output conductor 103, and maximum override signal (MAO signal) indicative of an overblown extruded film tube 81 which is provided over a digital output conductor 101.

Figure 7A:
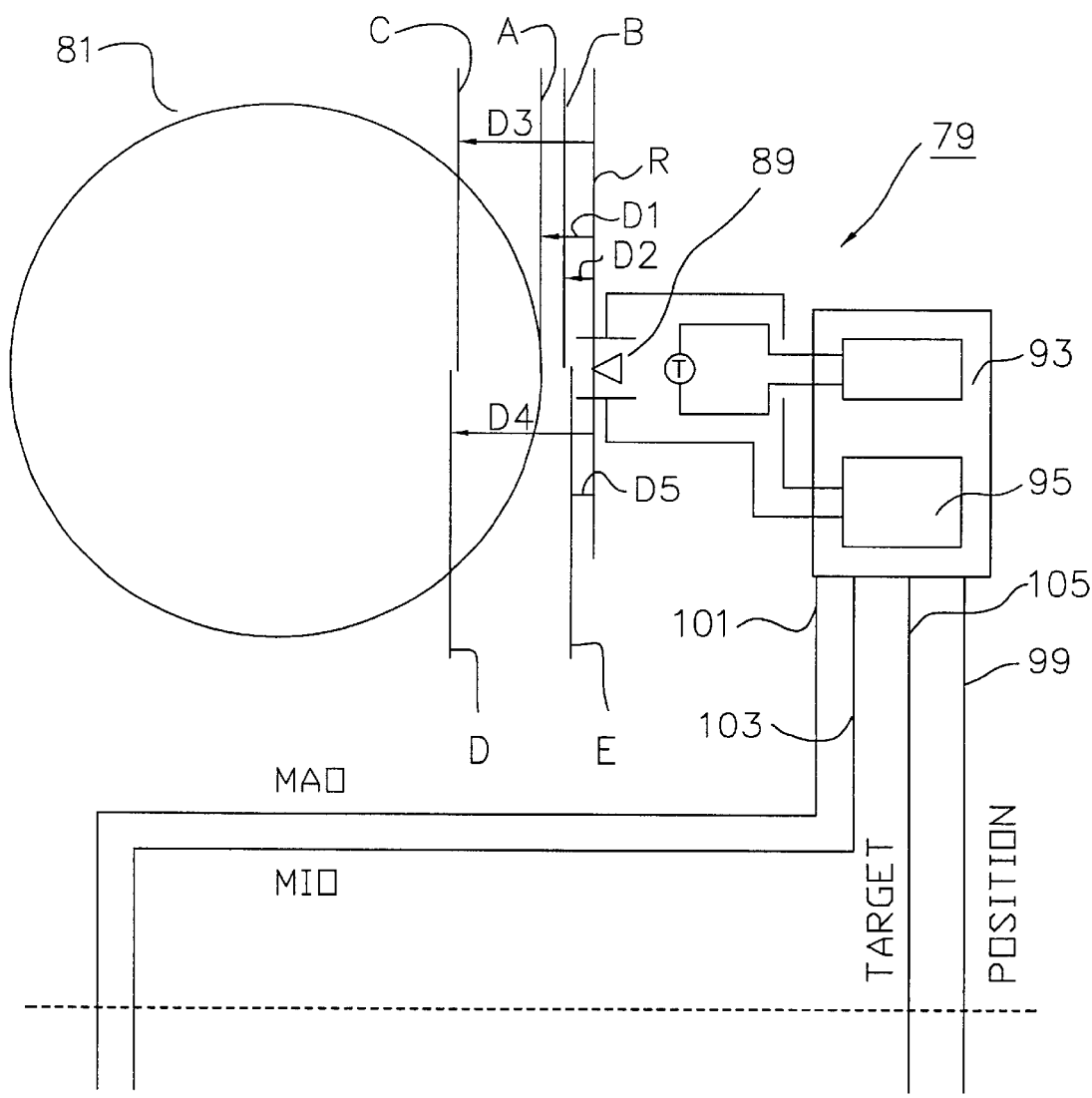
FIG. 7A is a schematic and block diagram view of the signals generated by the ultrasonic sensor which pertain to the position of the blown film layer.

As shown in FIG. 6, the position of extruded film tube 81 relative to ultrasonic sensor 89 is analyzed and controlled with reference to a number of distance thresholds and setpoints, which are shown in greater detail in FIG. 7A. All set points and thresholds represent distances from reference R. The control system of the present invention attempts to maintain extruded film tube 81 at a circumference which places the wall of extruded film tube 81 at a tangent to the line established by reference A. The distance between reference R and set point A may be selected by the user through distance selector 111. This allows the user to control the distance between ultrasonic sensor 89 and extruded film tube 81.

The operating range of acoustic transducer 79 is configurable by the user with settings made in transducer electronics 93. In the preferred embodiment, using the Massa Products transducer, the range of operation of acoustic transducer 79 is between 3 to 24 inches. Therefore, the user may select a minimum circumference threshold C and a maximum circumference threshold B, below and above which an error signal is generated. Minimum circumference threshold C may be set by the user at a distance d3 from reference R. Maximum circumference threshold B may be selected by the user to be a distance d2 from reference R. In the preferred embodiment, setpoint A is set a distance of 7 inches from reference R. Minimum circumference threshold C is set a distance of 10.8125 inches from reference R. Maximum circumference threshold B is set a distance of 4.1 inches from reference R. Transducer electronics 93 allows the user to set or adjust these distances at will provided they are established within the range of operation of acoustic transducer 79, which is between 3 and 24 inches.

Besides providing an analog indication of the distance between ultrasonic sensors 89 and extruded film tube 81, transducer electronics 93 also produces three digital signals which provide information pertaining to the position of extruded film tube 81. If extruded film tube 81 is substantially normal and within the operating range of ultrasonic sensor 89, a digital "1" is provided at digital output 105. The signal is representative of a TARGET PRESENT signal. If extruded film tube 81 is not within the operating range of ultrasonic sensor 89 or if a return pulse is not received due to curvature of extruded film tube 81, TARGET PRESENT signal of digital output 105 is low. As discussed above, digital output 103 is a minimum override signal MIO. If extruded film tube 81 is smaller in circumference than the reference established by threshold C, minimum override signal MIO of digital output 103 is high. Conversely, if circumference of extruded film tube 81 is greater than the reference established by threshold C, the minimum override signal MIO is low.

Digital output 101 is for a maximum override signal MAO. If extruded film tube 81 is greater than the reference established by threshold B, the maximum override signal MAO is high. Conversely, if the circumference of extruded film tube 81 is less than the reference established by threshold B, the output of maximum override signal MAO is low.

The minimum override signal MIO will stay high as long as extruded film tube 81 has a circumference less than that established by threshold C. Likewise, the maximum override signal MAO will remain high for as long as the circumference of extruded film tube 81 remains larger than the reference established by threshold B.

Threshold D and threshold E are also depicted in FIG. 7A. Threshold D is established at a distance d4 from reference R. Threshold E is established at a distance d5 from reference R. Thresholds D and E are established by supervisory control unit 75, not by acoustic transducer 79. Threshold D represents a minimum circumference threshold for extruded film tube 81 which differs from that established by transducer electronics 93. Likewise, threshold E corresponds to a maximum circumference threshold which differs from that established by acoustic transducer 79. Thresholds D and E are established in the software of supervisory control unit 75, and provide a redundancy of control, and also minimize the possibility of user error, since these threshold are established in software, and cannot be easily changed or accidentally changed. The coordination of all of these thresholds will be discussed in greater detail below. In the preferred embodiment, threshold C is established at 10.8125 inches from reference R. Threshold E is established at 3.6 inches from reference R.

Figure 7B:
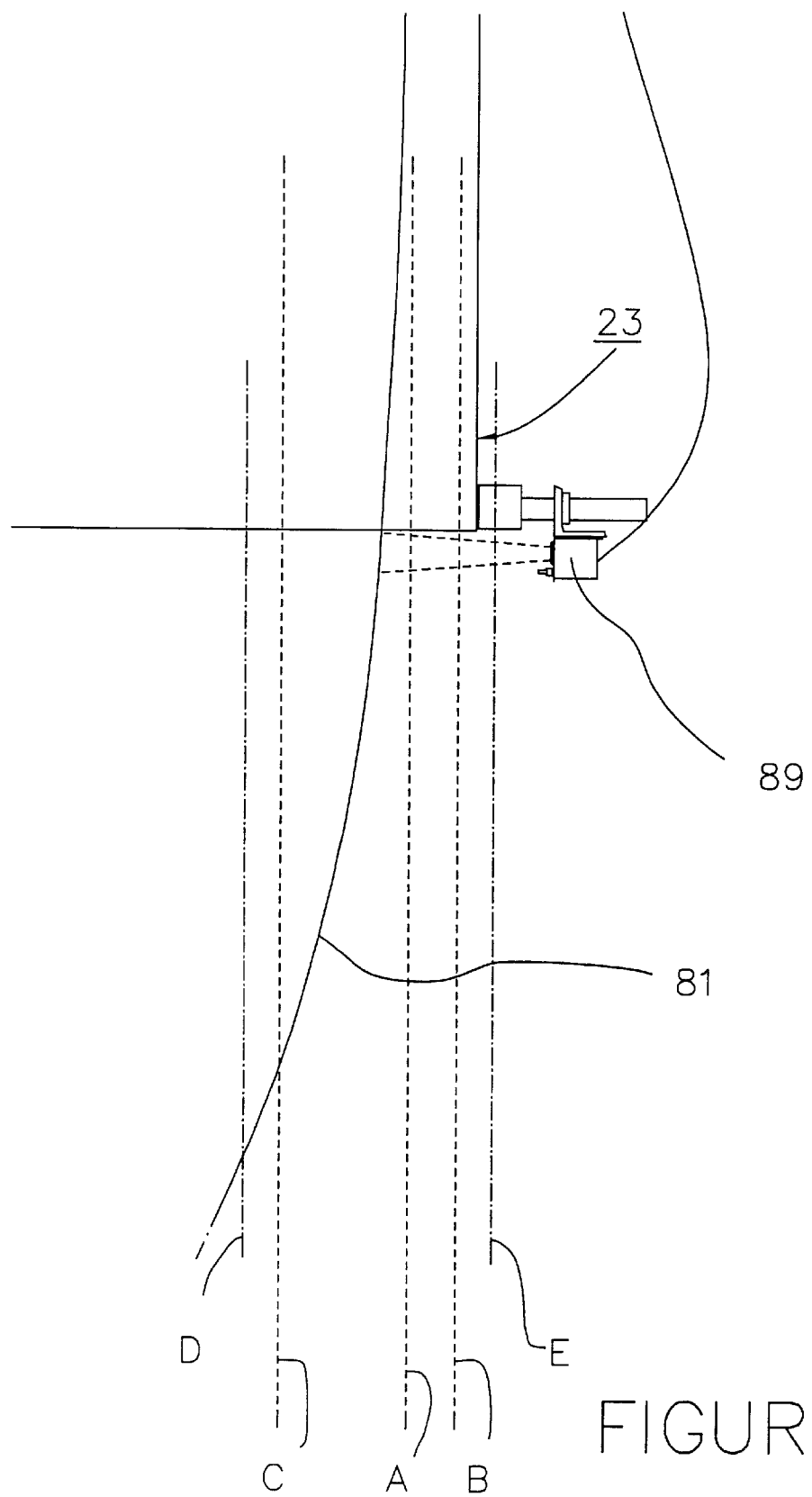
FIG. 7B is a view of the ultrasonic sensor of FIG. 3 coupled to the sizing cage of the blown film tower, with permissible extruded film tube operating ranges indicated thereon.

FIG. 7B is a side view of the ultrasonic sensor 89 coupled to sizing cage 23 of the blown film tower 13, with permissible extruded film tube 81 operating ranges indicated thereon. Setpoint A is the desired distance between ultrasonic sensor 89 and extruded film tube 81. Thresholds D and C are established at selected distances inward from ultrasonic sensor 89, and represent minimum circumference thresholds for extruded film tube 81. Thresholds B and E are established at selected distances from setpoint A, and establish separate maximum circumference thresholds for extruded film tube 81. As shown in FIG. 7B, extruded film tube 81 is not at setpoint A. Therefore, additional air must be supplied to the interior of extruded film tube 81 to expand the extruded film tube 81 to the desired circumference established by setpoint A.

If extruded film tube 81 were to collapse, two separate alarm conditions would be registered. One alarm condition will be established when extruded film tube 81 falls below threshold C. A second and separate alarm condition will be established when extruded film tube 81 falls below threshold D. Extruded film tube 81 may also become overblown. In an overblown condition, two separate alarm conditions are possible. When extruded film tube 81 expands beyond threshold B, an alarm condition is registered. When extruded film tube 81 expands further to extend beyond threshold E, a separate alarm condition is registered.

As discussed above, thresholds C and B are subject to user adjustment through settings in transducer electronics 93. In contrast, thresholds D and E are set in computer code of supervisory control unit 75, and are not easily adjusted. This redundancy in control guards against accidental or intentional missetting of the threshold conditions at transducer electronics 93. The system also guards against the possibility of equipment failure in transducer 79, or gradual drift in the threshold settings due to deterioration, or overheating of the electronic components contained in transducer electronics 93.

Returning now to FIG. 6, operator control panel 137 and supervisory control unit 75 will be described in greater detail. Operator control panel 137 includes setpoint display 109, which serves to display the distance d1 between reference R and setpoint A. Setpoint display 109 includes a 7 segment display. Distance selector 111 is used to adjust setpoint A. Holding the switch to the "+" position increases the circumference of extruded film tube 81 by decreasing distance d1 between setpoint A and reference R. Holding the switch to the "−" position decreases the diameter of extruded film tube 81 by increasing the distance between reference R and setpoint A.

Target indicator 113 is a target light which displays information pertaining to whether extruded film tube 81 is within range of ultrasonic transducer 89, whether an echo is received at ultrasonic transducer 89, and whether any alarm condition has occurred. Blower switch 139 is also provided in operator control panel 137 to allow the operator to selectively disconnect the blower from the control unit. As shown in FIG. 6, all these components of operator control panel 137 are electrically coupled to supervisory control unit 75.

Supervisory control unit 75 responds to the information provided by acoustic transducer 79, and operator control panel 137 to actuate proportional valve 125. Proportional valve 125 in turn acts upon pneumatic cylinder 127 to rotate rotary valve 129 to control the air flow to the interior of extruded film tube 81.

With the exception of analog to digital converter 141, digital to analog converter 143, and digital to analog converter 145 (which are hardware items), supervisory control unit 75 is a graphic representation of computer software resident in memory of supervisory control unit 75. In the preferred embodiment, supervisory control unit 75 comprises an industrial controller, preferably a Texas Instrument brand industrial controller Model No. PM550. Therefore, supervisory control unit 75 is essentially a relatively low-powered computer which is dedicated to a particular piece of machinery for monitoring and controlling. In the preferred embodiment, supervisory control unit 75 serves to monitor many other operations of blown film extrusion line 11. The gauging and control of the circumference of extruded film tube 81 through computer software is one additional function which is "piggybacked" onto the industrial controller. Alternately, it is possible to provide an industrial controller or microcomputer which is dedicated to the monitoring and control of the extruded film tube 81. Of course, dedicating a microprocessor to this task is a rather expensive alternative.

For purposes of clarity and simplification of description, the operation of the computer program in supervisory control unit 75 have been segregated into operational blocks, and presented as an amalgamation of digital hardware blocks. In the preferred embodiment, these software subcomponents include: software filter 149, health state logic 151, automatic sizing and recovery logic 153, loop mode control logic 155, volume setpoint control logic 157, and output clamp 159. These software modules interface with one another, and to PI loop program 147 of supervisory control unit 75. PI loop program is a software routine provided in the Texas Instruments' PM550 system. The proportional controller regulates a process by manipulating a control element through the feedback of a controlled output. The equation for the output of a PI controller is:

$$m = K*e + K/T \int e \, dt + ms$$

In this equation:
m=controller output
K=controller gain
e=error
T=reset time
dt=differential time
ms=constant
∫e dt=integration of all previous errors When an error exists, it is summed (integrated) with all the previous errors, thereby increasing or decreasing the output of the PI controller (depending upon whether the error is positive or negative). Thus as the error term accumulates in the integral term, the output changes so as to eliminate the error.

CURRENT POSITION signal is provided by acoustic transducer 79 via analog output 99 to analog to digital converter 141, where the analog CURRENT POSITION signal is digitized. The digitized CURRENT POSITION signal is routed through software filter 149, and then to PI loop program 147. If the circumference of extruded film tube 81 needs to be adjusted, PI loop program 147 acts through output clamp 159 upon proportional valve 125 to adjust the quantity of air provided to the interior of extruded film tube 81.

Figure 8A:
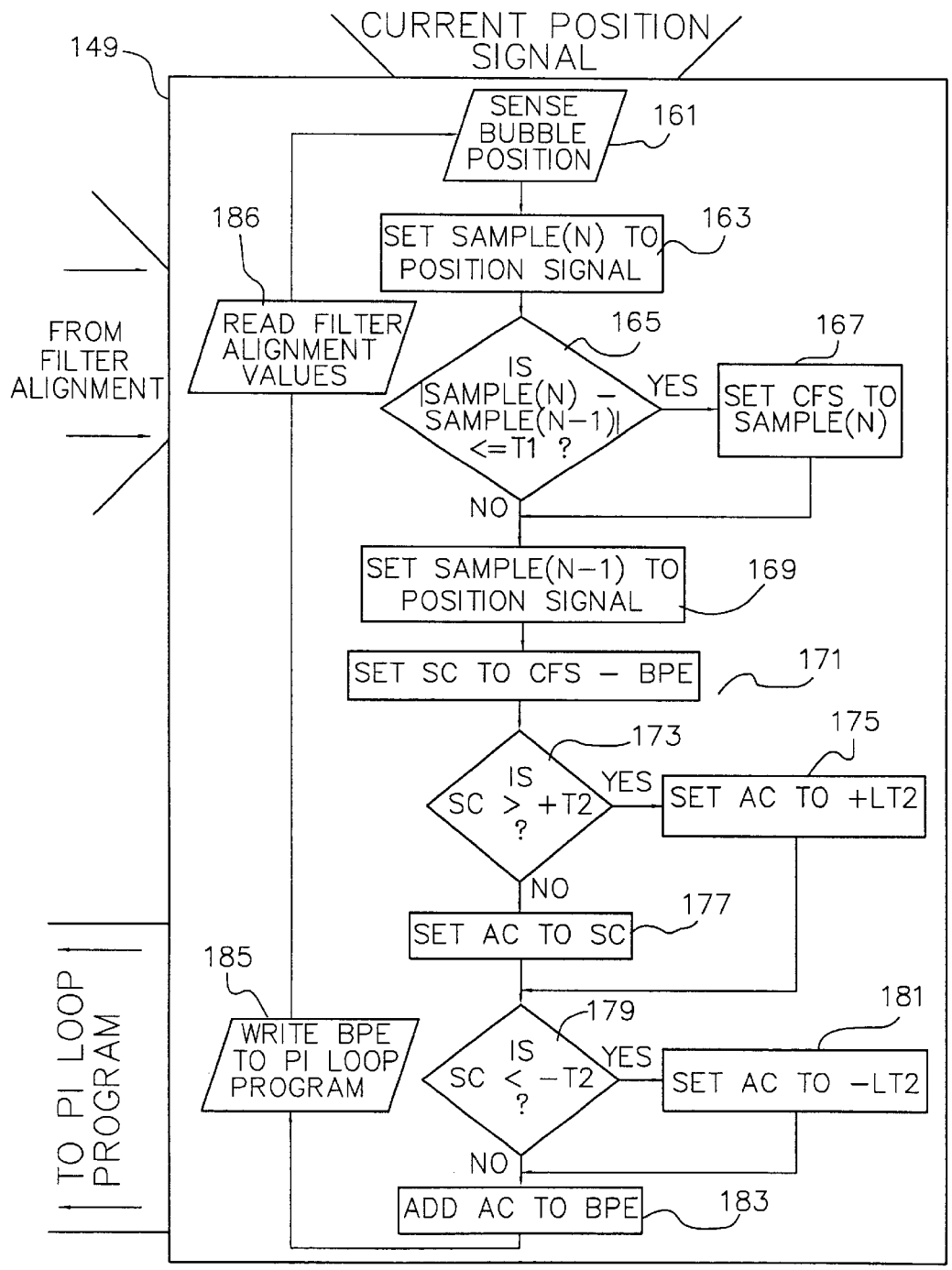
FIG. 8A is a flow chart of the preferred filtering process applied to the current position signal generated by the acoustic transducer.

FIG. 8A is a flowchart of the preferred filtering process applied to CURRENT POSITION signal generated by the acoustic transducer. The digitized CURRENT POSITION signal is provided from analog to digital converter 141 to software filter 149. The program reads the CURRENT POSITION signal in step 161. Then, the software filter 149 sets SAMPLE (N) to the position signal.

In step 165, the absolute value of the difference between CURRENT POSITION (SAMPLE (N)) and the previous sample (SAMPLE (N–1)) is compared to a first threshold. If the absolute value of the difference between the current sample and the previous sample is less than first threshold T1, the value of SAMPLE (N) is set to CFS, the current filtered sample, in step 167. If the absolute value of the difference between the current sample and the previous sample exceeds first threshold T1, in step 169, the CURRENT POSITION signal is disregarded, and the previous position signal SAMPLE (N–1) is substituted in its place.

Then, in step 171, the suggested change SC is calculated, by determining the difference between the current filtered sample CFS and the best position estimate BPE. In step 173, the suggested change SC which was calculated in step 171 is compared to positive T2, which is the maximum limit on the rate of change. If the suggested change is within the maximum limit allowed, in step 177, allowed change AC is set to the suggested change SC value. If, however, in step 173, the suggested change exceeds the maximum limit allowed on the rate of change, in step 175, the allowed change is set to +LT2, a default value for allowed change.

In step 179, the suggested change SC is compared to the negative limit for allowable rates of change, negative T2. If the suggested change SC is greater than the maximum limit on negative change, in step 181, allowed change AC is set to negative –LT2, a default value for negative change. However, if in step 179 it is determined that suggested change SC is within the maximum limit allowed on negative change, in step 183, the allowed change AC is added to the current best position estimate BPE, in step 183. Finally, in step 185, the newly calculated best position estimate BPE is written to the PI loop program.

Software filter 149 is a two stage filter which first screens the CURRENT POSITION signal by comparing the amount of change, either positive or negative, to threshold T1. If the CURRENT POSITION signal, as compared to the preceding position signal exceeds the threshold of T1, the current position signal is discarded, and the previous position signal (SAMPLE (N–1)) is used instead. At the end of the first stage, in step 171, a suggested change SC value is derived by subtracting the best position estimate BPE from the current filtered sample CFS.

In the second stage of filtering, the suggested change SC value is compared to positive and negative change thresholds (in steps 173 and 179). If the positive or negative change thresholds are violated, the allowable change is set to a preselected value, either +LT2, or −LT2. Of course, if the suggested change SC is within the limits set by positive T2 and negative T2, then the allowable change AC is set to the suggested change SC.

The operation of software filter 149 may also be understood with reference to FIG. 8B. In the graph of FIG. 8B, the y-axis represents the signal level, and the x-axis represents time. The signal as sensed by acoustic transducer 79 is designated as input, and shown in the solid line. The operation of the first stage of the software filter 149 is depicted by the current filtered sample CFS, which is shown in the graph by cross-marks. As shown, the current filtered sample CFS operates to ignore large positive or negative changes in the position signal, and will only change when the position signal seems to have stabilized for a short interval. Therefore, when changes occur in the current filtered sample CFS, they occur in a plateau-like manner.

In stage two of the software filter 149, the current filtered sample CFS is compared to the best position estimate BPE, to derive a suggested change SC value. The suggested SC is then compared to positive and negative thresholds to calculate an allowable change AC which is then added to the best position estimate BPE. FIG. 8B shows that the best position estimate BPE signal only gradually changes in response to an upward drift in the POSITION SIGNAL. The software filtering system 149 of the present invention renders the control apparatus relatively unaffected by random noise, but capable of tracking the more "gradual" changes in bubble position.

Experimentation has revealed that the software filtering system of the present invention operates best when the position of extruded film tube 81 is sampled between 20 to 30 times per second. At this sampling rate, one is less likely to incorrectly identify noise as a change in circumference of extruded film tube 81. The preferred sampling rate accounts for the common noise signals encountered in blown film extrusion liner.

Optional thresholds have also been derived through experimentation. In the first stage of filtering, threshold T1 is established as roughly one percent of the operating range of acoustic transducer 79, which in the preferred embodiment is twenty-one meters (24 inches less 3 inches). In the second stage of filter, thresholds +LT2 and −LT2 are established as roughly 0.30% of the operating range of acoustic transducer 79.

Figure 9:
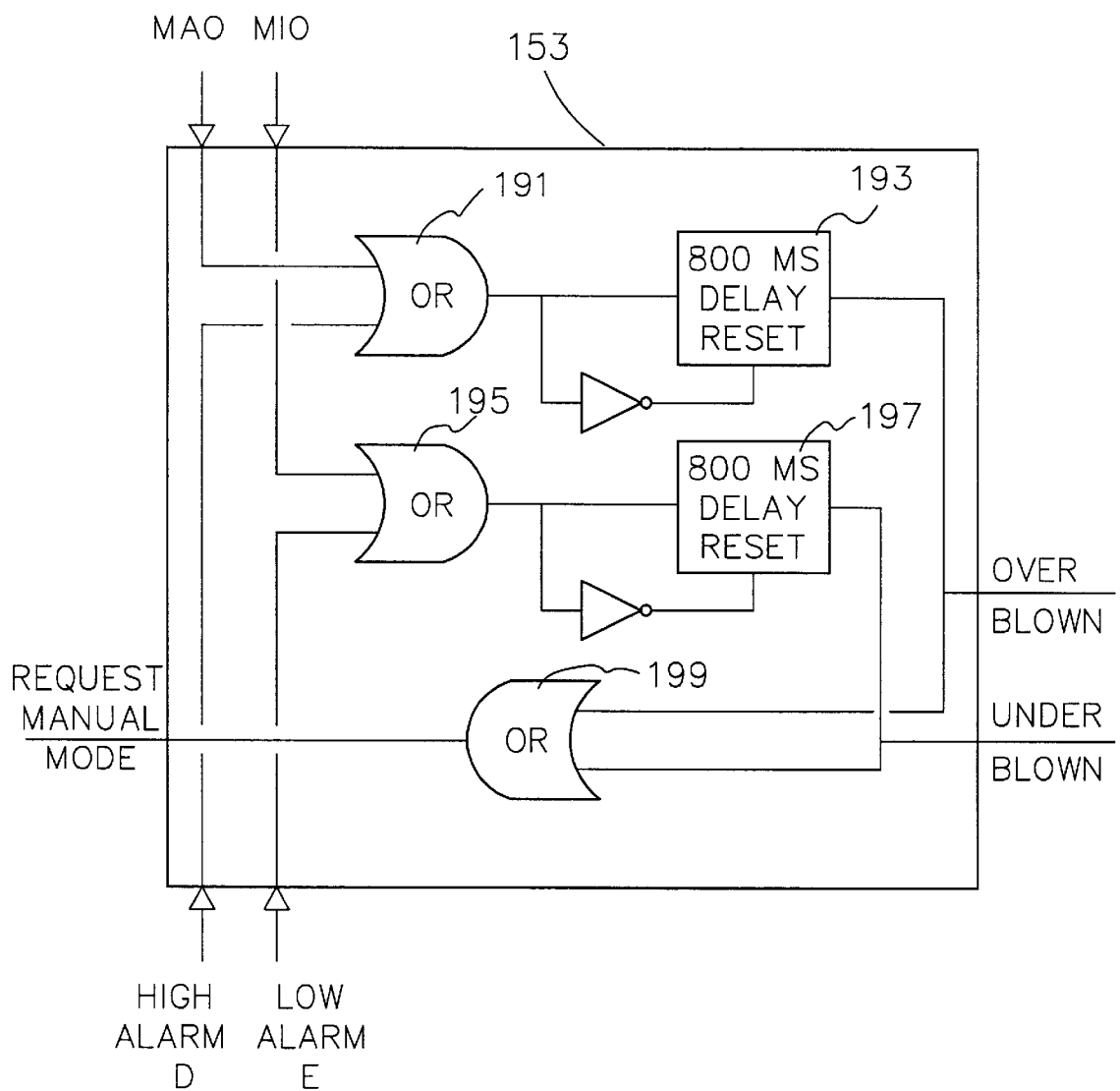
FIG. 9 is a schematic representation of the automatic sizing and recovery logic (ASRL) of FIG. 6.

FIG. 9 is a schematic representation of the automatic sizing and recovery logic ASRL of supervisory control unit 75. As stated above, this figure is a hardware representation of a software routine. ASRL 153 is provided to accommodate the many momentary false indications of maximum and minimum circumference violations which may be registered due to noise, such as the noise created due to air flow between acoustic transducer 79 and extruded film tube 81. The input from maximum alarm override MAO is "ored" with high alarm D, from the PI loop program, at "or" operator 191. High alarm D is the signal generated by the program in supervisory control unit 75 when the circumference of extruded film tube 81 exceeds threshold D of FIG. 7A. If a maximum override MAO signal exists, or if a high alarm condition D exists, the output of "or" operator 191 goes high, and actuates delay timer 193.

Likewise, minimum override MIO signal is "ored" at "or" operator 195 with low alarm E. If a minimum override signal is present, or if a low alarm condition E exists, the output of "or" operator 195 goes high, and is directed to delay timer 197. Delay timers 193, 197 are provided to prevent an alarm condition unless the condition is held for 800 milliseconds continuously. Every time the input of delay timers 193, 197 goes low, the timer resets and starts from 0. This mechanism eliminates many false alarms.

If an alarm condition is held for 800 milliseconds continuously, an OVERBLOWN or UNDERBLOWN signal is generated, and directed to the health state logic 151. Detected overblown or underblown conditions are "ored" at "or" operator 199 to provide a REQUEST MANUAL MODE signal which is directed to loop mode control logic 155.

Figure 10:
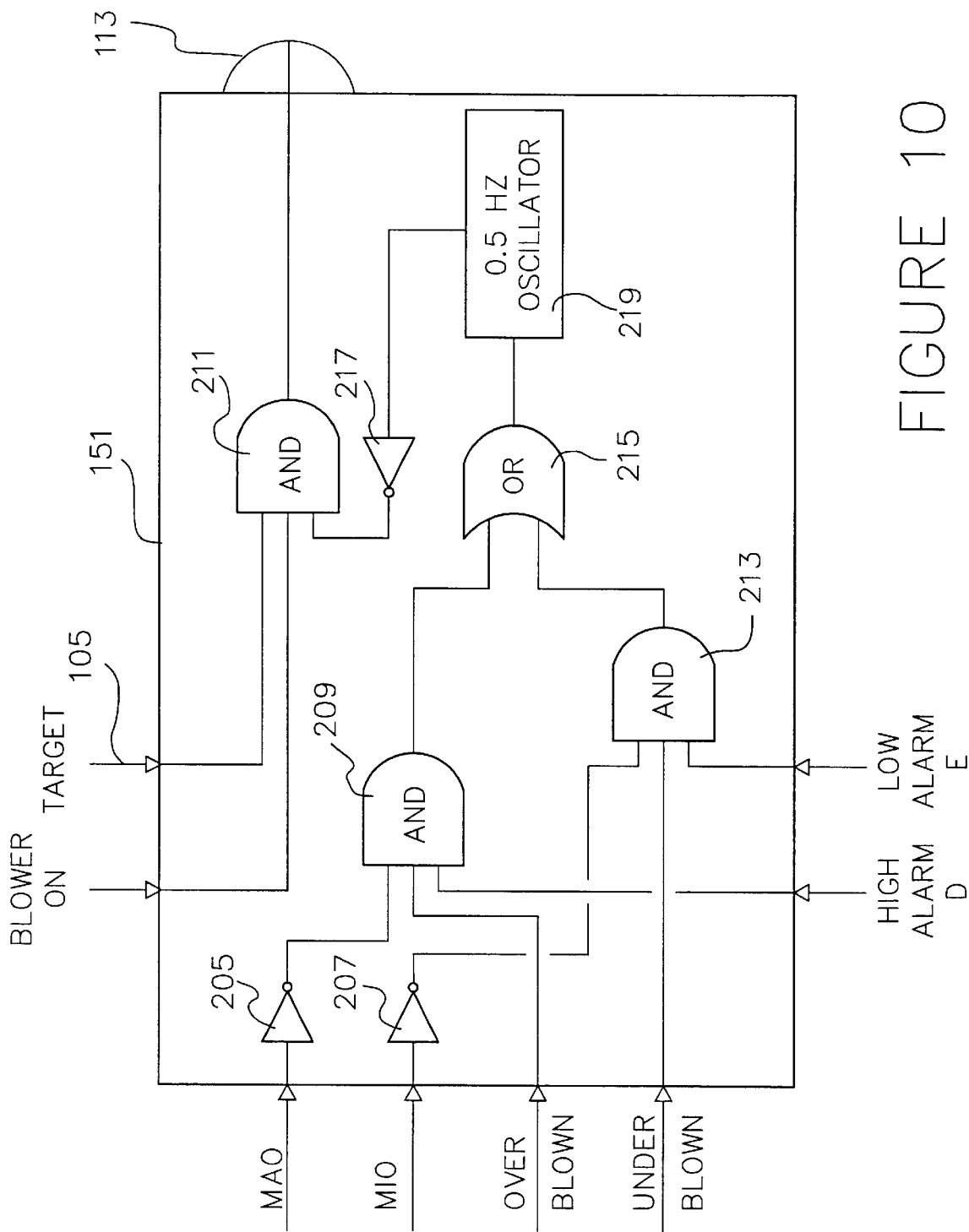
FIG. 10 is a schematic representation of the health/state logic (HSL) of FIG. 6.

FIG. 10 is a schematic representation of the health-state logic 151 of FIG. 6. The purpose of this logic is to control the target indicator 113 of operator control panel 137. When in non-error operation, the target indicator 113 is on if the blower is on, and the TARGET PRESENT signal from digital output 105 is high. When an error is sensed in the maximum override MAO or minimum override MIO lines, the target indicator 113 will flash on and off in one half second intervals.

In health-state logic HSL 151, the maximum override signal MAO is inverted at inverter 205. Likewise, the minimum override signal is inverted at inverter 207.

"And" operator 209 serves to "and" the inverted maximum override signal MAO, with the OVERBLOWN signal, and high alarm signal D. A high output from "and" operator 209 indicates that something is wrong with the calibration of acoustic transducer 79.

Likewise, "and" operator 213 serves to "and" the inverted minimum override signal MIO, with the OVERBLOWN signal, and low alarm signal E. If the output of "and" operator 213 is high, something is wrong with the calibration of acoustic transducer 79. The outputs from "and" operators 209, 213 are combined in "or" operator 215 to indicate an error with either the maximum or minimum override detection systems. The output of "or" operator 215 is channeled through oscillator 219, and inverted at inverter 217. "And" operator 211 serves to "and" the TARGET PRESENT signal, blower signal, and inverted error signal from "or" operator 215. The output of "and" operator of 211 is connected to target indicator 113.

If acoustic transducer 79 is properly calibrated, the target is within range and normal to the sonic pulses, and the blower is on, target indicator 113 will be on. If the target is within range and normal to the sonic pulses, the blower is on, but acoustic transducer 79 is out of calibration, target indicator 113 will be on, but will be blinking. The blinking signal indicates that acoustic transducer 79, and in particular transducer electronics 93, must be recalibrated.

Figure 11:
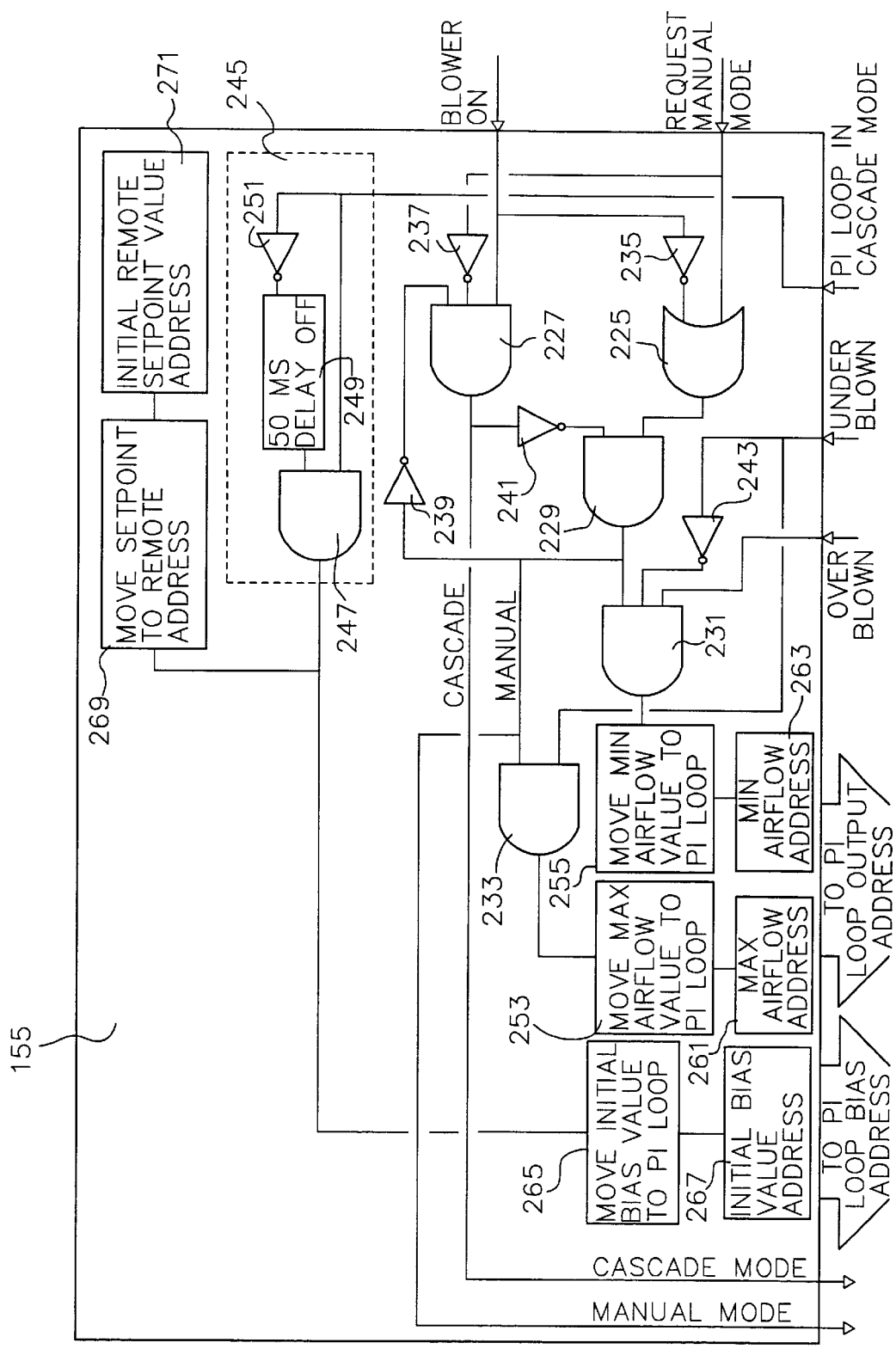
FIG. 11 is a schematic representation of the loop mode control logic (LMCL) of FIG. 6.

FIG. 11 is a schematic representation of loop mode control logic LMCL of FIG. 6. The purpose of this software module is coordinate the transition in modes of operation. Specifically, this software module coordinates automatic startup of the blown film extrusion process, as well as changes in mode between an automated "cascade" mode and a manual mode, which is the required mode of the PI controller to enable under and overblown conditions of the extruded film tube 81 circumference. The plurality of input signals are provided to loop mode control logic 155, including: BLOWER ON, REQUEST MANUAL MODE, PI LOOP IN CASCADE MODE, UNDERBLOWN and OVERBLOWN. Loop mode control logic LMCL 155 provides two output signals: MANUAL MODE, and CASCADE MODE.

FIG. 11 includes a plurality of digital logic blocks which are representative of programming operations. "Or" operator 225 "ores" the inverted BLOWER ON SIGNAL to the REQUEST MANUAL MODE SIGNAL. "And" operator 227 "ands" the inverted REQUEST MANUAL MODE SIGNAL with an inverted MANUAL MODE SIGNAL, and the BLOWER ON SIGNAL. "And" operator 229 "ands" the REQUEST MANUAL MODE SIGNAL to the inverted CASCADE MODE SIGNAL. This prevents MANUAL MODE and CASCADE MODE from both being on at the same time. "And" operator 231 "ands" the MANUAL MODE SIGNAL, the inverted UNDERBLOWN SIGNAL, and the OVERBLOWN SIGNAL. "And" operator 233 "ands" the MANUAL MODE SIGNAL with the UNDERBLOWN SIGNAL. This causes the overblown condition to prevail in the event a malfunction causes both underblown and overblown conditions to be on. Inverters 235, 237, 239, 241, and 243 are provided to invert the inputted output signals of loop mode control logic 155 were needed. Software one-shot 245 is provided for providing a momentary response to a condition. Software one-shot 245 includes "and" operator 247, off-delay 249, and inverter 251.

The software of loop mode control logic 155 operates to ensure that the system is never in MANUAL MODE, and CASCADE MODE at the same time. When manual mode is requested by REQUEST MANUAL MODE, loop mode control logic 155 causes MANUAL MODE to go high. When manual mode is not requested, loop mode control logic 155 operates to cause CASCADE MODE to go high. MANUAL MODE and CASCADE MODE will never be high at the same time. Loop mode control logic 155 also serves to ensure that the system provides a "bumpless transfer" when mode changes occur. The term "cascade mode" is understood in the automation industries as referring to an automatic mode which will read an adjustable setpoint.

Loop mode control logic 155 will also allow for automatic startup of the blown film extrusion process. At startup, UNDERBLOWN SIGNAL is high, PI LOOP IN CASCADE MODE is low, BLOWER ON SIGNAL is high. These inputs (and inverted inputs) are combined at "and" operators 231, 233. At startup, "and" operator 233 actuates logic block 253 to move the maximum air flow value address to the PI loop step 261. At startup, the MANUAL MODE SIGNAL is high. For the PI loop controller of the preferred embodiment, when MANUAL MODE is high, the value contained in PI loop output address is automatically applied to proportional valve 125. This results in actuation of proportional valve 125 to allow maximum air flow to start the extruded film tube 81.

When extruded film tube 81 extends in size beyond the minimum threshold (C and D of FIG. 7A), the UNDERBLOWN SIGNAL goes low, and the PI LOOP IN CASCADE MODE signal goes high. This causes software one-shot 245 to trigger, causing logic blocks 265, 267 to push an initial bias value contained in a program address onto the PI loop. Simultaneously, logic blocks 269, 271 operate to place the selected setpoint value A onto volume-setpoint control logic VSCL 157. Thereafter, volume-setpoint control logic VSCL 157 alone serves to communicate changes in setpoint value A to PI loop program 147.

If an overblown or underblown condition is detected for a sufficiently long period of time, the controller will request a manual mode by causing REQUEST MANUAL MODE SIGNAL to go high. If REQUEST MANUAL MODE goes high, loop mode control logic LMCL 155 supervises the transfer through operation of the logic blocks.

Loop mode control logic LMCL 155 also serves to detected overblown and underblown conditions. If an overblown or underblown condition is detected by the control system, REQUEST MANUAL MODE goes high, and the appropriate OVERBLOWN or UNDERBLOWN signal goes high. The logic operators of loop mode control logic LMCL 155 operate to override the normal operation of the control system, and cause maximum or minimum air flow by putting the maximum air flow address 261 or minimum air flow address 263 to the PI output address. As stated above, when MANUAL MODE is high, these maximum or minimum air flow address values are outputted directly to proportional valve 125. Thus, when the extruded film tube 81 is overblown, loop mode control logic LMCL 155 operates to immediately cause proportional valve 125 to minimize air flow to extruded film tube 81. Conversely, if an underblown condition is detected, loop mode control logic LMCL 155 causes proportional valve 125 to immediately maximize air flow to extruded film tube 81.

Figure 12:
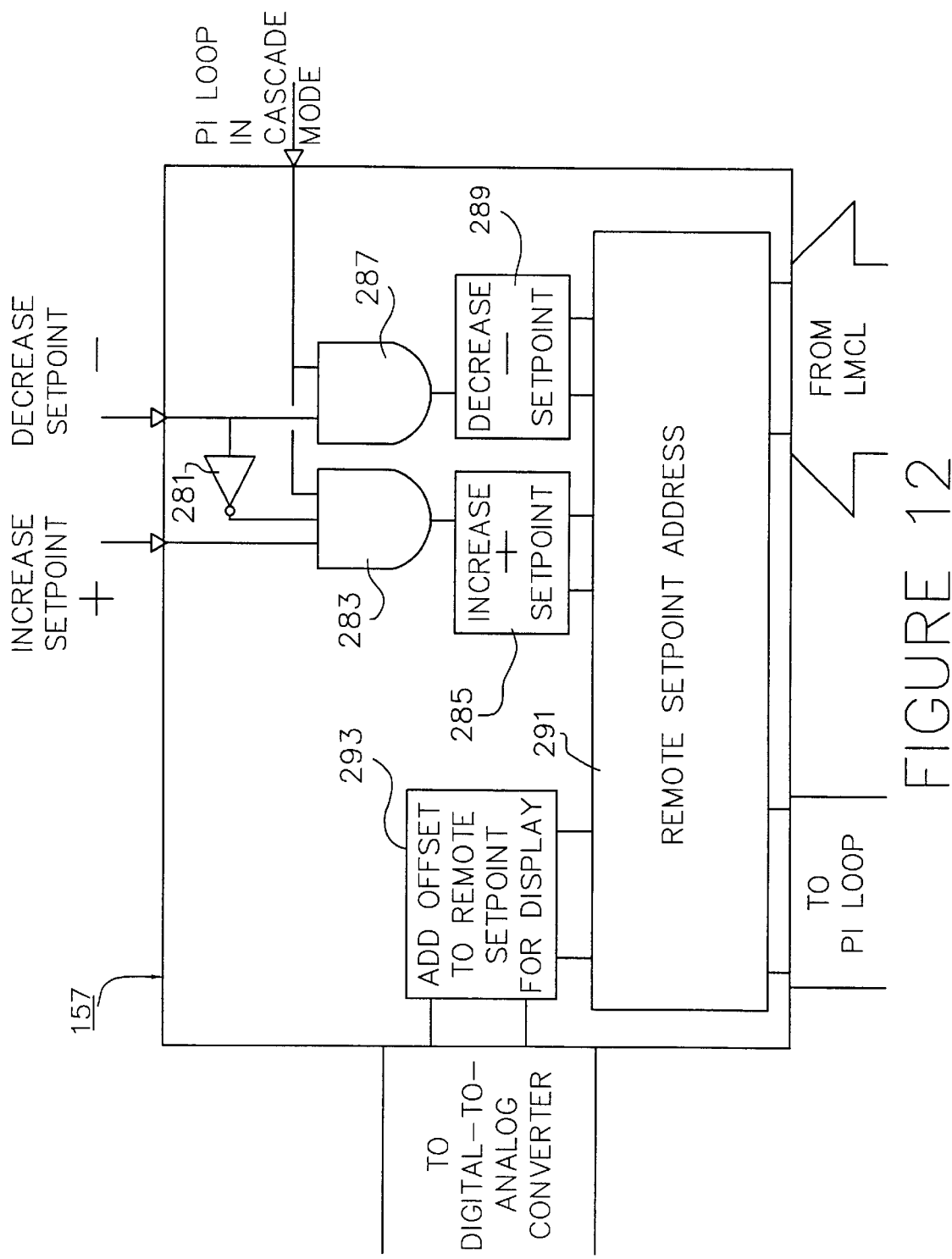
FIG. 12 is a schematic representation of the volume setpoint control logic (VSCL) of FIG. 6.

FIG. 12 depicts the operation of volume-setpoint control logic VSCL 157.

Volume setpoint control logic VSCL 157 operates to increase or decrease setpoint A in response to changes made by the operator at distance selector 111 of operator control panel 137, when the PI loop program 147 is in cascade mode, i.e. when PI LOOP IN CASCADE MODE signal is high. The INCREASE SETPOINT, DECREASE SETPOINT, and PI LOOP IN CASCADE MODE signals are logically combined at "and" operators 283, and 287. These "and" operators act on logic blocks 285, 289 to increase or decrease the setpoint contained in remote setpoint address 291. When the setpoint is either increased or decreased, logic block 293 operates to add the offset to the remote setpoint for display, and forwards the information to digital to analog converter 143, for display at setpoint display 109 of operator control panel 137. The revised remote setpoint address is then read by the PI loop program 147.

Figure 13:
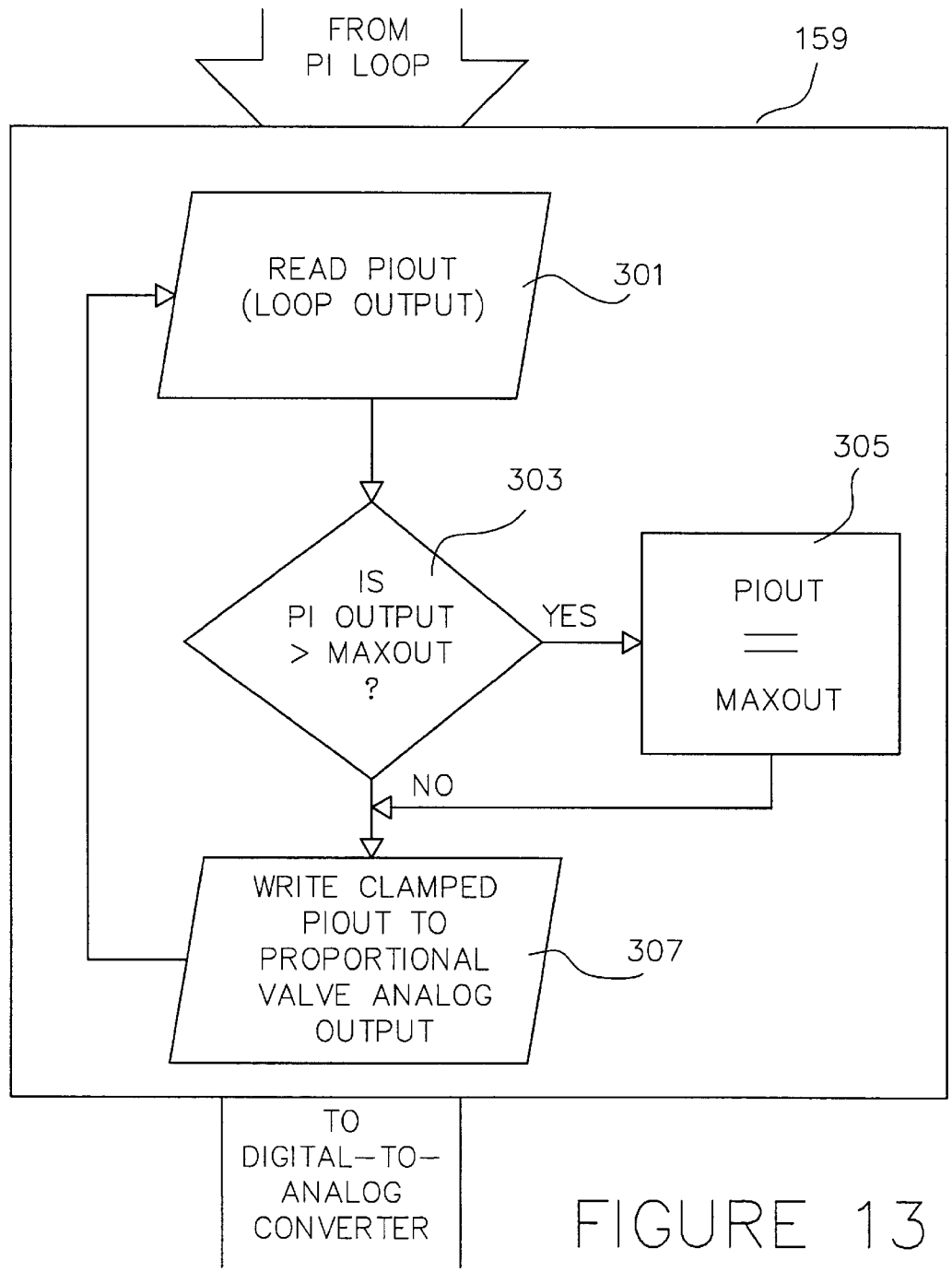
FIG. 13 is a flow chart representation of the output clamp of FIG. 6.

FIG. 13 is a flowchart drawing of output clamp 159. The purpose of this software routine is to make sure that the PI loop program 147 does not over drive the rotary valve 129 past a usable limit. Rotary valve 129 operates by moving a vane to selectively occlude stationary openings. If the moving vane is over driven, the rotary valve will begin to open when the PI loop calls for complete closure. In step 301, the output of the PI loop program 147 is read. In step 303, the output of PI loop is compared to a maximum output. If it exceeds the maximum output, the PI output is set to a predetermined maximum output in step 305. If the output of PI loop does not exceed the maximum output, in step 307, the clamped PI output is written to the proportional valve 125 through digital to analog converter 145.

Figure 14:
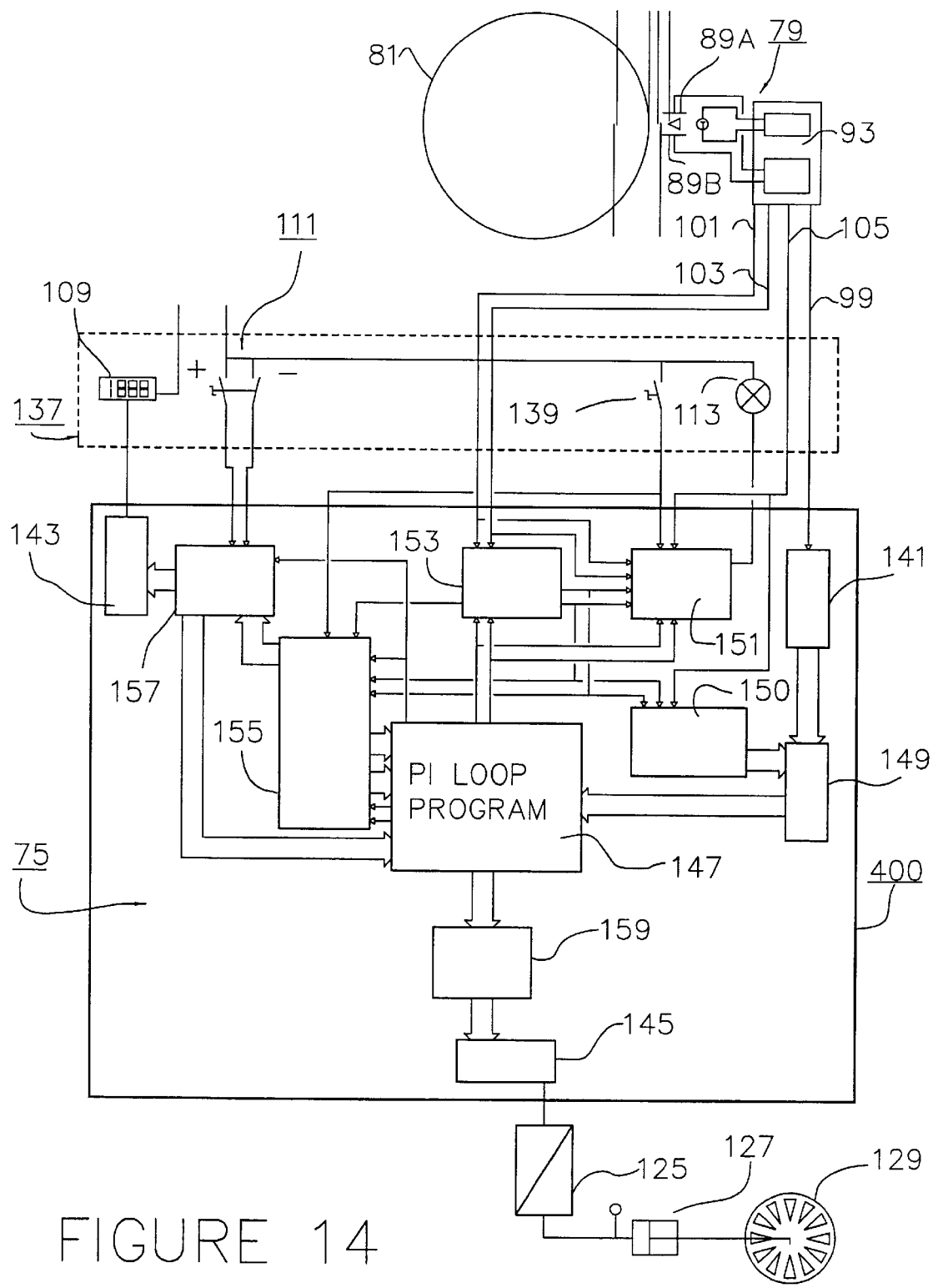
FIG. 14 is a schematic and block diagram, and flowchart views of the preferred alternative emergency condition control system of the present invention, which provides enhanced control capabilities for detected overblown and underblown conditions, as well as when the control system determines that the extruded film tube has passed out of range of the sensing transducer.

FIGS. 14, through 27 will be used to describe an alternative emergency condition control mode of operation which provides enhanced control capabilities, especially when an overblown or underblown condition is detected by the control system, or when the system indicates that the extruded film tube is out of range of the position-sensing transducer. In this alternative emergency condition control mode of operation, the valve of the estimated position is advanced to a preselected valve and a more rapid change in the estimated position signal is allowed than during previously discussed operating conditions, and is particularly useful when an overblown or underblown condition is detected. In the event the control system indicates that the extruded film tube is out of range of the sensing transducer, the improved control system supplies an estimated position which, in most situations, is a realistic estimation of the position of the extruded film tube relative to the sensing transducer, thus preventing false indications of the extruded film tube being out of range of the sensing transducer from adversely affecting the estimated position of the extruded film tube, greatly enhancing operation of the control system. In the event an overblown condition is detected, the improved control system supplies an estimated position which corresponds to the distance boundary established for detecting an overflow condition. In the event an underblown condition is detected, the improved control system supplies an estimated position which corresponds to the distance boundary established for detecting an underblown condition.

FIGS. 14, through 27 are a block diagram, schematic, and flowchart representation of the preferred embodiment of a control system which is equipped with the alternative emergency condition control mode of operation. FIGS. 25, 26, and 27 provide graphic examples of the operation of this alternative emergency condition control mode of operation.

FIG. 14 is a schematic and block diagram view of the preferred alternative control system 400 of the present invention of FIG. 5, with special emphasis on the supervisory control unit 75, and is identical in almost all respects to the supervisory control unit 75 which is depicted in FIG. 6; therefore, identical referenced numerals are used to identify the various components of alternative control system 400 of FIG. 14 as are used in the control system depicted in FIG. 6.

Extruded film tube 81 is shown in cross-section with ultrasonic sensor 89 adjacent its outer wall. Ultrasonic sensor 89 emits interrogating pulses which are bounced off of extruded film tube and sensed by ultrasonic sensor 89. The time delay between transmission and reception of the interrogating pulse is processed by transducer electronics 93 to produce four outputs: CURRENT POSITION signal which is provided to supervisory control unit 75 via analog output conductor 99, digital TARGET PRESENT signal which is provided over digital output 105, a minimum override signal (MIO signal) indicative of a collapsing or undersized bubble which is provided over digital output conductor 103, and maximum override signal (MAO signal) indicative of an overblown extruded film tube 81 which is provided over a digital output conductor 101.

Figure 15:
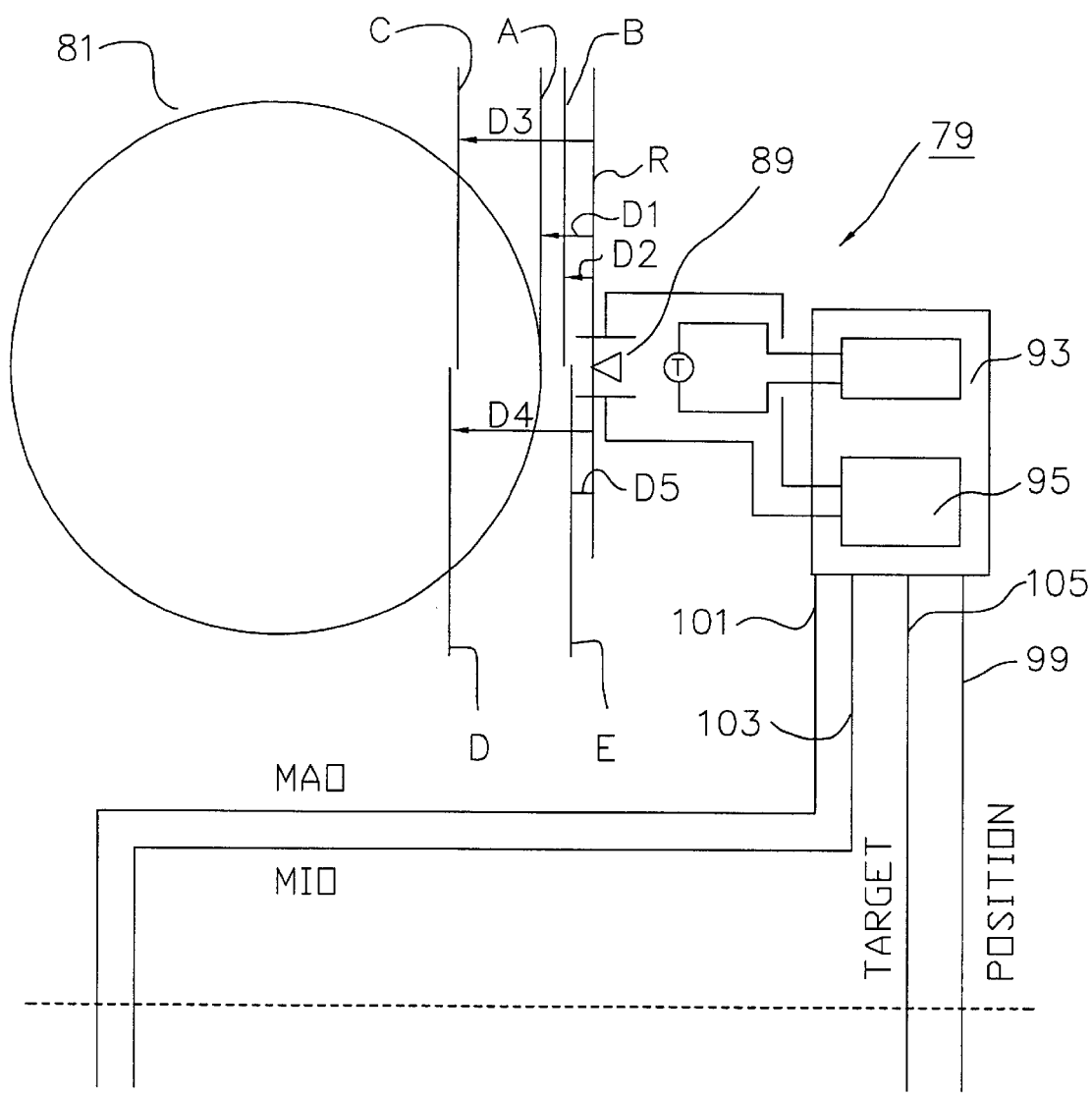
FIG. 15 is a schematic and block diagram view of the signals generated by the ultrasonic sensor which pertain to the position of the blown film layer.

As shown in FIG. 14, the position of extruded film tube 81 relative to ultrasonic sensor 89 is analyzed and controlled with reference to a number of distance thresholds and setpoints, which are shown in greater detail in FIG. 15. All set points and thresholds represent distances from reference R. The control system of the present invention attempts to maintain extruded film tube 81 at a circumference which places the wall of extruded film tube 81 at a tangent to the line established by reference A. The distance between reference R and set point A may be selected by the user through distance selector 111. This allows the user to control the distance between ultrasonic sensor 89 and extruded film tube 81.

The operating range of acoustic transducer 79 is configurable by the user with settings made in transducer electronics 93. In the preferred embodiment, using the Massa Products transducer, the range of operation of acoustic transducer 79 is between 3 to 24 inches. Therefore, the user may select a minimum circumference threshold C and a maximum circumference threshold B, below and above which an error signal is generated. Minimum circumference threshold C may be set by the user at a distance d3 from reference R. Maximum circumference threshold B may be selected by the user to be a distance d2 from reference R. In the preferred embodiment, setpoint A is set a distance of 7 inches from reference R. Minimum circumference threshold C is set a distance of 10.8125 inches from reference R. Maximum circumference threshold B is set a distance of 4.1 inches from reference R. Transducer electronics 93 allows the user to set or adjust these distances at will provided they are established within the range of operation of acoustic transducer 79, which is between 3 and 24 inches.

Besides providing an analog indication of the distance between ultrasonic sensors 89 and extruded film tube 81, transducer electronics 93 also produces three digital signals which provide information pertaining to the position of extruded film tube 81. If extruded film tube 81 is substantially normal and within the operating range of ultrasonic sensor 89, a digital "1" is provided at digital output 105. The signal is representative of a TARGET PRESENT signal. If extruded film tube 81 is not within the operating range of ultrasonic sensor 89 or if a return pulse is not received due to curvature of extruded film tube 81, TARGET PRESENT signal of digital output 105 is low. As discussed above, digital output 103 is a minimum override signal MIO. If extruded film tube 81 is smaller in circumference than the reference established by threshold C, minimum override signal MIO of digital output 103 is high. Conversely, if circumference of extruded film tube 81 is greater than the reference established by threshold C, the minimum override signal MIO is low.

Digital output 101 is for a maximum override signal MAO. If extruded film tube 81 is greater than the reference established by threshold B, the maximum override signal MAO is high. Conversely, if the circumference of extruded film tube 81 is less than the reference established by threshold B, the output of maximum override signal MAO is low.

The minimum override signal MIO will stay high as long as extruded film tube 81 has a circumference less than that established by threshold C. Likewise, the maximum override signal MAO will remain high for as long as the circumference of extruded film tube 81 remains larger than the reference established by threshold B.

Threshold D and threshold E are also depicted in FIG. 15. Threshold D is established at a distance d4 from reference R. Threshold E is established at a distance d5 from reference R. Thresholds D and E are established by supervisory control unit 75, not by acoustic transducer 79. Threshold D represents a minimum circumference threshold for extruded film tube 81 which differs from that established by transducer electronics 93. Likewise, threshold E corresponds to a maximum circumference threshold which differs from that established by acoustic transducer 79. Thresholds D and E are established in the software of supervisory control unit 75, and provide a redundancy of control, and also minimize the possibility of user error, since these threshold are established in software, and cannot be easily changed or accidentally changed. The coordination of all of these thresholds will be discussed in greater detail below. In the preferred embodiment, threshold C is established at 10.8125 inches from reference R. Threshold E is established at 3.6 inches from reference R.

Figure 16:
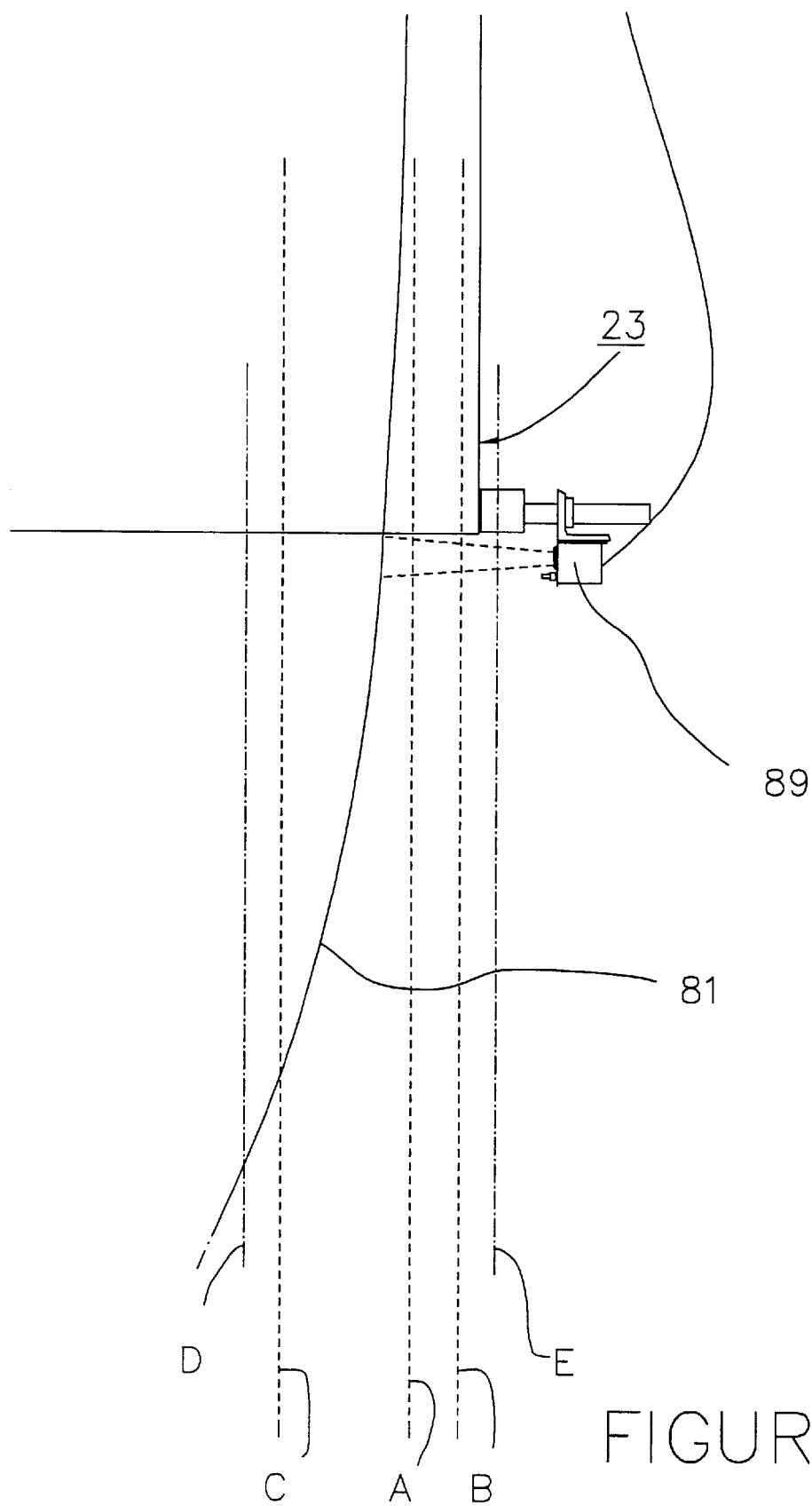
FIG. 16 is a view of the ultrasonic sensor of FIG. 3 coupled to the sizing cage of the blown film tower, with permissible extruded film tube operating ranges indicated thereon.

FIG. 16 is a side view of the ultrasonic sensor 89 coupled to sizing cage 23 of the blown film tower 13, with permissible extruded film tube 81 operating ranges indicated thereon. Setpoint A is the desired distance between ultrasonic sensor 89 and extruded film tube 81. Thresholds D and C are established at selected distances inward from ultrasonic sensor 89, and represent minimum circumference thresholds for extruded film tube 81. Thresholds B and E are established at selected distances from setpoint A, and establish separate maximum circumference thresholds for extruded film tube 81. As shown in FIG. 16, extruded film tube 81 is not at setpoint A. Therefore, additional air must be supplied to the interior of extruded film tube 81 to expand the extruded film tube 81 to the desired circumference established by setpoint A.

If extruded film tube 81 were to collapse, two separate alarm conditions would be registered. One alarm condition will be established when extruded film tube 81 falls below threshold C. A second and separate alarm condition will be established when extruded film tube 81 falls below threshold D. Extruded film tube 81 may also become overblown. In an overblown condition, two separate alarm conditions are possible. When extruded film tube 81 expands beyond threshold B, an alarm condition is registered. When extruded film tube 81 expands further to extend beyond threshold E, a separate alarm condition is registered.

As discussed above, thresholds C and B are subject to user adjustment through settings in transducer electronics 93. In contrast, thresholds D and E are set in computer code of supervisory control unit 75, and are not easily adjusted. This redundancy in control guards against accidental or intentional missetting of the threshold conditions at transducer electronics 93. The system also guards against the possibility of equipment failure in transducer 79, or gradual drift in the threshold settings due to deterioration, or overheating of the electronic components contained in transducer electronics 93.

Returning now to FIG. 14, operator control panel 137 and supervisory control unit 75 will be described in greater detail. Operator control panel 137 includes setpoint display 109, which serves to display the distance d1 between reference R and setpoint A. Setpoint display 109 includes a 7 segment display. Distance selector 111 is used to adjust setpoint A. Holding the switch to the "+" position increases the circumference of extruded film tube 81 by decreasing distance d1 between setpoint A and reference R. Holding the switch to the "−" position decreases the diameter of extruded film tube 81 by increasing the distance between reference R and setpoint A.

Target indicator 113 is a target light which displays information pertaining to whether extruded film tube 81 is within range of ultrasonic transducer 89, whether an echo is received at ultrasonic transducer 89, and whether any error condition has occurred. Blower switch 139 is also provided in operator control panel 137 to allow the operator to selectively disconnect the blower from the control unit. As shown in FIG. 14, all these components of operator control panel 137 are electrically coupled to supervisory control unit 75.

Supervisory control unit 75 responds to the information provided by acoustic transducer 79, and operator control panel 137 to actuate proportional valve 125. Proportional valve 125 in turn acts upon pneumatic cylinder 127 to rotate rotary valve 129 to control the air flow to the interior of extruded film tube 81.

With the exception of analog to digital converter 141, digital to analog converter 143, and digital to analog converter 145 (which are hardware items), supervisory control unit 75 is a graphic representation of computer software resident in memory of supervisory control unit 75. In one embodiment, supervisory control unit 75 comprises an industrial controller, preferably a Texas Instrument brand industrial controller Model No. PM550. Therefore, supervisory control unit 75 is essentially a relatively low-powered computer which is dedicated to a particular piece of machinery for monitoring and controlling. In the preferred embodiment, supervisory control unit 75 serves to monitor many other operations of blown film extrusion line 11. The gauging and control of the circumference of extruded film tube 81 through computer software is one additional function which is "piggybacked" onto the industrial controller. Alternately, it is possible to provide an industrial controller or microcomputer which is dedicated to the monitoring and control of the extruded film tube 81. Of course, dedicating a microprocessor to this task is a rather expensive alternative.

For purposes of clarity and simplification of description, the operation of the computer program in supervisory control unit 75 have been segregated into operational blocks, and presented as an amalgamation of digital hardware blocks. In the preferred embodiment, these software subcomponents include: software filter 149, emergency condition control mode logic 150, health state logic 151, automatic sizing and recovery logic 153, loop mode control logic 155, volume setpoint control logic 157, and output clamp 159. These software modules interface with one another, and to PI loop program 147 of supervisory control unit 75. PI loop program is a software routine provided in the Texas Instruments' PM550 system. The proportional controller regulates a process by manipulating a control element through the feedback of a controlled output. The equation for the output of a PI controller is:

$$m = K^*e + K/T \int e \, dt + ms$$

In this equation:

m=controller output
K=controller gain
e=error
T=reset time
dt=differential time
ms=constant
$\int e \, dt$=integration of all previous errors When an error exists, it is summed (integrated) with all the previous errors, thereby increasing or decreasing the output of the PI controller (depending upon whether the error is positive or negative). Thus as the error term accumulates in the integral term, the output changes so as to eliminate the error.

CURRENT POSITION signal is provided by acoustic transducer 79 via analog output 99 to analog to digital converter 141, where the analog CURRENT POSITION signal is digitized. The digitized CURRENT POSITION signal is routed through software filter 149, and then to PI loop program 147. If the circumference of extruded film tube 81 needs to be adjusted, PI loop program 147 acts through output clamp 159 upon proportional valve 125 to adjust the quantity of air provided to the interior of extruded film tube 81.

Figure 17:
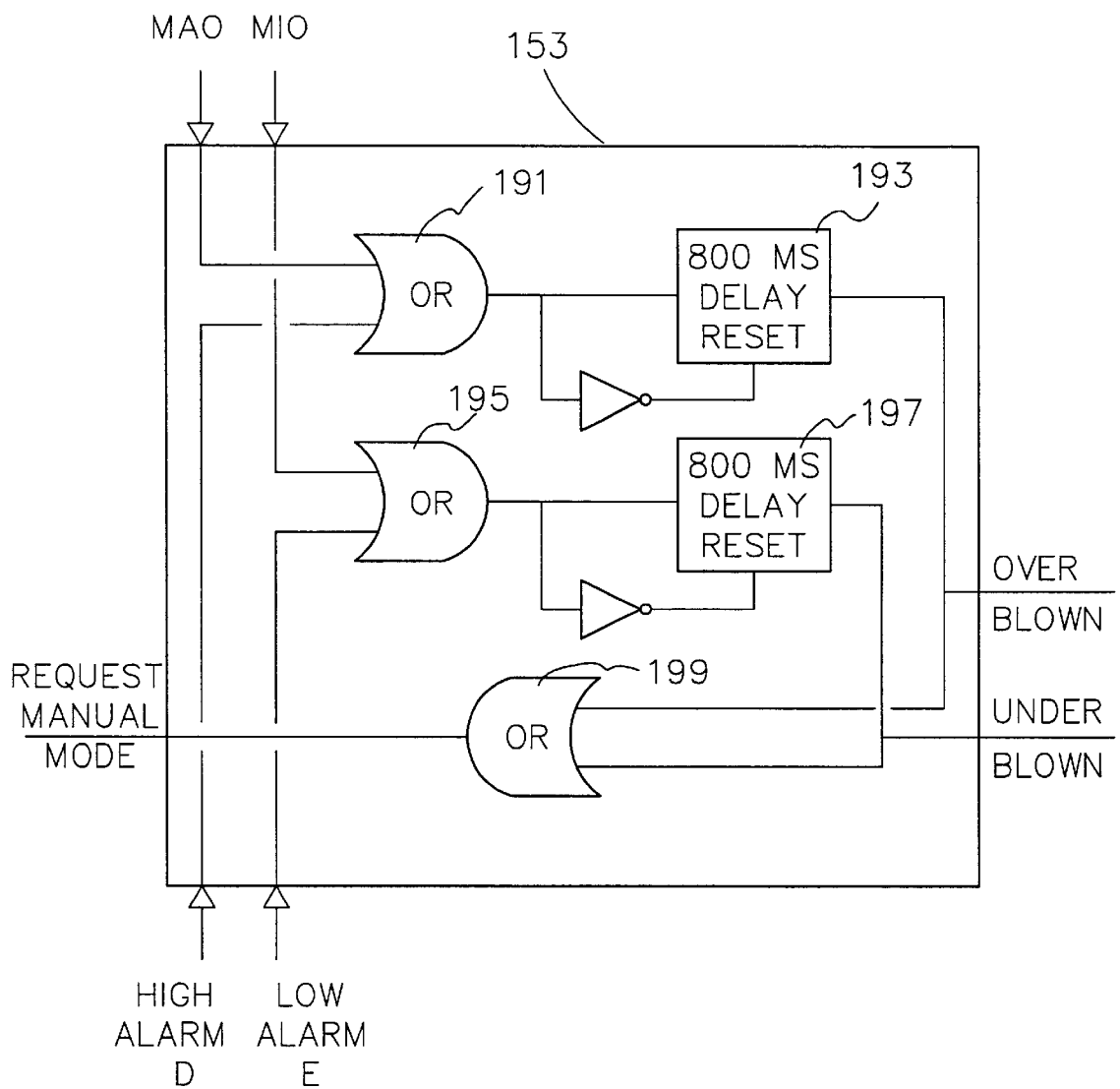
FIG. 17 is a schematic representation of the automatic sizing and recovery logic (ASRL) of FIG. 14.

FIG. 17 is a schematic representation of the automatic sizing and recovery logic ASRL of supervisory control unit 75. As stated above, this figure is a hardware representation of a software routine. ASRL 153 is provided to accommodate the many momentary false indications of maximum and minimum circumference violations which may be registered due to noise, such as the noise created due to air flow between acoustic transducer 79 and extruded film tube 81. The input from maximum alarm override MAO is "ored" with high alarm D, from the PI loop program, at "or" operator 191. High alarm D is the signal generated by the program in supervisory control unit 75 when the circumference of extruded film tube 81 exceeds threshold D of FIG. 15. If a maximum override MAO signal exists, or if a high alarm condition D exists, the output of "or" operator 191 goes high, and actuates delay timer 193.

Likewise, minimum override MIO signal is "ored" at "or" operator 195 with low alarm E. If a minimum override signal is present, or if a low alarm condition E exists, the output of "or" operator 195 goes high, and is directed to delay timer 197. Delay timers 193, 197 are provided to prevent an alarm condition unless the condition is held for 800 milliseconds continuously. Every time the input of delay timers 193, 197 goes low, the timer resets and starts from 0. This mechanism eliminates many false alarms.

If an alarm condition is held for 800 milliseconds continuously, an OVERBLOWN or UNDERBLOWN signal is generated, and directed to the health state logic 151. Detected overblown or underblown conditions are "ored" at "or" operator 199 to provide a REQUEST MANUAL MODE signal which is directed to loop mode control logic 155.

Figure 18:
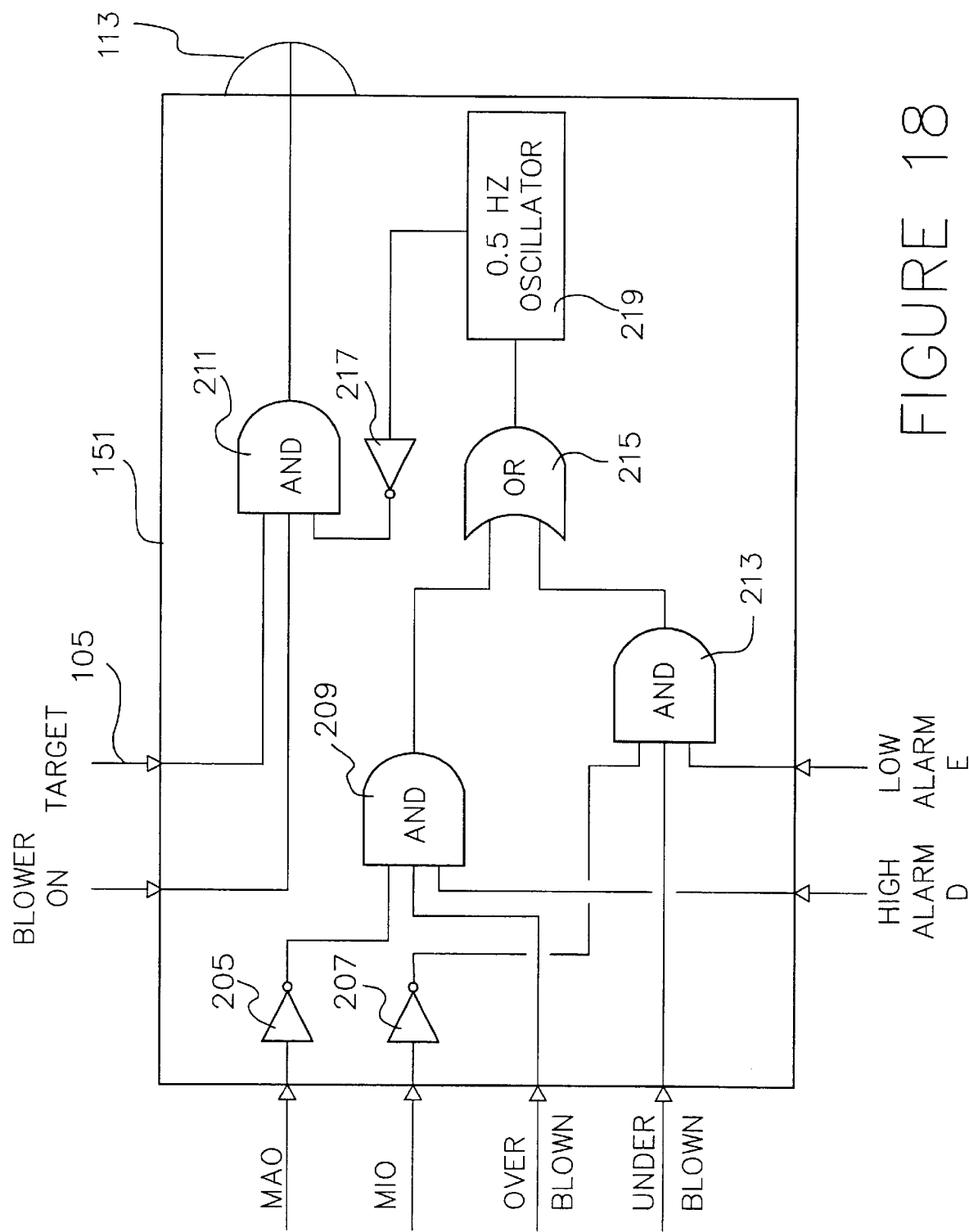
FIG. 18 is a schematic representation of the health/state logic (HSL) of FIG. 14.

FIG. 18 is a schematic representation of the health-state logic 151 of FIG. 14. The purpose of this logic is to control the target indicator 113 of operator control panel 137. When in non-error operation, the target indicator 113 is on if the blower is on, and the TARGET PRESENT signal from digital output 105 is high. When an error is sensed in the maximum override MAO or minimum override MIO lines, the target indicator 113 will flash on and off in one half second intervals.

In health-state logic HSL 151, the maximum override signal MAO is inverted at inverter 205. Likewise, the minimum override signal is inverted at inverter 207.

"And" operator 209 serves to "and" the inverted maximum override signal MAO, with the OVERBLOWN signal, and high alarm signal D. A high output from "and" operator 209 indicates that something is wrong with the calibration of acoustic transducer 79.

Likewise, "and" operator 213 serves to "and" the inverted minimum override signal MIO, with the OVERBLOWN signal, and low alarm signal E. If the output of "and" operator 213 is high, something is wrong with the calibration of acoustic transducer 79. The outputs from "and" operators 209, 213 are combined in "or" operator 215 to indicate an error with either the maximum or minimum override detection systems. The output of "or" operator 215 is channeled through oscillator 219, and inverted at inverter 217. "And" operator 211 serves to "and" the TARGET PRESENT signal, blower signal, and inverted error signal from "or" operator 215. The output of "and" operator of 211 is connected to target indicator 113.

If acoustic transducer 79 is properly calibrated, the target is within range and normal to the sonic pulses, and the blower is on, target indicator 113 will be on. If the target is within range and normal to the sonic pulses, the blower is on, but acoustic transducer 79 is out of calibration, target indicator 113 will be on, but will be blinking. The blinking signal indicates that acoustic transducer 79, and in particular transducer electronics 93, must be recalibrated.

Figure 19:
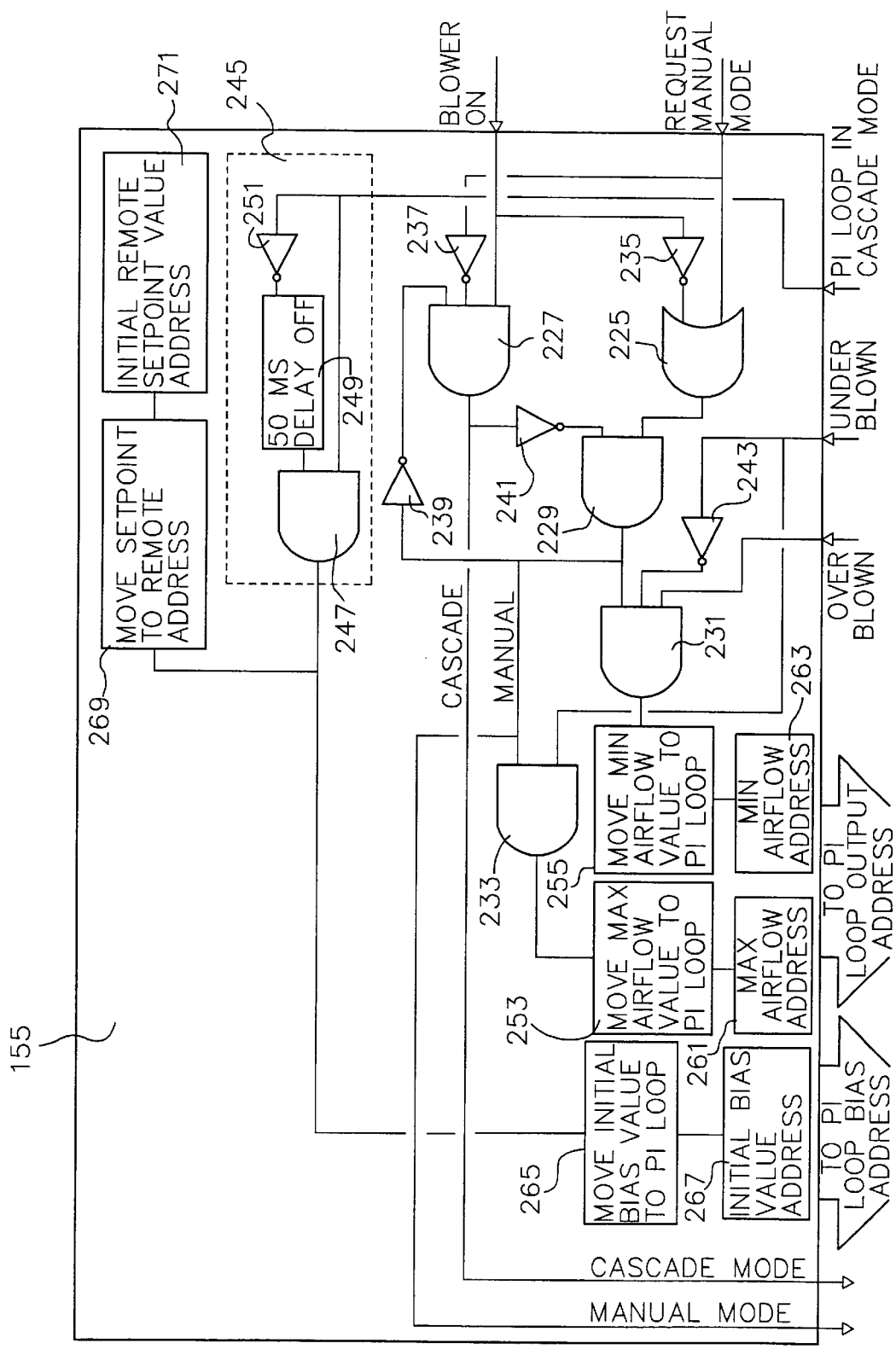
FIG. 19 is a schematic representation of the loop mode control logic (LMCL) of FIG. 14.

FIG. 19 is a schematic representation of loop mode control logic LMCL of FIG. 14. The purpose of this software module is coordinate the transition in modes of operation. Specifically, this software module coordinates automatic startup of the blown film extrusion process, as well as changes in mode between an automated "cascade" mode and a manual mode, which is the required mode of the PI controller to enable under and overblown conditions of the extruded film tube 81 circumference. The plurality of input signals are provided to loop mode control logic 155, including: BLOWER ON, REQUEST MANUAL MODE, PI LOOP IN CASCADE MODE, UNDERBLOWN and OVERBLOWN. Loop mode control logic LMCL 155 provides two output signals: MANUAL MODE, and CASCADE MODE.

FIG. 19 includes a plurality of digital logic blocks which are representative of programming operations. "Or" operator 225 "ores" the inverted BLOWER ON SIGNAL to the REQUEST MANUAL MODE SIGNAL. "And" operator 227 "ands" the inverted REQUEST MANUAL MODE SIGNAL with an inverted MANUAL MODE SIGNAL, and the BLOWER ON SIGNAL. "And" operator 229 "ands" the REQUEST MANUAL MODE SIGNAL to the inverted CASCADE MODE SIGNAL. This prevents MANUAL MODE and CASCADE MODE from both being on at the same time. "And" operator 231 "ands" the MANUAL MODE SIGNAL, the inverted UNDERBLOWN SIGNAL, and the OVERBLOWN SIGNAL. "And" operator 233 "ands" the MANUAL MODE SIGNAL with the UNDERBLOWN SIGNAL. This causes the overblown condition to prevail in the event a malfunction causes both underblown and overblown conditions to be on. Inverters 235, 237, 239, 241, and 243 are provided to invert the inputted output signals of loop mode control logic 155 were needed. Software one-shot 245 is provided for providing a momentary response to a condition. Software one-shot 245 includes "and" operator 247, off-delay 249, and inverter 251.

The software of loop mode control logic 155 operates to ensure that the system is never in MANUAL MODE, and CASCADE MODE at the same time. When manual mode is requested by REQUEST MANUAL MODE, loop mode control logic 155 causes MANUAL MODE to go high. When manual mode is not requested, loop mode control logic 155 operates to cause CASCADE MODE to go high. MANUAL MODE and CASCADE MODE will never be high at the same time. Loop mode control logic 155 also serves to ensure that the system provides a "bumpless transfer" when mode changes occur. The term "cascade mode" is understood in the automation industries as referring to an automatic mode which will read an adjustable setpoint.

Loop mode control logic 155 will also allow for automatic startup of the blown film extrusion process. At startup, UNDERBLOWN SIGNAL is high, PI LOOP IN CASCADE MODE is low, BLOWER ON SIGNAL is high. These inputs (and inverted inputs) are combined at "and" operators 231, 233. At startup, "and" operator 233 actuates logic block 253 to move the maximum air flow value address to the PI loop step 261. At startup, the MANUAL MODE SIGNAL is high. For the PI loop controller of the preferred embodiment, when MANUAL MODE is high, the value contained in PI loop output address is automatically applied to proportional valve 125. This results in actuation of proportional valve 125 to allow maximum air flow to start the extruded film tube 81.

When extruded film tube 81 extends in size beyond the minimum threshold (C and D of FIG. 15), the UNDERBLOWN SIGNAL goes low, and the PI LOOP IN CASCADE MODE signal goes high. This causes software one-shot 245 to trigger, causing logic blocks 265, 267 to push an initial bias value contained in a program address onto the PI loop. Simultaneously, logic blocks 269, 271 operate to place the selected setpoint value A onto volume-setpoint control logic VSCL 157. Thereafter, volume-setpoint control logic VSCL 157 alone serves to communicate changes in setpoint value A to PI loop program 147.

If an overblown or underblown condition is detected for a sufficiently long period of time, the controller will request a manual mode by causing REQUEST MANUAL MODE SIGNAL to go high. If REQUEST MANUAL MODE goes high, loop mode control logic LMCL 155 supervises the transfer through operation of the logic blocks.

Loop mode control logic LMCL 155 also serves to detected overblown and underblown conditions. If an overblown or underblown condition is detected by the control system, REQUEST MANUAL MODE goes high, and the appropriate OVERBLOWN or UNDERBLOWN signal goes high. The logic operators of loop mode control logic LMCL 155 operate to override the normal operation of the control system, and cause maximum or minimum air flow by putting the maximum air flow address 261 or minimum air flow address 263 to the PI output address. As stated above, when MANUAL MODE is high, these maximum or minimum air flow address values are outputted directly to proportional valve 125. Thus, when the extruded film tube 81 is overblown, loop mode control logic LMCL 155 operates to immediately cause proportional valve 125 to minimize airflow to extruded film tube 81. Conversely, if an underblown condition is detected, loop mode control logic LMCL 155 causes proportional valve 125 to immediately maximize air flow to extruded film tube 81.

Figure 20:
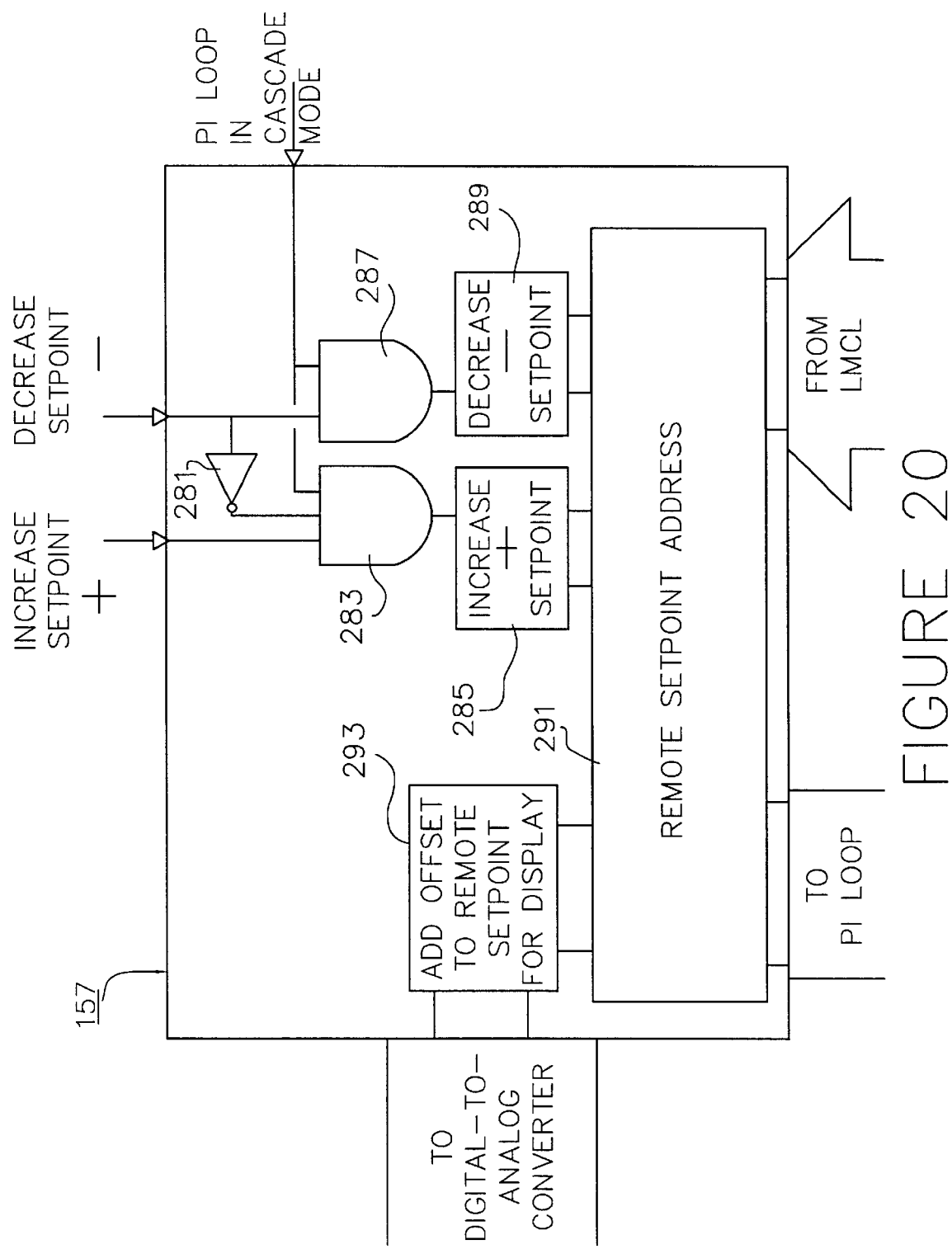
FIG. 20 is a schematic representation of the volume setpoint control logic (VSCL) of FIG. 14.

FIG. 20 depicts the operation of volume-setpoint control logic VSCL 157.

Volume setpoint control logic VSCL 157 operates to increase or decrease setpoint A in response to changes made by the operator at distance selector 111 of operator control panel 137, when the PI loop program 147 is in cascade mode, i.e. when PI LOOP IN CASCADE MODE signal is high. The INCREASE SETPOINT, DECREASE SETPOINT, and PI LOOP IN CASCADE MODE signals are logically combined at "and" operators 283, and 287. These "and" operators act on logic blocks 285, 289 to increase or decrease the setpoint contained in remote setpoint address 291. When the setpoint is either increased or decreased, logic block 293 operates to add the offset to the remote setpoint for display, and forwards the information to digital to analog converter 143, for display at setpoint display 109 of operator control panel 137. The revised remote setpoint address is then read by the PI loop program 147.

Figure 21:
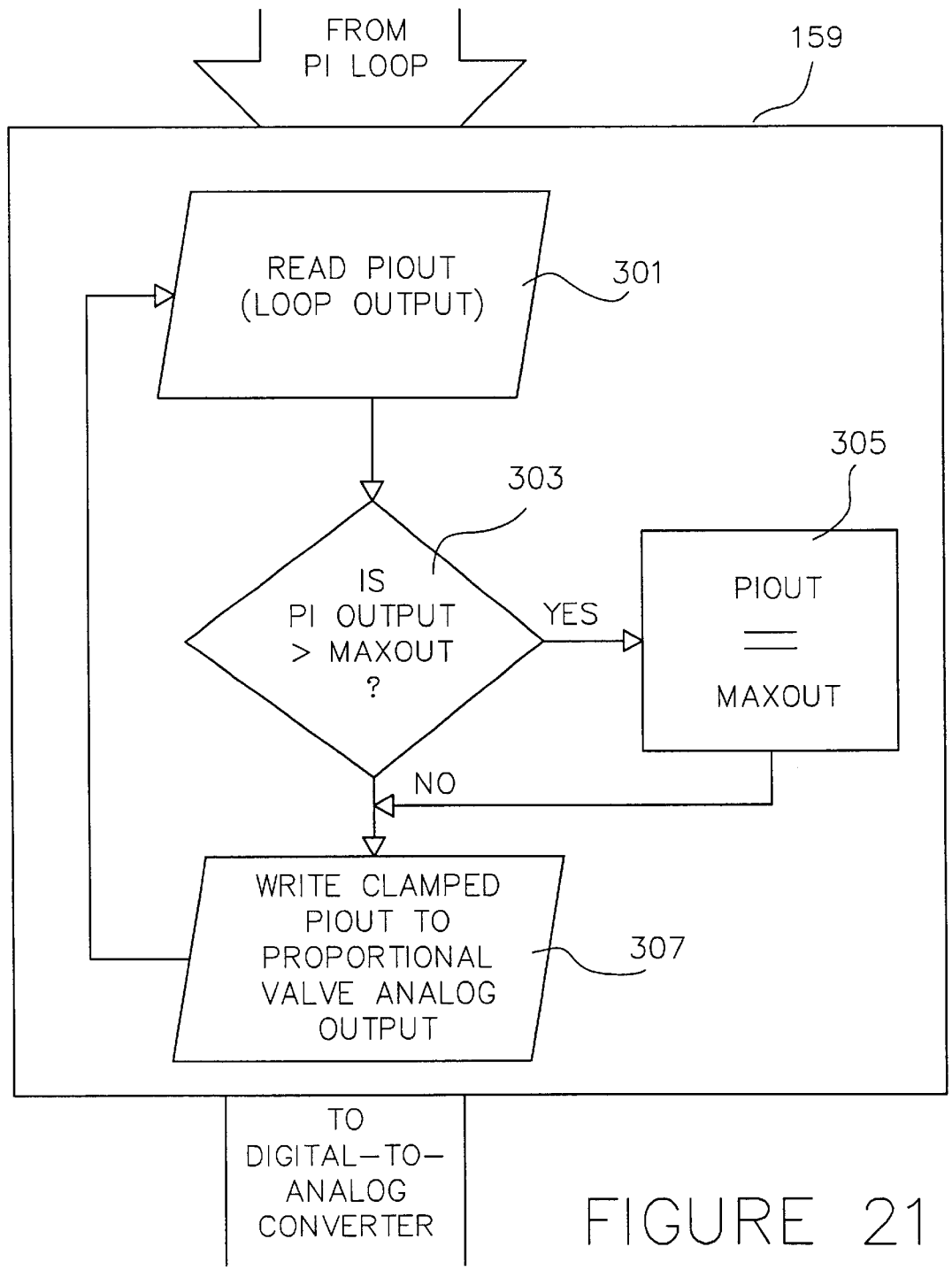
FIG. 21 is a flow chart representation of the output clamp of FIG. 14.

FIG. 21 is a flowchart drawing of output clamp 159. The purpose of this software routine is to make sure that the PI loop program 147 does not over drive the rotary valve 129 past a usable limit. Rotary valve 129 operates by moving a vane to selectively occlude stationary openings. If the moving vane is over driven, the rotary valve will begin to open when the PI loop calls for complete closure. In step 301, the output of the PI loop program 147 is read. In step 303, the output of PI loop is compared to a maximum output. If it exceeds the maximum output, the PI output is set to a predetermined maximum output in step 305. If the output of PI loop does not exceed the maximum output, in step 307, the clamped PI output is written to the proportional valve 125 through digital to analog converter 145.

Figure 22:
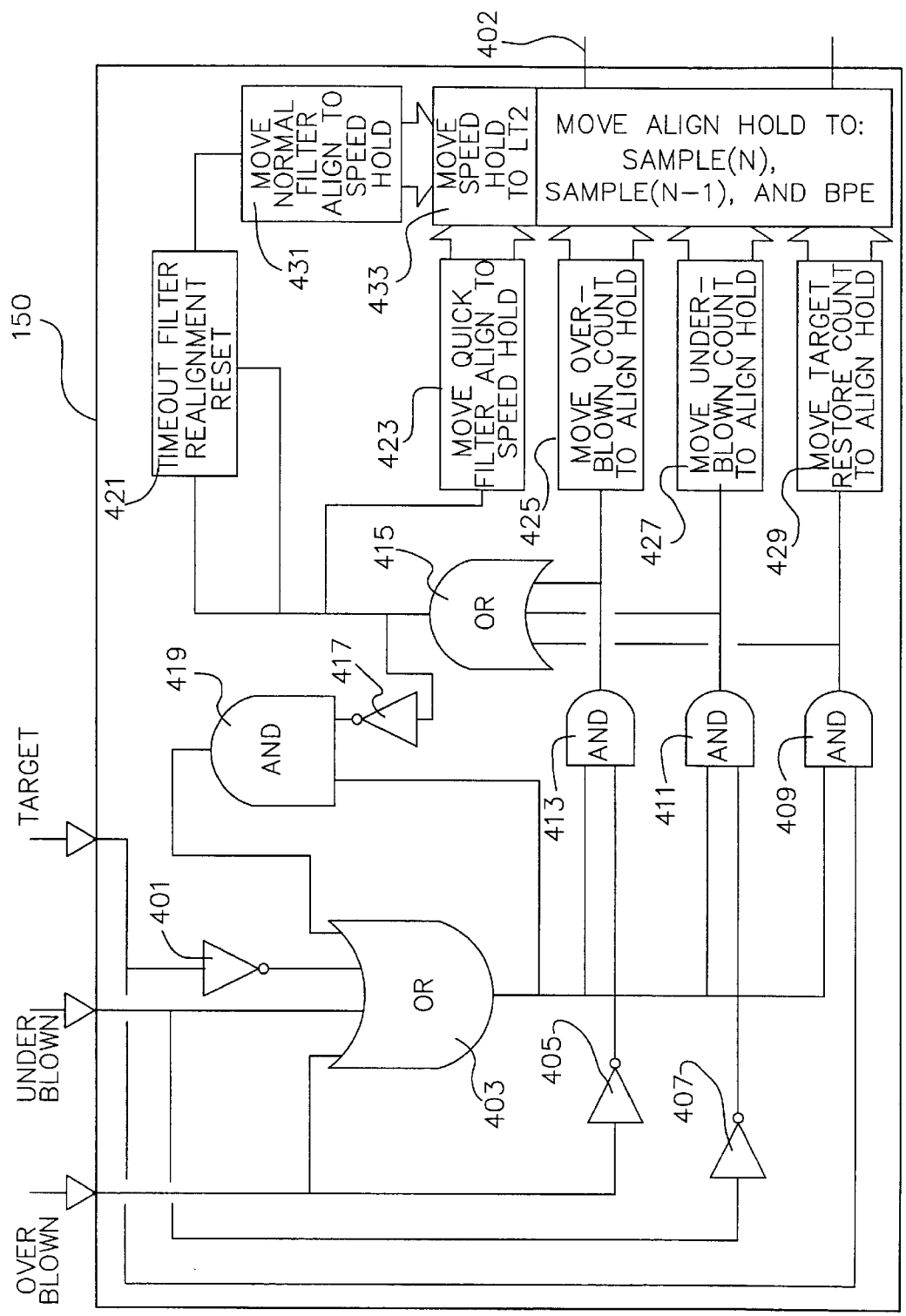
FIG. 22 is a schematic and block diagram view of emergency condition control logic block of FIG. 14.

As shown in FIG. 14, emergency condition control mode logic 150 is provided in supervisory control unit 75, and is shown in detail in FIG. 22. As shown in FIG. 22, emergency condition control mode logic 150 receives three input signals: the OVER BLOWN signal; the UNDERBLOWN signal; and the TARGET filter signal. The emergency condition control mode logic 150 provides as an output two variables to software filter 149, including: "SPEED HOLD"; and "ALIGN HOLD". The OVERBLOWN signal is directed to anticipation state "or" gate 403 and to inverter 405. The UNDERBLOWN signal is directed to anticipation state "or" gate 403 and to inverter 407. The TARGET signal is directed through inverter 401 to anticipation state "or" gate 403, and to "and" gate 409. The output of anticipation "or" gate 403 is the "or" combination of OVERBLOWN signal, and the inverted TARGET signal. Anticipation state "or" gate 403 and "and" gate 419 cooperate to provide a locking logic loop. The output of "or" gate 403 is provided as an input to "and" gate 419. The other input to "and" gate 419 is the output of inverter 417. The output of inverter 417 can be considered as a "unlocking" signal. If the OVERBLOWN signal or UNDERBLOWN signal is high, or the inverted TARGET signal is high, the output of anticipation state "or" gate 403 will go high, and will be fed as an input into "and" gate 419, as stated above. The output of anticipation state "or" gate 403 is also provided as an input to "and" gates 413, 411, and 409. The other input to "and" gate 413 is the inverted OVERBLOWN signal. The other input to "and" gate 411 is the inverted UNDERBLOWN signal. The other input to "and" gate 409 is the TARGET signal. The outputs of "and" gates 409, 411, and 413 are provided to "or" gate 415. The output of "or" gate 415 is provided to inverter 417.

In operation, the detection of an overblown or underblown condition, or an indication that the extruded film tube is out of range of the sensor will cause the output of anticipation state "or" gate 403 to go high. This high output will be fed back through "and" gate 419 as an input to anticipation state "or" gate 403. Of course, the output of "and" gate 419 will be high for so long as neither input to "and" gate 419 is low. Of course, one input to "and" gate 419 is high because a change in the state of the OVER BLOWN signal, the UNDER BLOWN signal, and the TARGET signal has been detected. The other input to "and" gate 419 is controlled by the output of inverter 417, which is controlled by the output of next-state "or" gate 415. As stated above, the output of next-state "or" gate 415 is controlled by the output of "and" gates 409, 411, 413. In this configuration, anticipation state "or" gate 403 and "and" gate 419 are locked in a logic loop until a change is detected in a binary state of one of the following signals: the OVERBLOWN signal, the UNDERBLOWN signal, and the TARGET signal. A change in state of one of these signals causes next-state "or" gate 415 to go high, which causes the output of inverter 417 to go low, which causes the output of "and" gate 419 to go low.

The output of next-state "or" gate 415 is also provided to timer starter 421, the reset pin for timer starter 421, and the input of block 423. When a high signal is provided to the input of timer starter 421, a three second software clock is initiated. At the beginning of the three second period, the output of timer starter 421 goes from a normally high condition to a temporary low condition; at the end of the three second software timer, the output of timer starter 421 returns to its normally high condition. If any additional changes in the state of the OVERBLOWN signal, the UNDERBLOWN signal, and the TARGET signal are detected, the software timer is reset to zero, and begins running again. The particular change in the input signal of the OVERBLOWN signal, the UNDERBLOWN signal, and the TARGET signal, also causes the transmission of a high output from "and" gates 409, 411, and 413 to blocks 429, 427, and 425 respectively.

In operation, when the input to block 423 goes high, the numeric value associated with the variable identified as "quick filter align" will be pushed to a memory variable identified as "speed hold". "Quick filter align" is a filter variable which is used by software filter 149 (of FIG. 23, which will be discussed below), which determines the maximum allowable rate of change in determining the estimated position. "Speed hold" is a holding variable which holds the numeric value for the maximum allowable rate of change in determining the estimated position of the blown film tube. "Speed hold" can hold either a value identified as "quick filter align" or a value identified as "normal filter align". "Normal filter align" is a variable that contains a numeric value which determines the normal maximum amount of change allowed in determining the estimated position of the blown film tube relative to the transducer. Blocks 423 and 431 are both coupled to block 433 which is an operational block representative of a "push" operation. Essentially, block 433 represents the activity of continuously and asynchronously pushing the value held in the variable "speed hold" to "LT2" in software filter 149 via data bus 402. The value for "normal filter align" is the same as that discussed herebelow in connection with FIG. 8a, and comprises thirteen counts, wherein counts are normalized units established in terms of voltage. The preferred value for "quick filter align" is forty-eight counts. Therefore, when the software filter 149 is provided with the quick filter align value, the control system is able to change at a rate of approximately 3.7 times as fast as that during a "normal filter align" mode of operation.

Also, when a "locked" condition is obtained by anticipation state "or" gate 403 and "and" gate 419, any additional change in state of the values of any of the OVERBLOWN signal, the UNDERBLOWN signal, and the TARGET signal will cause "and" gates 409, 411, and 413 to selectively activate blocks 429, 427, 425. Blocks 429, 427, and 425 are coupled to block 433 which is linked by data bus 402 to software filter 149. When block 429 receives a high input, the variable held in the memory location "target restore count" is moved to a memory location identified as "align hold". When block 427 receives a high input signal, the value held in the memory location identified as "underblown count" is moved to a memory value identified as "align hold". When block 425 receives a high input signal, the numeric value held in a memory location identified as "overblown count" is moved to a memory location identified as "align hold". As stated above, block 433 performs a continuous asynchronous "push" operation, and will push any value identified to the "align hold" memory location to the values of SAMPLE (N), SAMPLE (N−1), and BPE in the software filter of FIG. 23. In the preferred embodiment of the present invention, the value of "overblown count" is set to correspond to the distance between reference R and maximum circumference threshold B which is depicted in FIG. 16, which is established distance at which the control system will determine that an "overblown" condition exists. Also, in the preferred embodiment of the present invention, the value of the "underblown" count will be set to a minimum circumference threshold C, which is depicted in FIG. 16, and which corresponds to the detection of an underblown condition. Also, in the present invention, the value of "target restore count" is preferably established to correspond to the value of set point A, which is depicted in FIG. 16, and which corresponds generally to the distance between reference R and the imaginary cylinder established by the position of the sizing cage with respect to the blown film tube.

Figure 23A:
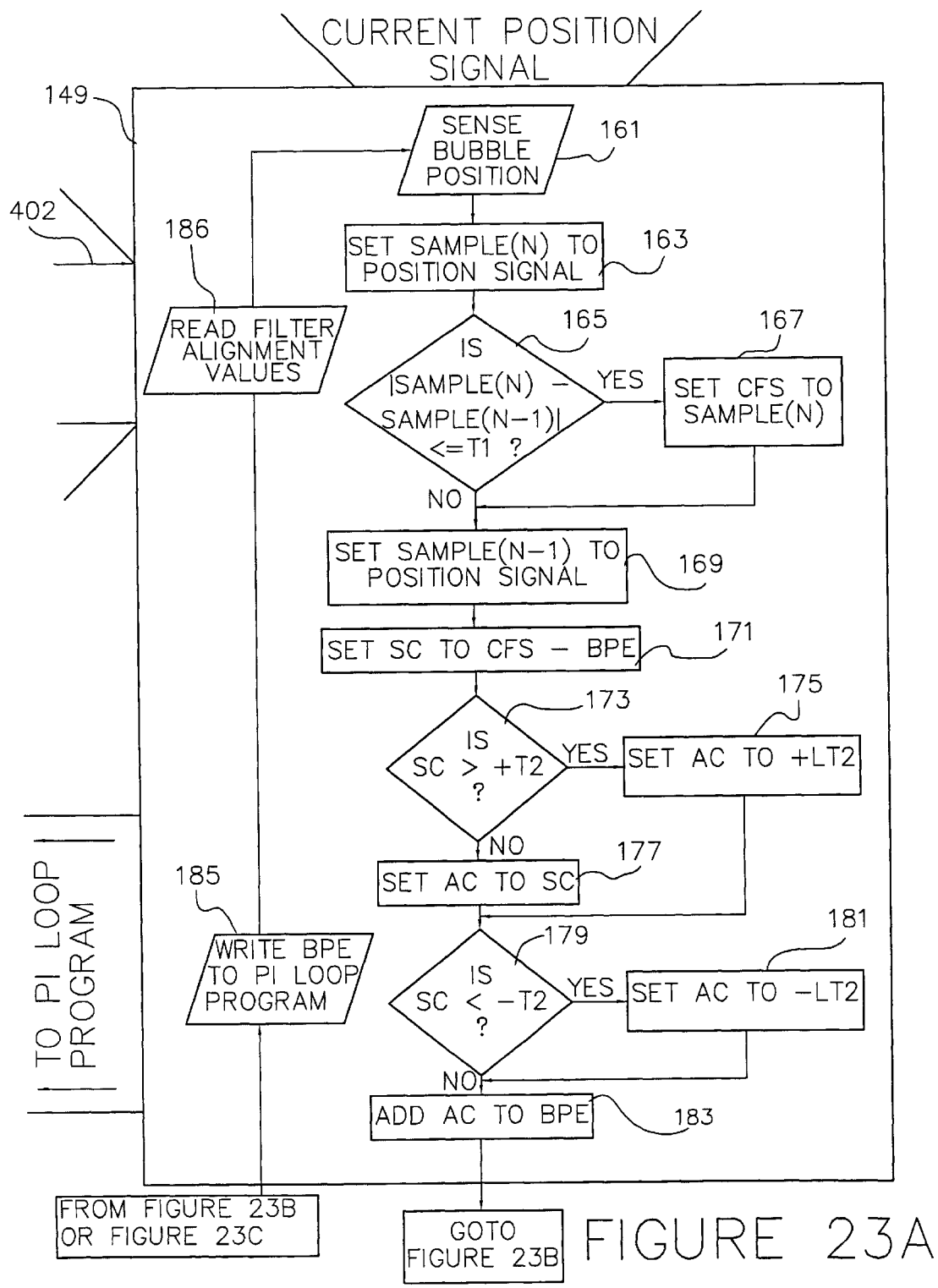
Figure 23B:
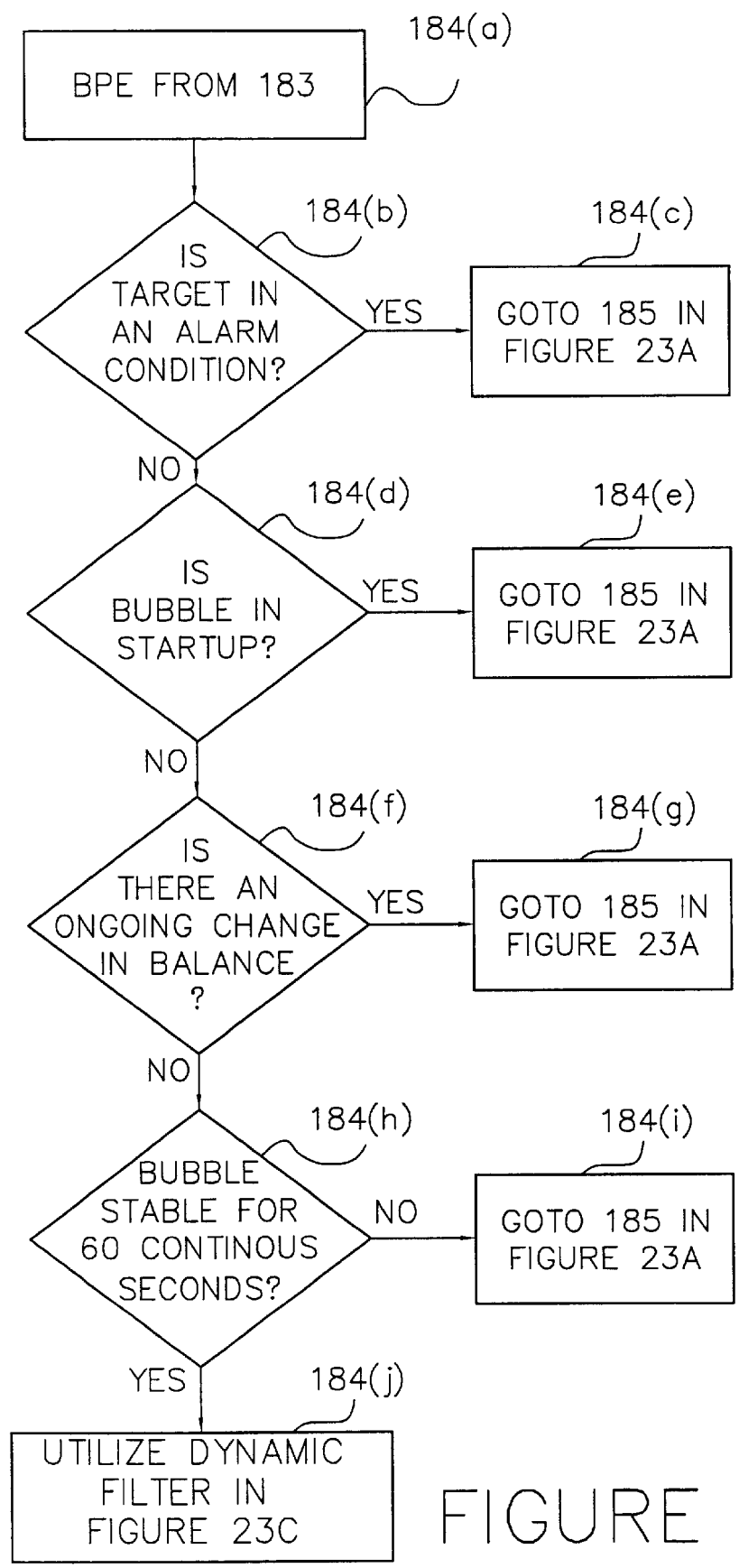

FIG. 23A is a flowchart of the preferred filtering process applied to CURRENT POSITION signal generated by the acoustic transducer. Preferably, it includes multiple stages of filtering, for different operating conditions. The first stage of filtering pertains to relatively unstable operating conditions. The second stage of filtering pertains to relatively stable operating conditions. The digitized CURRENT POSITION signal is provided from analog to digital converter 141 to software filter 149. The program reads the CURRENT POSITION signal in step 161. Then, the software filter 149 sets SAMPLE (N) to the position signal.

In step 165, the absolute value of the difference between CURRENT POSITION (SAMPLE (N)) and the previous sample (SAMPLE (N−1)) is compared to a first threshold. If the absolute value of the difference between the current sample and the previous sample is less than first threshold T1, the value of SAMPLE (N) is set to CFS, the current filtered sample, in step 167. If the absolute value of the difference between the current sample and the previous sample exceeds first threshold T1, in step 169, the CURRENT POSITION signal is disregarded, and the previous position signal SAMPLE (N−1) is substituted in its place.

Then, in step 171, the suggested change SC is calculated, by determining the difference between the current filtered sample CFS and the best position estimate BPE. In step 173, the suggested change SC which was calculated in step 171 is compared to positive T2, which is the maximum limit on the rate of change. If the suggested change is within the maximum limit allowed, in step 177, allowed change AC is set to the suggested change SC value. If, however, in step 173, the suggested change exceeds the maximum limit allowed on the rate of change, in step 175, the allowed change is set to +LT2, a default value for allowed change.

In step 179, the suggested change SC is compared to the negative limit for allowable rates of change, negative T2. If the suggested change SC is greater than the maximum limit on negative change, in step 181, allowed change AC is set to negative −LT2, a default value for negative change. However, if in step 179 it is determined that suggested change SC is within the maximum limit allowed on negative change, in step 183, the allowed change AC is added to the current best position estimate BPE, in step 183. Finally, in step 185, the newly calculated best position estimate BPE is written to the PI loop program.

Software filter 149 is a two stage filter which first screens the CURRENT POSITION signal by comparing the amount of change, either positive or negative, to threshold T1. If the CURRENT POSITION signal, as compared to the preceding position signal exceeds the threshold of T1, the current position signal is discarded, and the previous position signal (SAMPLE (N−1)) is used instead. At the end of the first stage, in step 171, a suggested change SC value is derived by subtracting the best position estimate BPE from the current filtered sample CFS.

In the second stage of filtering, the suggested change SC value is compared to positive and negative change thresholds (in steps 173 and 179). If the positive or negative change thresholds are violated, the allowable change is set to a preselected value, either +LT2, or −LT2. Of course, if the suggested change SC is within the limits set by positive T2 and negative T2, then the allowable change AC is set to the suggested change SC.

As is shown in FIG. 23A, data bus 201 couples the emergency condition control logic block 150 to software filter 149. As stated above, emergency condition control logic block 150 is designed to asynchronously push a numeric value identified in the memory location of "speed hold" to LT2 in software filter 149. Furthermore, emergency condition control logic block 150 will asynchronously push a numeric value in the memory location identified as "ALIGN HOLD" to SAMPLE (N), SAMPLE (N−1), and BPE. As stated above, SAMPLE N corresponds to the current position signal as detected by the transducer. SAMPLE (N−1) corresponds to the previous position signal as determined by the transducer. BPE corresponds to the best position estimate.

Since the operation of emergency condition control mode logic block 150 is asynchronous, block 186 of FIG. 23A should be read and understood as corresponding to an asynchronous read function. Therefore, at all times, as set forth in block 186, software filter 149 receives values of "speed hold" and "align hold" from emergency condition control mode logic block 150, and immediate substitutes them into the various logic blocks found in software filter 149. For example, SAMPLE (N) is found in logic blocks 163, 165, and 167. SAMPLE (N−1) is found in logic blocks 165, and 169. BPE is found at logic block 183. The program function represented by block 186 operates to asynchronously and immediately push the values of "speed hold" and "align hold" to these various functional blocks, since OVERBLOWN, UNDERBLOWN, and lost TARGET conditions can occur at any time.

Figure 24:
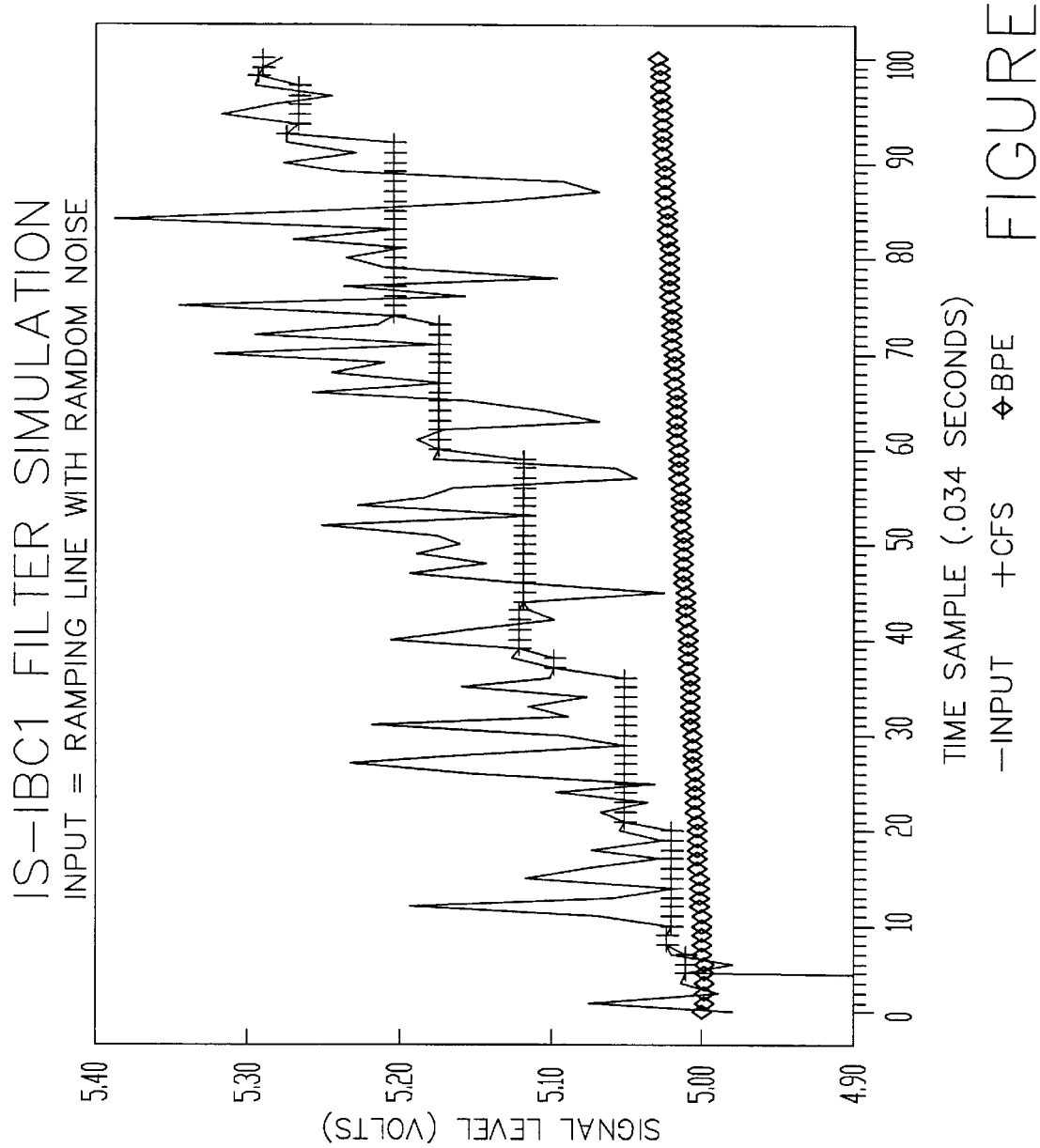
FIG. 24 is a graphic depiction of the normal operation of the filtering system.

The normal operation of software filter 149 may also be understood with reference to FIG. 24, and will be contrasted with examples of the emergency condition mode of operation as depicted in FIGS. 25, 26, and 27. In the graph of FIG. 24, the y-axis represents the signal level, and the x-axis represents time. The signal as sensed by acoustic transducer 79 is designated as input, and shown in the solid line. The operation of the first stage of the software filter 149 is depicted by the current filtered sample CFS, which is shown in the graph by cross-marks. As shown, the current filtered sample CFS operates to ignore large positive or negative changes in the position signal, and will only change when the position signal seems to have stabilized for a short interval. Therefore, when changes occur in the current filtered sample CFS, they occur in a plateau-like manner.

In stage two of the software filter 149, the current filtered sample CFS is compared to the best position estimate BPE, to derive a suggested change SC value. The suggested SC is then compared to positive and negative thresholds to calculate an allowable change AC which is then added to the best position estimate BPE. FIG. 24 shows that the best position estimate BPE signal only gradually changes in response to an upward drift in the POSITION SIGNAL. The software filtering system 149 of the present invention renders the control apparatus relatively unaffected by random noise, but capable of tracking the more "gradual" changes in bubble position.

Experimentation has revealed that the software filtering system of the present invention operates best when the position of extruded film tube 81 is sampled between 20 to 30 times per second. At this sampling rate, one is less likely to incorrectly identify noise as a change in circumference of extruded film tube 81. The preferred sampling rate accounts for the common noise signals encountered in blown film extrusion liner.

Optional thresholds have also been derived through experimentation. In the first stage of filtering, threshold T1 is established as roughly one percent of the operating range of acoustic transducer 79, which in the preferred embodiment is twenty-one meters (24 inches less 3 inches). In the second stage of filter, thresholds +LT2 and −LT2 are established as roughly 0.30% of the operating range of acoustic transducer 79.

Figure 25A:
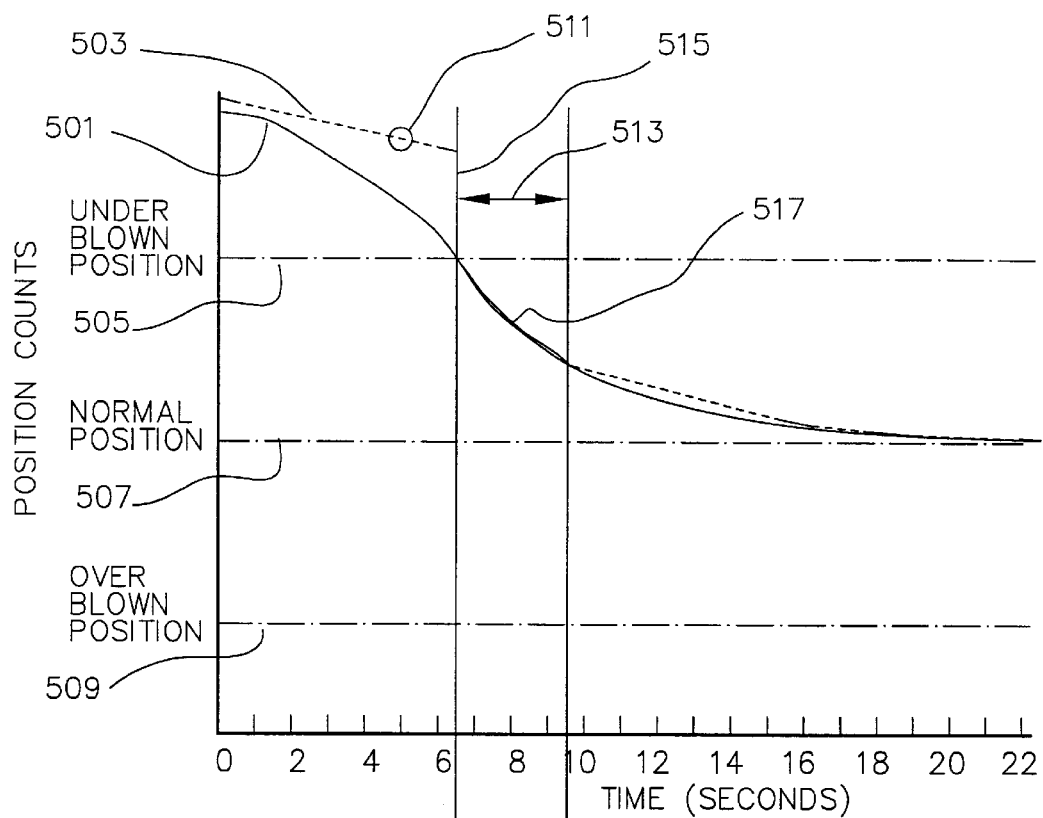
FIG. 25A is a graph which depicts the emergency condition control mode of operation response to the detection of an underblown condition, with the X-axis representing time and the Y-axis representing position of the extruded film tube.

FIG. 25A is a graphic depiction of the control system response to the detection of an UNDERBLOWN condition. The X-axis of the graph of FIG. 25A is representative of time in seconds, and the Y-axis of the graph of FIG. 25A is representative of position in units of voltage counts. A graph of the best position estimate BPE is identified by dashed line 503. A graph of the actual position of the extruded film tube with respect to the reference position R is indicated by solid line 501. On this graph, line 505 is indicative of the boundary established for determining whether the blown film tube is in an "underblown" condition. Line 507 is provided as an indication of the normal position of the blown film tube. Line 509 is provided to establish a boundary for determining when a blown film tube is considered to be in an "overblown" condition.

Figure 25B:
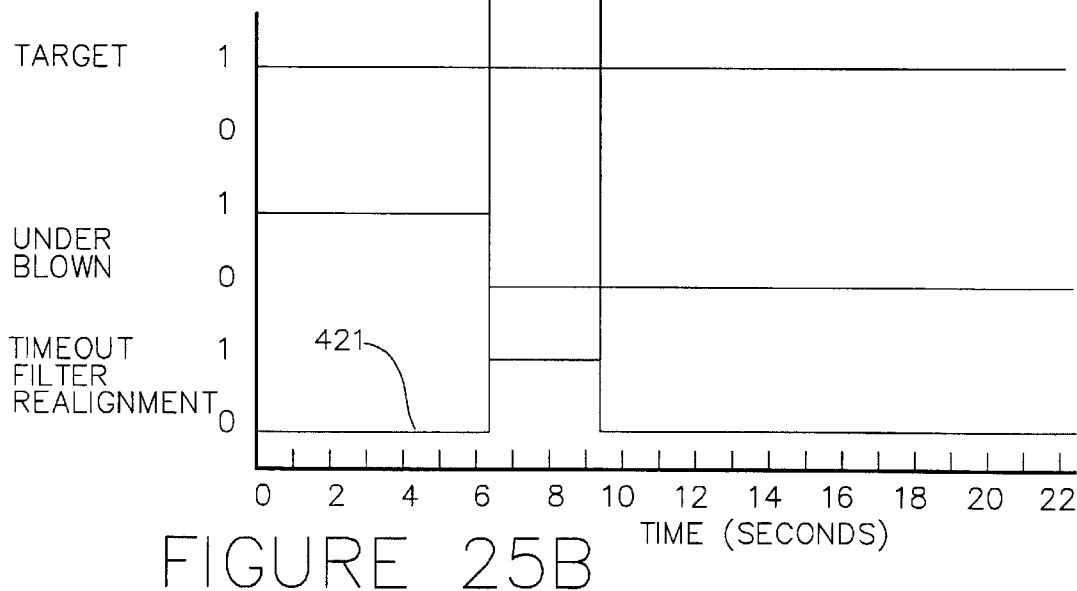
FIG. 25B is a graph of the binary condition of selected operating blocks of the block diagram depiction of FIG. 22, and can be read in combination with FIG. 25A, wherein the X-axis represents time, and the Y-axis represents the binary condition of selected operational blocks.

The activities represented in the graph of FIG. 25A may be coordinated with the graph of FIG. 25B, which has an X-axis which is representative of time in seconds, and a Y-axis which represents the binary condition of the TARGET signal, and the UNDERBLOWN signal, as well as the output of block 421 of FIG. 22, which is representative of the output of the time out filter realignment software clock. Now, with simultaneous reference to FIGS. 25A and 25B, segment 511 of the best position estimate indicates that for some reason the best position estimate generated by software filter 149 is lagging substantially behind the actual position of the blown film tube. As shown in FIG. 25A, both the actual and estimated position of the blown film tube are in an underblown condition, which is represented in the graph of FIG. 25B.

As stated above, in connection with FIG. 22 and the discussion of the operation of the emergency condition control logic block 150, the locking software loop which is established by anticipation state "or" gate 403 and "and" gate 419 will lock the output of anticipation state "or" gate 403 to a high condition. Therefore, next-state "or" gate 415 is awaiting the change in condition of any of the following signals: the OVERBLOWN signal, the UNDERBLOWN signal, and the TARGET signal. As shown in FIG. 25A, at a time of 6.5 seconds, the actual position of the blown film tube comes within the boundary 505 established for the underblown condition, causing the output of next-state "or" gate 415 to go high, which causes the output of inverter 417 to go low, which causes the output of "and" gate 419 to go low. This change in state also starts the software timer of block 421, and causes block 427 to push the value of "underblown count" to the "align hold" variable. Also, simultaneously, software block 423 pushes the value of "quick filter align" to the "speed hold" variable. The values of "speed hold" and "underblown count" are automatically pushed to block 433. Meanwhile, the software timer of block 421 overrides the normal and continuous pushing of "normal filter align" to the "speed hold" variable for a period three seconds. The three second period expires at 9.5 seconds.

Thus, for the three second time interval 513, software filter 149 is allowed to respond more rapidly to change than during normal operating conditions. As shown in FIG. 22, block 433 operates to automatically and asynchronously push the value of "speed hold" to "LT2" in software filter 149. Simultaneously, block 433 operates to continuously, automatically, and asynchronously push the value of "align hold" to SAMPLE (N), SAMPLE (N−1) and BPE in software filter 149. This overriding of the normal operation of software filter 149 for a three second interval allows the software best position estimate 503 to catch up with the actual position 501 of the blown film tube. The jump represented by segment 515 in the best position estimate 503 of the blown film tube is representative of the setting of SAMPLE (N), SAMPLE (N−1) and BPE to the "underblown count" which is held in the "align hold" variable. Segment 517 of the best position estimate 503 represents the more rapid rate of change allowable during the three second interval, and depicts the best position estimate line 503 tracking the actual position line 501 for a brief interval. At the expiration of the three second interval, software filter 149 of the control system returns to a normal mode of operation which does not allow such rapid change in the best position estimate.

FIGS. 26A and 26b provide an alternative example of the operation of the emergency condition control mode of operation of the present invention. In this example, the TARGET signal represented in segment 525 of FIG. 26b is erroneously indicating that the blown film tube is out of range of the transducer. Therefore, segment 529 of dashed line 527 indicates that the best position estimate according to software filter 149 is set at a default constant value indicative of the blown film tube being out of range of the transducer, and is thus far from indicative of the actual position which is indicated by line 531. This condition may occur when the blown film tube is highly unstable so that the interrogating pulses from the transducer are deflected, preventing sensing of the blown film tube by the transducer. Segment 533 of FIG. 26b is representative of stabilization of the blown film tube and transition of the TARGET signal from an "off" state to an "on" state. This transition triggers initiation of the three second software timer which is depicted by segment 535. The time period begins at 12.5 seconds and ends at 15.5 seconds. The transition of the TARGET signal from a low to a high condition triggers the pushing of the "target restore count" value to the "align hold" variable, as is graphically depicted by segment 537. During the three second interval, the best position estimate established by software filter 149 is allowed to change at a rate which is established by the "quick filter align" value which is pushed to the "speed hold" variable and bused to software filter 149. At the termination of the three second interval, the software filter 149 returns to normal operation.

FIG. 27A provides yet another example of the operation of the emergency condition control mode. Segment 541 of FIG. 27B indicates that the TARGET signal is in a low condition, indicating that the blown film tube is out of range of the transducer. Segment 543 indicates that the blown film tube has come into range of the transducer, and the TARGET signal goes from a low to a high condition. Simultaneous with the movement of the blown film tube into range of the transducer, the UNDERBLOWN signal goes from a low to a high condition indicating that the blown film tube is in an underblown condition. Segment 545 of FIG. 27B indicates a transition from a high UNDERBLOWN signal to a low UNDERBLOWN signal, which indicates that the blown film tube is no longer in an underblown condition. This transition initiates the three second interval which allows for more rapid adjustment of the best position estimate.

The foregoing description related to the first stage of filtering which is especially useful during relatively unstable operating conditions, wherein overblown and underblown extruded film tube conditions are possible. The second stage of filtering, which will now be described, pertains to relatively stable operating conditions, when the extruded film tube is in a substantially fixed position. This type of filtering is preferably a dynamic filtering operation, in which the influence of the dynamic filter is increased or decreased, depending upon at least one pre-established criterion. Preferably, the criterion comprises a comparison of the output of the filtering operation with the current bubble position. If there is a great difference between the detected extruded film tube position and the output of the filter, the operating assumption is that the extruded film tube is perhaps becoming unstable, and the influence of the dynamic filtering operation should be reduced. Conversely, if the difference between the output of the dynamic filtering process and the current position of the extruded film tube is small or decreasing, the assumption is made that the extruded film tube is in a relatively stable operating condition, and the influence of the dynamic filtering operation should be increased. In the present invention, the dynamic filtering operation comprises a rolling average of detected position signals, with the number of samples utilized to calculate the rolling average increasing if stability is detected and decreasing if instability is detected. The foregoing will become clear with reference to FIGS. 28A, 28B, 28C, 28D, 28E, 28F, and 28G.

Figure 23C:
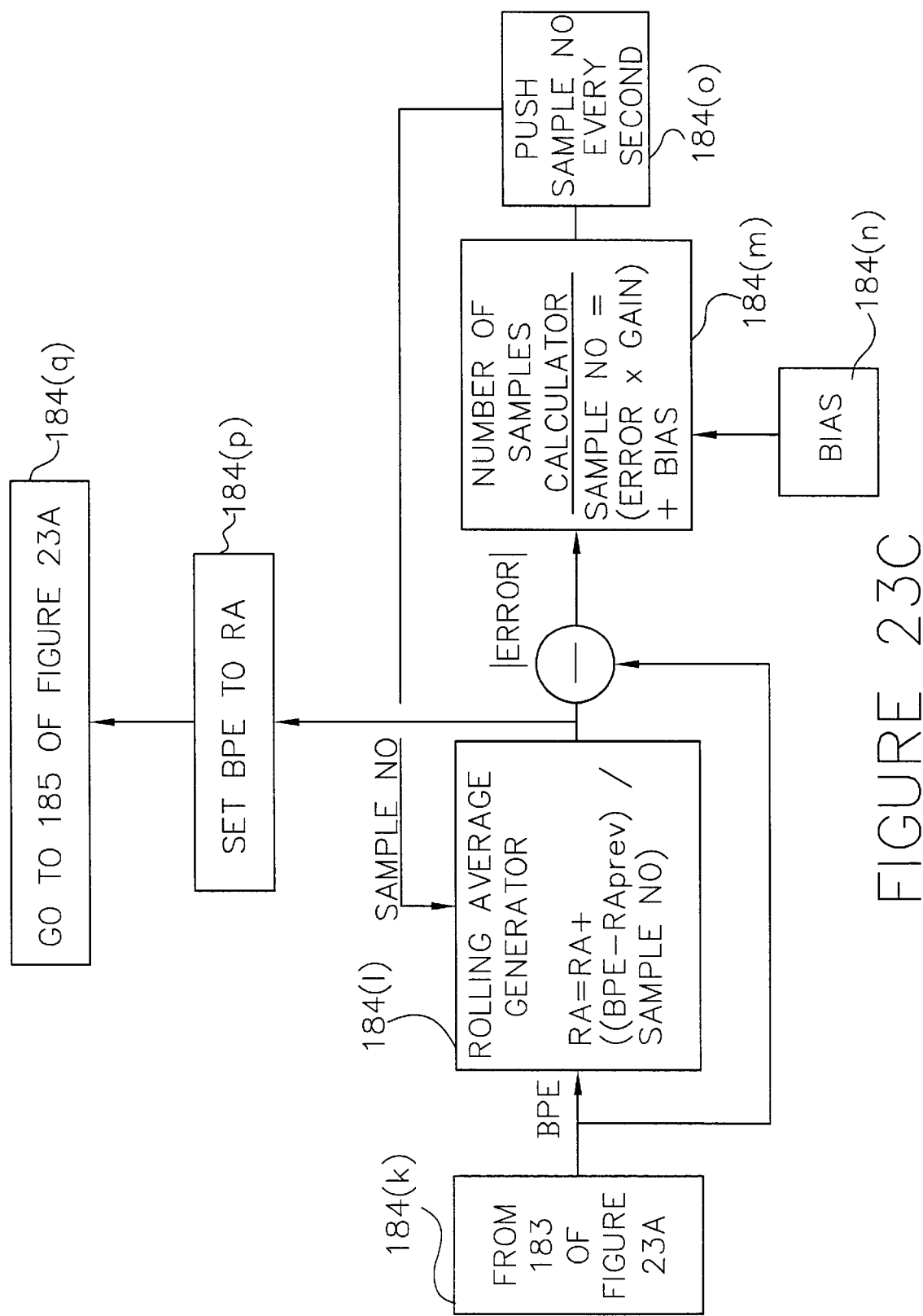

With reference to FIG. 23A, the basic filtering operation is depicted in flowchart form. At the termination of software step 183, a best position estimate (BPE) is calculated. The process continues at software block 184(a) of FIG. 23B, wherein the best position estimate is provided. Next, in accordance with software block 184(b), it is determined whether or not an alarm condition exists; if an alarm condition exists, the process continues at software block 184(c), wherein the process continues by going to block 185 of FIG. 23A; if, however, it is determined in software block 184(b) that there is no alarm condition, the process continues. In software block 184(d), the processor determines whether or not the extruded film tube is in a startup mode of operation; if so, the process continues at software block 184(e) by passing control to software block 185 in FIG. 23A; however, if it is determined in software block 184(d) that the bubble is not a startup mode of operation, the process continues. In software block 184(f), the controller determines whether or not there is an ongoing change in extruded film tube balance; if so, the process continues at software block 184(g) by passing control to software block 185 in FIG. 23A. However, if it is determined in software block 184(f) that there is no ongoing change in extruded film tube balance, the process continues. In accordance with software block 184(h), the controller determines whether the extruded film tube (or "bubble") has been stable for sixty continuous seconds; if not, the process continues at software block 184(i), wherein control is passed to software block 185 in FIG. 23A; however, if it is determined in software block 184(h) that the bubble has been stable for sixty continuous seconds, then control is passed to software block 184(j), wherein the dynamic filter of FIG. 23C is utilized to process the position signals during this relatively stable interval of operation.

In broad overview, the basic filtering operation of FIG. 23A alone is performed if any one of a variety of indicators reveal that stable operation is not ongoing or is unlikely. A variety of the rudimentary indicators are identified in FIG. 23B, and various other indicators can be devised which can be added to the items in FIG. 23B which provide further screening which prevents the dynamic filtering operation from commencing.

Once relatively stable operations are ongoing, the dynamic filtering operation may be applied. The preferred embodiment of the dynamic filtering operation is depicted in block diagram form in FIG. 23C. As is shown, the process continues at software block 184(k), wherein the best position estimate is provided as an input to a rolling average generator 184(l) which computes a rolling average from a number of previous samples of the best position estimate (BPE), preferably based upon the following formula:

$$RA = RA + ((BPE - RA_{prev}) \div (\text{Sample Number}))$$

wherein

| RA | is the rolling average; |
|---|---|
| RA$_{prev}$ | is previous rolling average; |
| BPE | is the best position estimate currently provided; and |
| Sample Number | is a number which determines the number of samples utilized to calculate the rolling average |

The output of rolling average generator 184(*l*) is subtracted from the input to the rolling average generator 184(*l*), which is the best position estimate (BPE). This defines an "ERROR". This is provided as an input to the number of samples calculator 184(*m*), which calculates the number of samples based upon the ERROR (which is input), a predetermined GAIN value, and a BIAS value in accordance with the following formula:

SAMPLE NUMBER=(ERROR×GAIN)+BIAS

The BIAS 184(*n*) is a manufacturer-configurable variable which helps to determine the span (or range) of available sample numbers utilized in determining the rolling average. The output of the number of samples calculator 184(*m*) is provided as an input to software block 184(*o*), which pushes the Sample Number to the rolling average generator 184(*l*) every second.

In accordance with present invention, the values for ERROR, GAIN and BIAS are selected to insure that, during very stable operations, the rolling average generator 184(*l*) utilizes ten (10) previous samples of the best position estimate (BPE) in order to calculate the rolling average. If the difference between the input to the rolling average generator 184(*l*) and the output of the rolling average generator 184(*l*) increases, the number of samples calculator 184(*m*) reduces the number of samples utilized by the rolling average generator 184(*l*). When the difference (ERROR) is at its greatest (and most unacceptable) level, the number of samples calculator 184(*m*) reduces the number of samples to unity (1), therefore causing the input of the rolling average generator 184(*l*) to be provided as the output of rolling average generator 184(*l*) without any dynamic filtering whatsoever. In other words, as the ERROR increases, the influence of the rolling average generator 184(*l*) is incrementally decreased from its maximum influence to its minimum influence, which essentially bypasses the dynamic filtering operation altogether.

As is shown in FIG. 23C, the output of the rolling average generator 184(*l*) is supplied to software block 184(*p*), which sets the BPE to the output of the rolling average generator 184(*l*). Then, in accordance with 184(*q*), controls return to software block 185 of FIG. 23A.

Figure 23D:
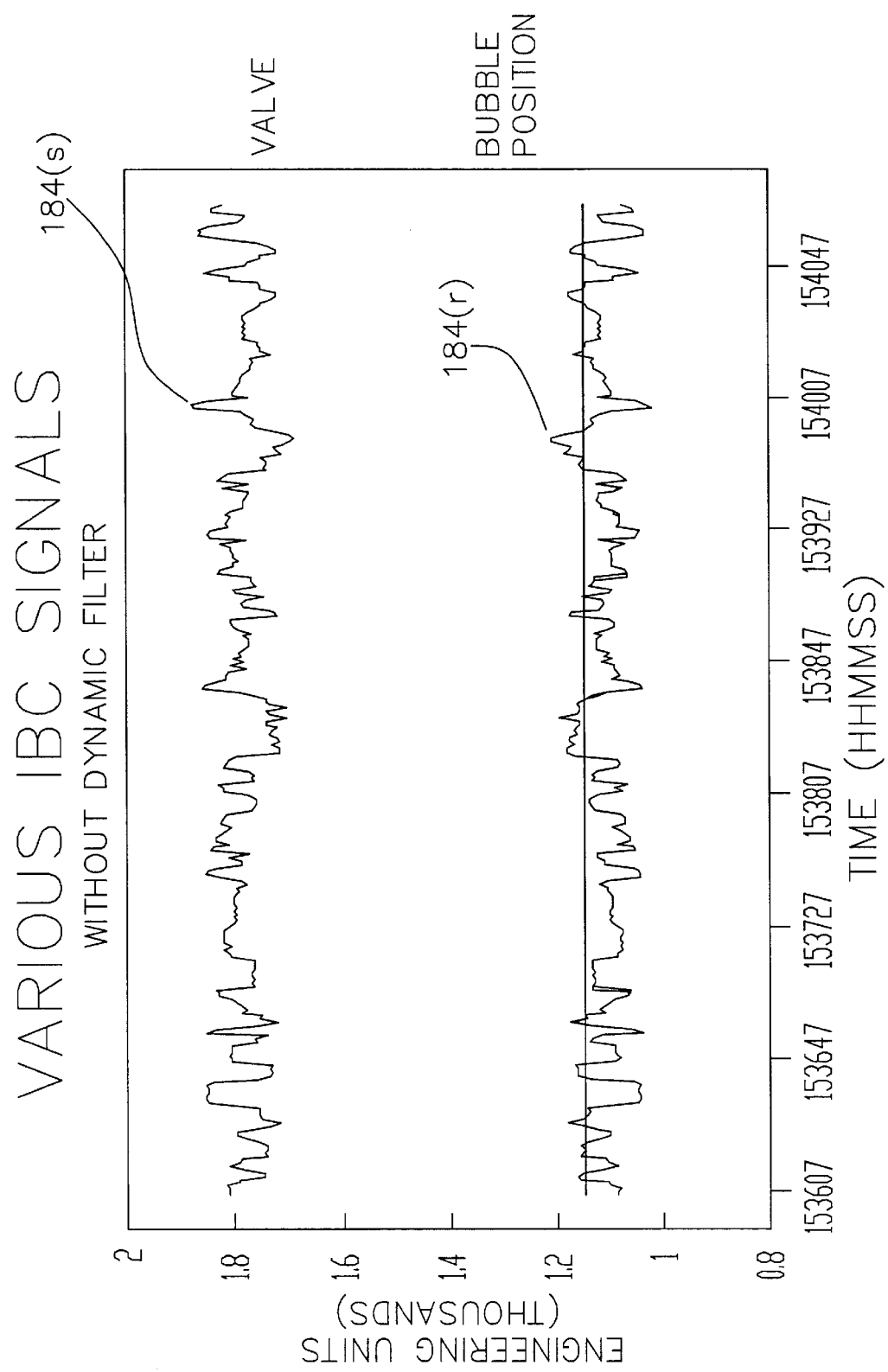

The beneficial influence of the dynamic filtering operation can best be understood with reference to FIGS. 23D and 23E. FIG. 23D is a graphically depiction of the bubble position 184(*r*) and the valve position 184(*s*) with respect to time, without dynamic filtering. As is shown, the valve position moves in direct correspondence with the bubble position, quite dynamically. FIG. 23E is a graphical depiction of bubble position 184(*t*) and the output of the rolling average generator 184(*u*), as well as valve position 184(*v*), all with respect to time. As is shown, the rolling average generator is much more stable than the detected bubble position (BPE). The extreme positive and negative peaks of the bubble position (BPE) are eliminated through the dynamic filtering process, making the control system altogether less susceptible to noise and meaningless bubble flutter than without the dynamic filtering process. As is shown in FIG. 23(E), the valve (or other flow control device) is basically controlled by the output of the rolling average generator, and is also much less susceptible to the noise or bubble flutter. This type of noise is a common problem in particularly stiff materials, such as nylon.

FIG. 23F is a graphical depiction of a frequency distribution comparison of the dynamically filtered position signal shown in single cross-hatching and the unfiltered position signal (BPE) shown in double cross-hatching. This frequency distribution reveals that there is about a 33% reduction in the standard deviation between the dynamically filtered position signal and the filtered, but not dynamically filtered, position signal. In the real world, this relates to about a 2 millimeter reduction in lay flat variation, which reduces a 6 millimeter total variation to about a 4 millimeter total variation. This greatly increases the control system's performance during these relatively stable operating intervals.

Figure 23G:
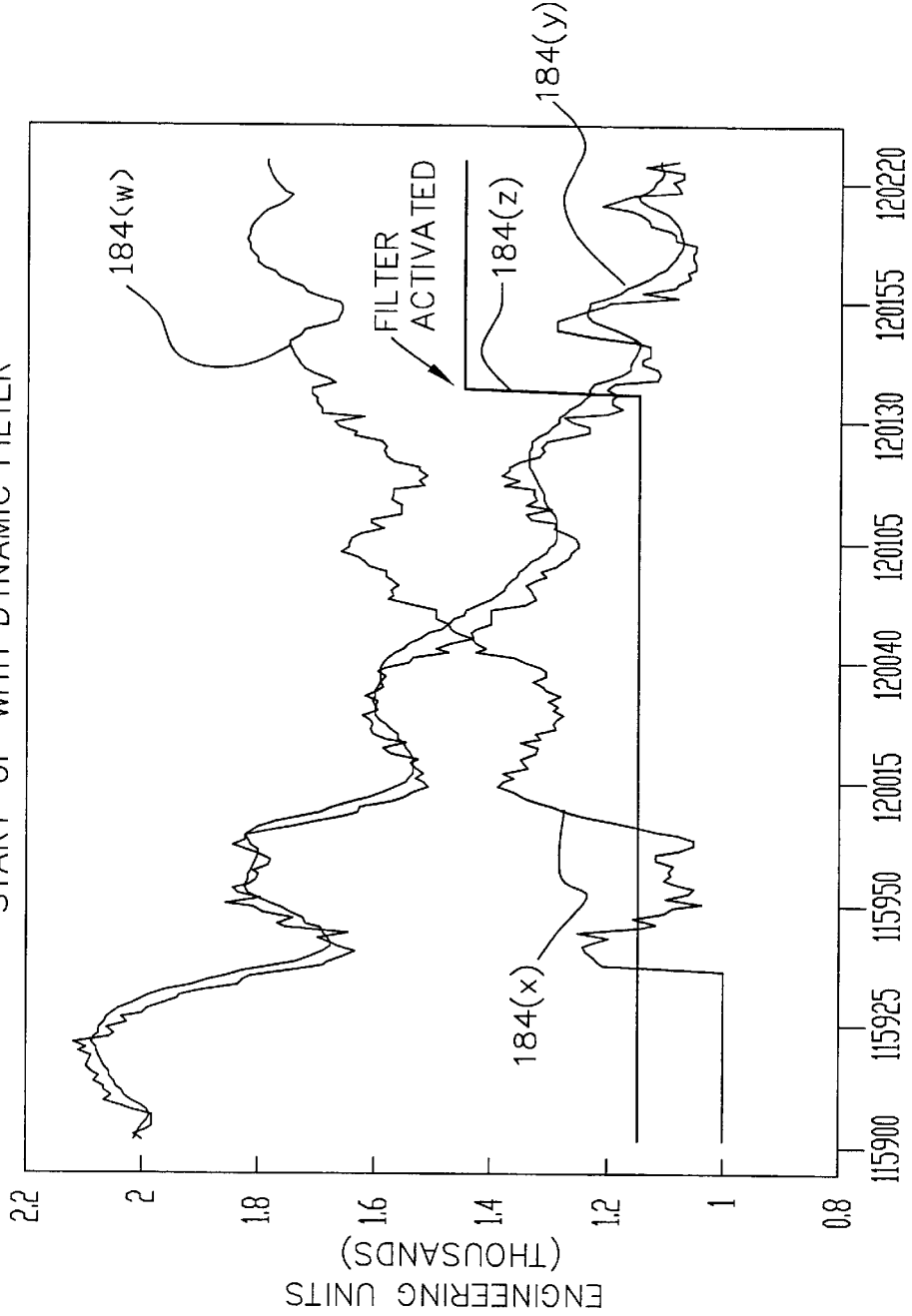

FIG. 23G is a graphical depiction of startup operations with the dynamic filter in place. The X-axis represents time and the Y-axis represents the valve position 184(*w*), the bubble position 184(*x*), the output of the rolling average generator 184(*y*). As is shown, the dynamic filtering operation is not active until time 184(*z*), after which the prerequisite stability has been obtained. It is at that point that the position of the valve 184(*w*) is directly controlled through the rolling average generator. Note the greater stability of valve position once the rolling average generator has been activated.

Figure 28:
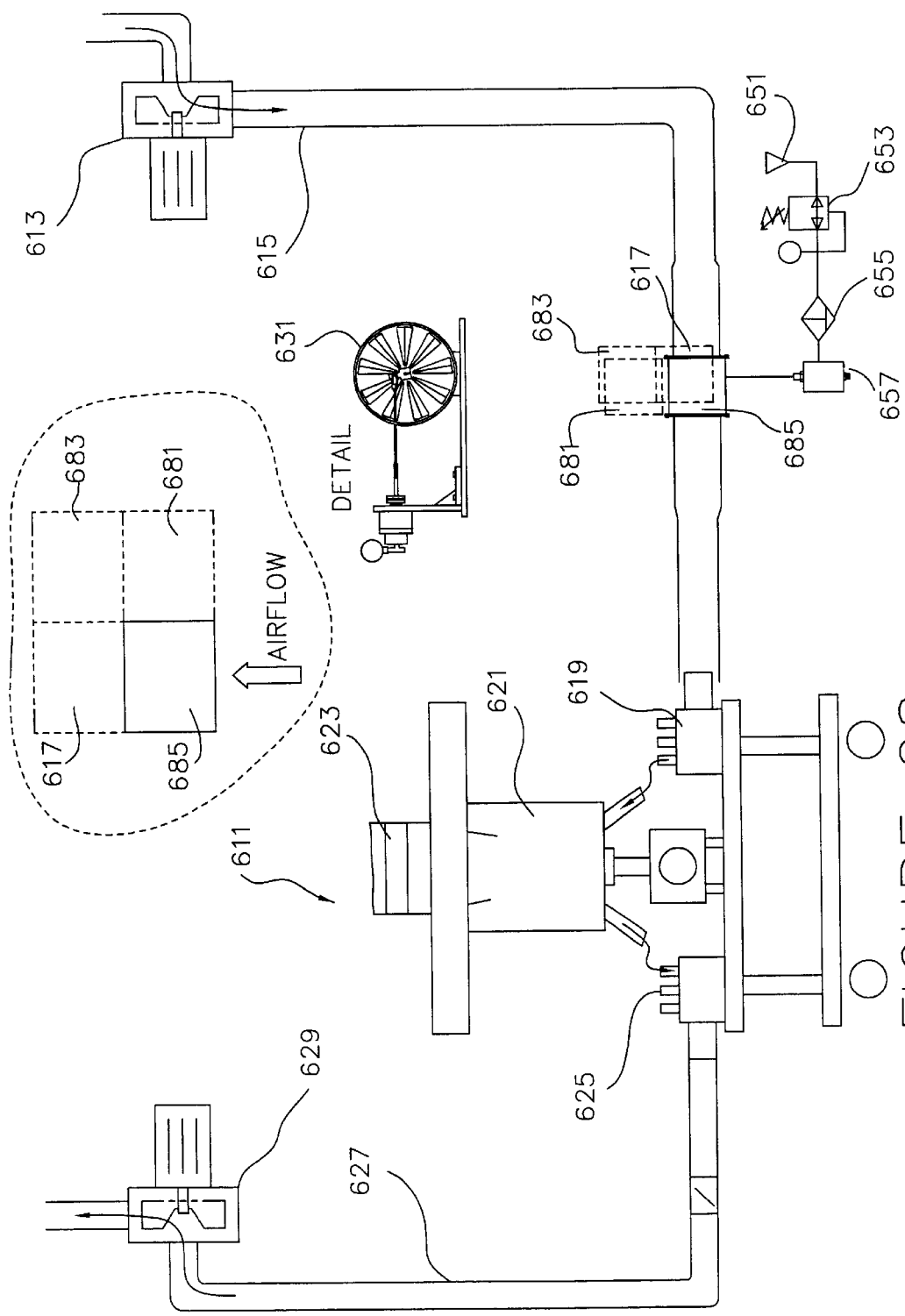
FIG. 28 is a schematic and block diagram depiction of one embodiment of the improved air flow control system of the present invention.

FIG. 28 is a schematic and block diagram representation of an airflow circuit for use in a blown film extrusion system. Input blower 613 is provided to provide a supply of air which is routed into airflow circuit 611. The air is received by conduit 615 and directed to airflow control device 617 of the present invention. Airflow control device 617 operates as a substitute for a conventional rotary-type airflow valve 631, which is depicted in simplified form also in FIG. 28. The preferred airflow control device 617 of the present invention is employed to increase and decrease the flow of air to supply distributor box 619 which provides an air supply to annular die 621 from which blown film tube 623 extends upward. Air is removed from the interior of blown film tube 623 by exhaust distributor box 625 which routes the air to conduit 627, and eventually to exhaust blower 629.

Figure 29:
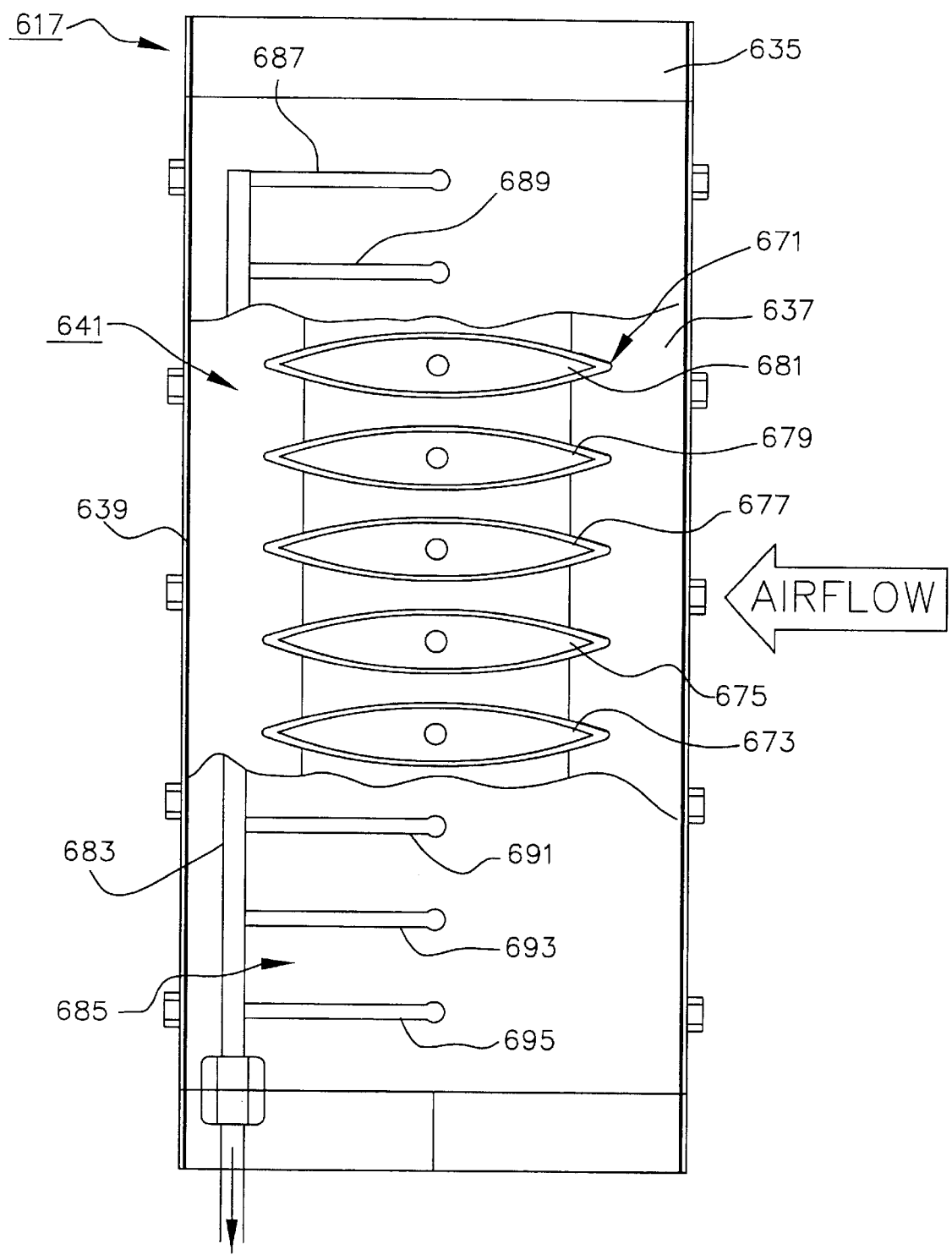
FIG. 29 is a simplified and partial fragmentary and longitudinal section view of the preferred air flow control device used with the air flow control system of the present invention.

The preferred airflow control device 617 is depicted in fragmentary longitudinal section view in FIG. 29. As is shown, airflow control device 617 includes housing 635 which defines inlet 637 and outlet 639 and airflow pathway 641 through housing 635. A plurality of selectively expandable flow restriction members 671 are provided within housing 635 in airflow pathway 641. In the view of FIG. 29, selectively-expandable flow restriction members 673, 675, 677, 679, and 681 are depicted. Other selectively-expandable flow restriction members are obscured in the view of FIG. 29. Manifold 685 is provided to route pressurized air to the interior of selectively-expandable flow restriction members 671, and includes conduit 683 which couples to a plurality of hoses, such as hoses 687, 689, 691, 693, 695 which are depicted in FIG. 29 (other hoses are obscured in FIG. 29).

Each of the plurality of selectively-expandable flow restriction members includes an inner air-tight bladder constructed of an expandable material such as an elastomeric material. The expandable bladder is surrounded by an expandable and contractible metal assembly. Preferably, each of the plurality of selective-expandable flow restriction members is substantially oval in cross-section view (such as the view of FIG. 29), and traverse airflow pathway 641 across the entire width of airflow pathway 641. Air flows over and under each of the plurality of selectively-expandable airflow restriction members, and each of them operates as an choke to increase and decrease the flow of air through housing 635 as they are expanded and contracted. However, the flow restriction is accomplished without creating turbulence in the airflow, since the selectively-actuable flow restriction members are foil shaped.

Returning now to FIG. 28, airflow control device 617 is coupled to proportional valve 657 which receives either a current or voltage control signal and selectively vents pressurized fluid to airflow control device 617. In the preferred embodiment, proportional valve 657 is manufactured by Proportion Air of McCordsville, Ind. Supply 651 provides a source of pressurized air which is routed through pressure regulator 653 which maintains the pressurized air at a constant 30 pounds per square inch of pressure. The regulated air is directed through filter 655 to remove dust and other particulate matter, and then through proportional valve 657 to airflow control device 617.

In the preferred embodiment of the present invention, airflow control device 617 is manufactured by Tek-Air Systems, Inc. of Northvale, N.J., and is identified as a "Connor Model No. PRD Pneumavalve". This valve is the subject matter of at least two U.S. patents, including U.S. Pat. No. 3,011,518, which issued in December of 1961 to Day et al., and U.S. Pat. No. 3,593,645, which issued on Jul. 20, 1971, to Day et al., which was assigned to Connor Engineering Corporation of Danbury, Conn., and which is entitled "Terminal Outlet for Air Distribution", both of which are incorporated herein by reference as if fully set forth.

Experiments have revealed that this type of airflow control device provides for greater control than can be provided by rotary type valve 631 (depicted in FIG. 28 for comparison purposes only), and is especially good at providing control in mismatched load situations which would ordinarily be difficult to control economically with a rotary type valve.

A number of airflow control devices like airflow control device 617 can be easily coupled together in either series or parallel arrangement to control the total volume of air provided to a blown film line or to allow economical load matching. In FIG. 28, a series and a parallel coupling of airflow control devices is depicted in phantom, with airflow control devices 681, 683, and 685 coupled together with airflow control device 617. As shown in the detail airflow control device 617 is in parallel with airflow control device 683 but is in series communication with airflow control device 685. Airflow control device 685 is in parallel communication with airflow control device 681. Airflow control devices 681 and 683 are in series communication.

The present invention is also directed to a method and apparatus for cooling extruded film tubes, which utilizes a mass air flow sensor to provide a measure of the flow of air in terms of both the air density and air flow rate. The mass air flow sensor provides a numerical value which is indicative of the mass air flow in an air flow path within a blown film extrusion system. A controller is provided for receiving the measure of mass air flow from the mass air flow sensor and for providing a control signal to an adjustable air flow attribute modifier which serves to selectively modify the mass air flow in terms of mass per unit time by typically changing one or more of the cooling air temperature, the cooling air humidity, or the cooling air velocity. The preferred method and apparatus for cooling extrude film tubes is depicted and described in detail in FIGS. 30 through 36, and the accompanying text.

The particular type of mass air flow sensor utilized in the present invention makes practical the utilization of mass air flow values in blown film extrusion systems. Of course, "mass air flow" is simply the total density of the cooling air or gas multiplied times the flow rate of the cooling air or gas. Typically, blown film extrusion lines utilize ambient air for cooling and/or sizing the molten blown film tube as it emerges from the annular die. It may become economically practical in the future to utilize gases other than ambient air; for purposes of clarity and simplicity, in this detailed description and the claims, the term "air" is intended to comprehend both ambient air as well as specially provided gases or gas mixtures.

While it is simple to state what the "mass air flow" represents, it is far more difficult to calculate utilizing conventional techniques. This is true because of the difficulty associated with calculating the density of air. Air which contains water vapor requires the following information for the accurate calculation of "mass air flow": the relative humidity of the air, the absolute pressure of the air, the temperature of the air, the saturation vapor pressure for the air at the given temperature, the partial pressure of the water vapor at the given temperature, the specific gravity of the air, and the flow rate of the air. Utilizing conventional sensors, one could easily measure relative humidity, temperature of the air, absolute pressure, and the flow rate of the air. With established data tables correlating the temperature of the gas and the relative humidity, the saturation vapor pressure and the partial pressure of the water vapor can be calculated. For ambient air applications, the specific gravity of the gas is unity so it drops out of consideration. A good overview of the complexity associated with the calculation of these factors which make up the "mass air flow" is provided in a book entitled *Fan Engineering: An Engineers Handbook On Fans And Their Applications*, edited by Robert Jorgensen, 8th edition, which is published by Buffalo Forge Company of Buffalo, N.Y. While such calculations are not particularly difficult given modern technologies for both sensors and data processors, the utilization of a single sensor which provides a direct indication of the "mass air flow" lessens the costs associated with implementation of the method and apparatus for cooling extruded film tubes of the present invention. Such use of a mass air flow sensor also reduces the complexity associated with calculating mass air flow utilizing a more conventional technique. This can be seen by comparing the calculations required for a system which does not utilize a mass air flow sensor, with one which does utilize a mass air flow sensor. The "mass flow rate" of air is determined by equation 1.1 which is set forth here below:

Mass Flow Rate=Density*Flow Rate         Equation 1.1

Of course, the flow rate is easy to obtain from flow rate meters, but the density of the cooling air must be determined in accordance with equation 1.2 which is set forth here below:

Equation 1.2

$$\text{Density} = \frac{((P - Pws\varphi) + Pws\varphi\omega)}{.7543(T + 459.7)}$$

wherein P is representative of the absolute pressure of the air, Pws is representative of the saturation vapor pressure, $\Psi$ is representative of the relative humidity, and $\omega$ is representative of the ratio of the density of the water vapor to the density of dry air, and T is representative of the temperature of the cooling air in degrees F. Since we measure P, $\Psi$, and T directly, we only have to derive Pws and ω. By using a saturation vapor pressures table of water, we can determine the saturation vapor pressure (Pws) from the temperature of the cooling air. The following equation 1.3 allows one to calculate ω, which is the ratio of the water vapor density to dry air density:

Equation 1.3

$$\omega = 1.6214 + \frac{\varphi(Pws)^{1/1.42}}{1130}$$

This formula is accurate to 0.1% in the range of temperatures from 32° F. to 400° F.

Therefore, it is evident that, in addition to a velocity sensor, sensors must be provided for the measurement of pressure, relative humidity, and temperature. Additionally, the saturation vapor pressure and the ratio of the density of water vapor to the density of dry air must be calculated utilizing a provided table, which in microprocessor implementations must be represented by a data array maintained in memory. All together, the complexity and opportunity for error presented by such an array of sensors and series of calculations and table look-up operations renders this technique difficult and expensive to implement.

In contrast, the present invention for cooling extruded tubes utilizes a single sensor which provides a direct measurement of the mass air flow. Such mass air flow sensors have found their principle application in internal combustion engines, and are described and claimed in the following issued United States Patents, each of which is incorporated herein by reference as if fully set forth:

(1) U.S. Pat. No. 4,366,704, to Sato et al., entitled Air Intake Apparatus For Internal Combustion Engine, which issued on Jan. 4, 1983, and which is owned by Hitachi, LTD., of Tokyo, Japan;

(2) U.S. Pat. No. 4,517,837, to Oyama et al., entitled Air Flow Rate Measuring Apparatus, which issued on May 21, 1985, and which is owned by Hitachi, LTD., of Tokyo, Japan;

(3) U.S. Pat. No. 5,048,327, to Atwood, entitled Mass Air Flow Meter, which issued on Sep. 17, 1991;

(4) U.S. Pat. No. 5,179,858, to Atwood, entitled Mass Air Flow Meter which issued on Jan. 19, 1993.

Mass air flow sensors operate generally as follows. One or more (typically platinum) resistor elements are provided in an air flow path way. An energizing current is provided to the one or more resistor elements. Air passing over the resistor elements reduces the temperature of the resistor elements. A control circuit is provided which maintains currents at a constant amount in accordance with King's Principal.

For the particular mass air flow sensor utilized in the preferred embodiment of the present invention, the mass air flow of the air flowing through an air pathway within a blown film extrusion system is established in accordance with equation 1.4 as follows:

Mass Flow Rate=a1.601 (sensor reading+offset)$^c$      Equation 1.4 wherein the constants are attributable to the specific construction of the sensor assembly.

In accordance with the present invention, a mass air flow sensor is utilized to control air flow to cool molten polymers when extruded in a thin film tube. The air flow may be provided in contact with either an interior surface of the thin film tube, an exterior surface of the thin film tube, or both an interior surface of the thin film tube and an exterior surface of the thin film tube. The air flow amount must be consistent in order to maintain the desired cooling rate of the polymer. Changes in the cooling rate modify the extent to which polymer chains are formed, linked, and cross-linked. Under the prior art, the cooling air is at best controlled to a constant temperature. There is no consideration in prior art systems to the changes in the heat removing capacity of the air as the air gets more or less humid, or as the absolute pressure changes. Changes in the barometric pressure of one inch of mercury can change the mass air flow rate by 3.3%. Changes in the temperature in the air typically have the greatest effect on the heat removing capacity of the cooling air, with a 10% change in relative humidity causing a tenth of 1% change in mass air flow rate. It is estimated that utilization of the present invention in blown film extrusion lines which have temperature control will add an additional accuracy in cooling up to 3.5%. For blown film extrusion lines which do not have temperature control, the consistency in cooling can be improved by an amount estimated at 13% to 15% provided physical limits of the attribute modifying equipment are not reached.

Cooling efficiency of course influences the production rate which can be obtained blown film extrusion lines. Generally speaking, it is desirable to have the extruded molten material change in state from a molten state to a solid state before the blown film tube travels a predetermined distance from the annular die. In the industry, the location of the state change is identified as the "frost line" in a blown film tube. In the prior art, when big changes occur in the temperature, humidity, or barometric pressure, the frost line of the extruded film tube may move upward or downward relative to a desired location. This may cause the operator of the blown film line to decrease production volumes in order to keep from jeopardizing product quality, since product quality is in part determined by the position or location of the frost line. While utilization of the present invention improves the cooling of extruded film tubes, the present invention also can be utilized to compensate for changes in the mass air flow rate of the cooling gas supplied to the interior of a blown film tube and the hot exhaust gas drawn from the blown film tube, to provide essentially a constant frost line height, or at least a frost line height that does not move because of changes in the mass air flow rate. Of course, the present invention can be utilized in combination with prior art external cooling devices for blown film extrusion lines to provide the same benefit.

So considered broadly, the present invention can be utilized to accomplish a number of desirable results, including:

(1) it can be used as a frost line leveler for blown film extrusion line with external air cooling only;

(2) it can be used in both the supply and exhaust systems of an internal-bubble-cooling blown film extrusion system to manage and maintain a balanced air flow between the supply and exhaust, which could greatly stabilize the position of the frost line insofar as changes in the ambient temperature, humidity, and barometric pressure effect the position of the frost line; this could eliminate the need for prior art frost line location sensors;

(3) the mass air flow sensor can be utilized in combination with the controller or computer to determine the most effective and efficient operating range of flow pump devices such as blowers, and fans, by allowing the computer to determine the mass air flow rate with relation to blower speed (and valve position) and then systematically eliminate undesirable ranges of operation, which are generally found at the lowest and highest ends of the operating range, where the flow pump or valve may perform in a non-linear fashion which would introduce unstable characteristics into the operation of the blown film line;

(4) the mass air flow sensor can be utilized to provide a rather slow feed back signal to a supply blower in the blown film line, to compensate for changes in the ambient air, such as temperature, humidity, and barometric pressure, which effect the mass air flow rate;

(5) the mass air flow sensor can be used to provide a feed back loop which enhances the operation of a flow control valve in the line, to ensure that the valve operation is providing a particular air flow characteristic in response to a particular valve activation signal.

Figure 30:
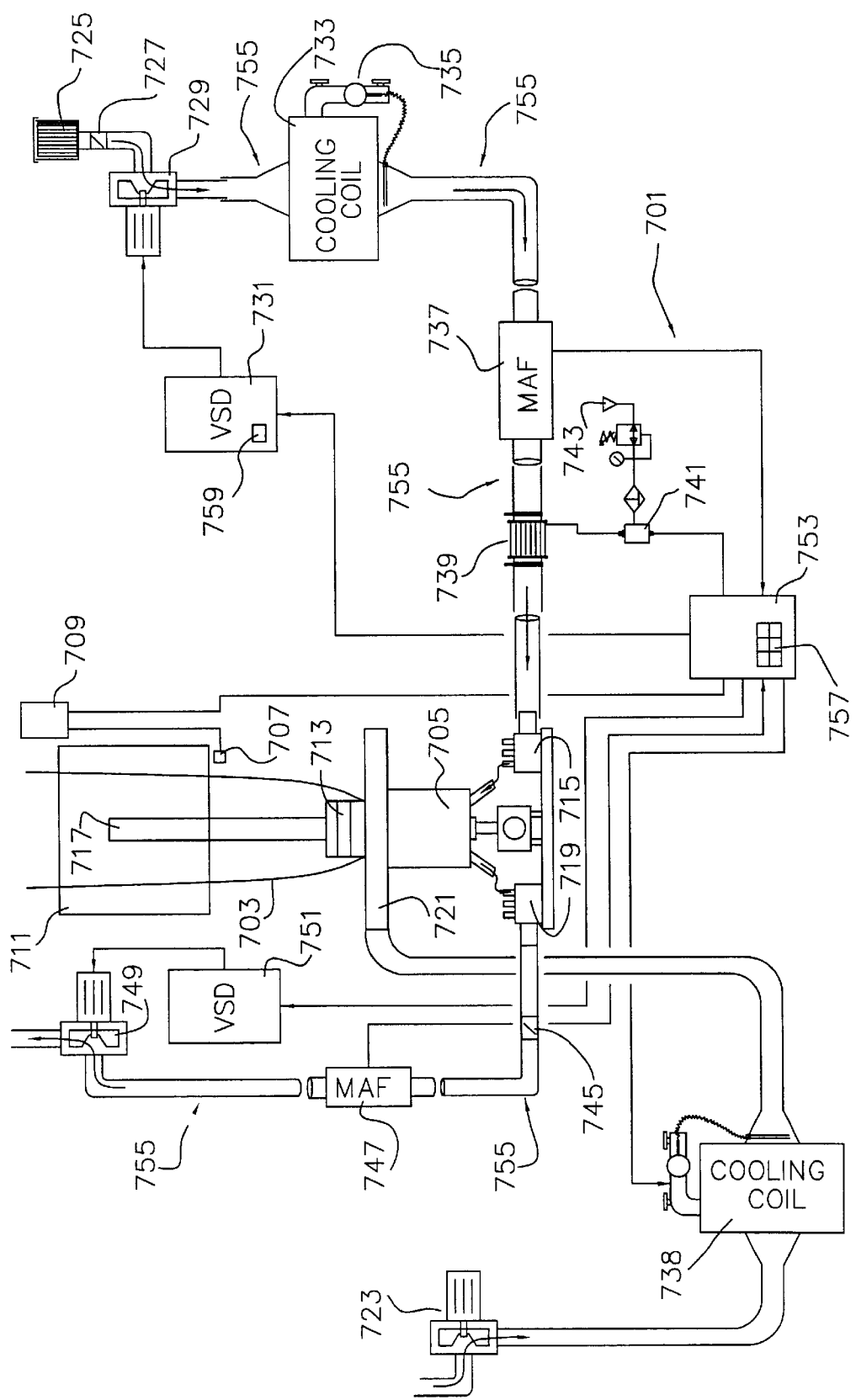
FIG. 30 is a schematic depiction of a IBC blown film extrusion line equipped with mass air flow sensors in communication with both a supply of cooling air and an exhaust of cooling air, which may be utilized to obtain uniformity in the mass air flow of the cooling air stream supply to the interior of the blown film tube.
Figure 31:
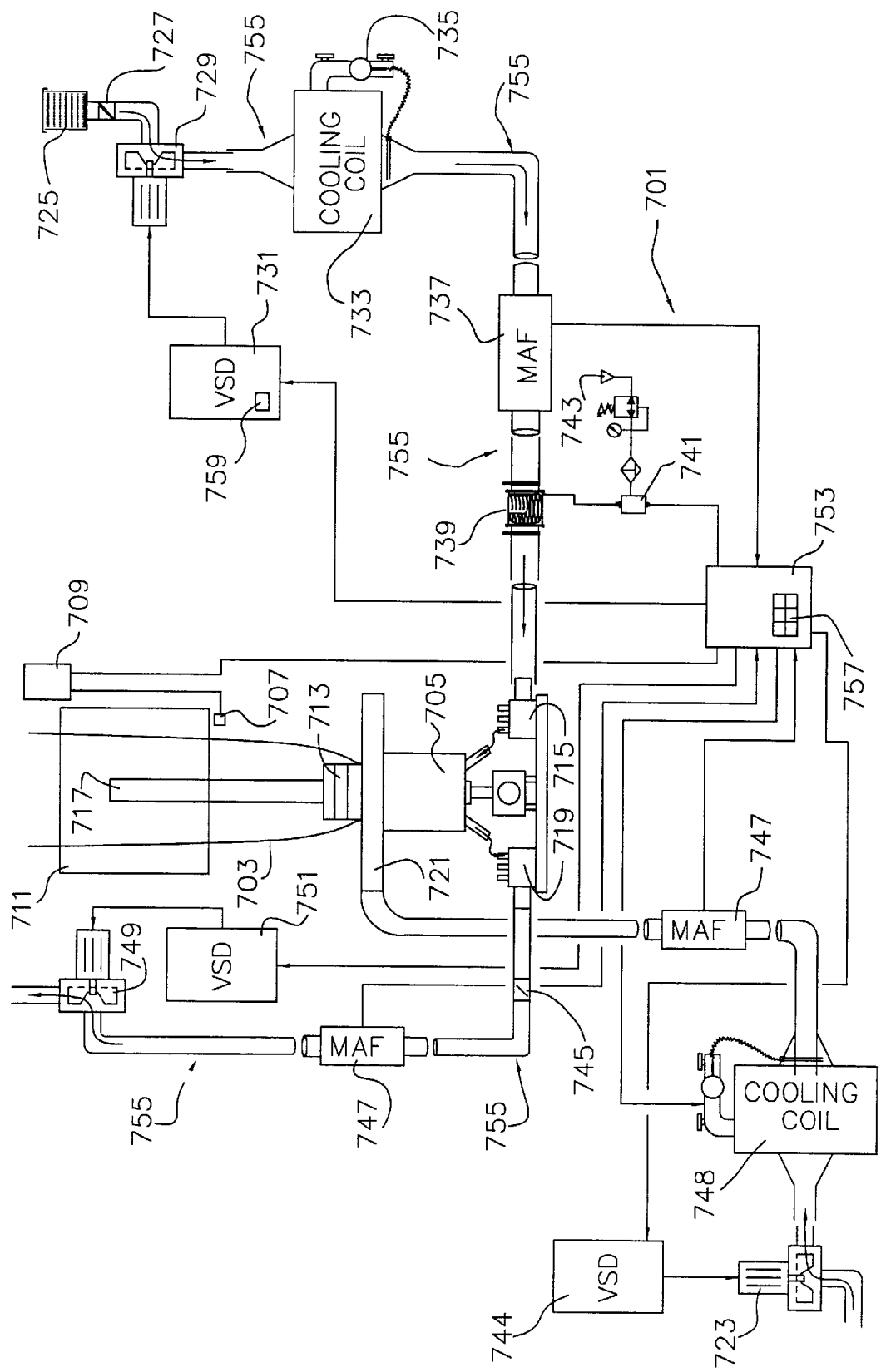
FIG. 31 is a schematic depiction of an IBC blown film line equipped with mass air flow sensors for controlling the supply and exhaust of air to the interior of the blown film tube, and additionally equipped with a mass air flow sensor for monitoring and controlling the supply of external cooling air.

In the following detailed description, FIGS. 30 and 31 are directed to a blown film extrusion system which includes an internal cooling air flow and an external cooling air flow. In contrast, the detailed description relating to FIGS. 32 through 35 are directed to a more simple blown film extrusion system which includes only an external cooling air flow.

With reference first to FIG. 30, there is depicted an internal-bubble-cooling blown film extrusion line 701 in schematic form. As is shown, blown film tube 703 is extruded from annular die 705. An ultrasonic transducer 707 is utilized to gage the position of blown film tube 703, and provides a control signal to position processor 709, all of which has been discussed in detail in this detailed description. A sizing cage 711 is provided to size and stabilize the blown film tube 703. A flow of internal cooling air is supplied to the interior of blown film tube 703 through supply stack 713. As is conventional, exhaust stack 717 is also provided in an interior position within blown film tube 703 for removing the cooling air from the interior of blown film tube 703. A cooling air is supplied to supply stack 713 through supply distributer box 715, and the exhausted air is removed from blown film tube 703 through exhaust distributor box 719. Additionally, an external cooling air ring 721 is provided for directing a cooling stream of air to an exterior surface of blown film tube 703. Cooling air ring 721 collaborates with the internal cooling air stream to change the state of the molten material from a molten state to a solid state. Cooling air ring 721 is provided with entrained ambient air from air ring blower 723 which may be set tot a flow rate either manually or automatically.

Supply distributor box 715 is provided with an entrained stream of cooling air in the following manner. Ambient air is entrained by the operation of supply blower 729. It is received at input filter 725, and passed through (optional) manual damper 727. If supply blower 729 is a variable-speed-drive type of supply blower, then manual damper 727 is not required. Preferably, however, supply blower 729 is a variable speed drive controller which provides a selected amount of air flow in response to a command received at a control input of variable-speed-drive 731. Also, preferably, variable speed drive controller is optionally subject to synchronous command signals from IBC controller 753 which controls the general operations of the blown film extrusion line. The entrained ambient air is routed through air flow path 755, first through cooling system 733, which preferably includes a plurality of heat exchange coils and heat transference medium in communication with the air flow, which receives a circulating heat exchange medium (such as chilled water for transferring heat), past mass air flow sensor 737, through air flow control device 739 (such as that depicted and described in connection with sensor 737 provides a voltage signal which is indicative of the mass air flow of the air flowing through air flow path 755 in the region between cooling system 733 and air flow control device 739. Air flow control device 739 operates in response to proportional valve 741 and selectively receives compressed air from compressed air supply 743. Air flow control device 739 includes a plurality of members which may be expanded and contracted to enlarge or reduce the air flow path way through he housing of air flow control device. This allows for the matching of loads, as is discussed above in connection with FIGS. 28 and 29. Proportional valve 741 is under the control of IBC controller 753.

Exhaust distributer box 719 removes cooling air from blown film tube 703 and routes it through damper 745, into air flow path 755. The air passes through mass air flow sensor 747 which provides a voltage which is indicative of the mass air flow of the exhaust from blown film tube 703. The air is pulled from air flow path 755 by the operation of exhaust blower 749 which is responsive to an operator command, preferably through a variable speed drive 751, which is also preferably under the synchronous control command of IBC controller 753.

In broad overview, mass air flow sensor 737 provides an indication of the mass air flow of the cooling air which is supplied through supply distributor box 715 to supply stack 713. This cooling air removes heat from blown film tube 703, helping it change from a molten state to a solid state. Mass air flow sensor 747 is in communication with the exhaust air removed through exhaust stack 717 and exhaust distributor box 719. Mass air flow sensor 747 provides a voltage which is indicative of the mass air flow of the exhaust cooling air. The measurements provided by mass air flow sensors 737,747 are supplied to a controller which includes a microprocessor component for executing preprogrammed instructions.

In accordance with the present invention, IBC controller 753 compares the values from mass air flow sensors, 737, 747 and then provides command controls to variable speed drives 731, 751 in order to effect the operation of supply blower 729 and/or exhaust blower 749. Preferably, IBC controller 753 may be utilized in response to an operator command to maintain supply blower 729 and/or exhaust blower 749 at a particular level or magnitude of blower operation, or to provide a particular ratio of blower operation, so that when the temperature, humidity, or barometric pressure of the ambient air changes significantly, the blowers adjust the flow rate of the input cooling air and exhaust cooling air to blown film tube 703 to maintain uniformity of heat absorbing capacity of the internal cooling air, notwithstanding the change in temperature, humidity, and/or barometric pressure.

Figure 36:
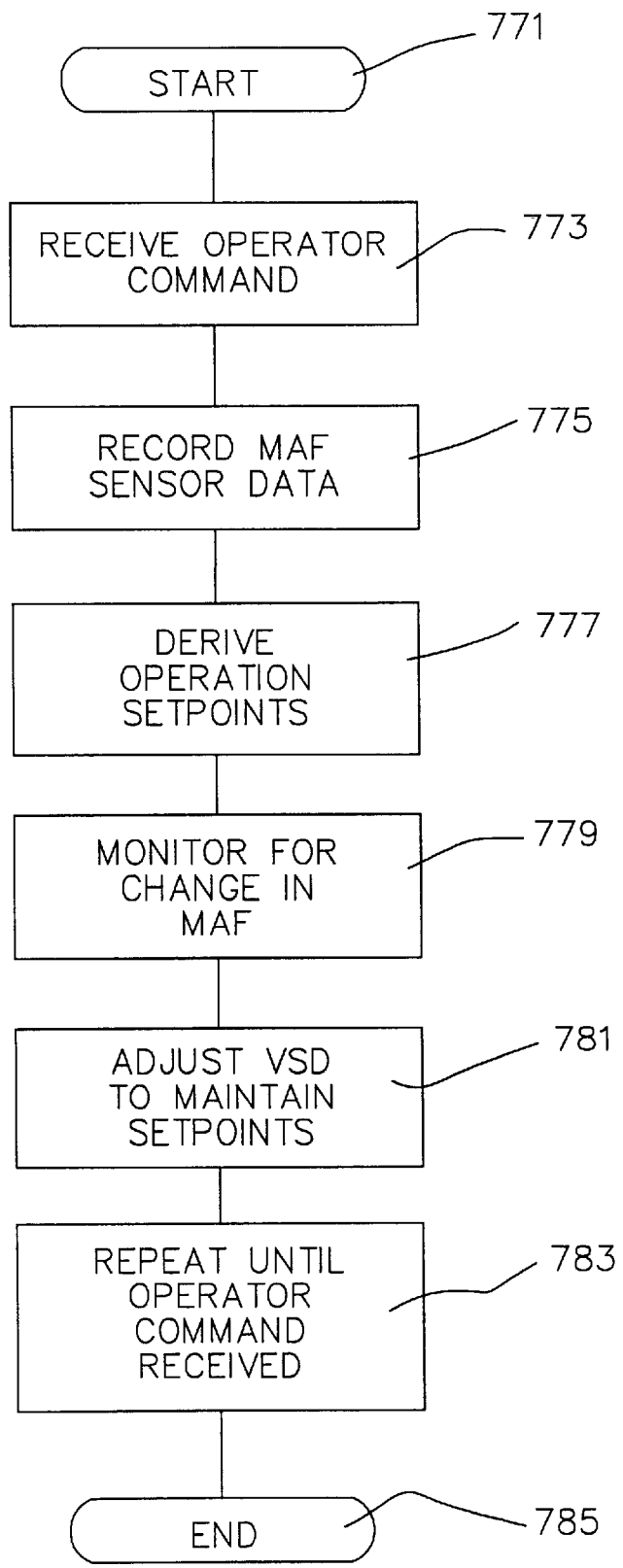
FIG. 36 is a flowchart representation of computer program implemented operations for achieving a feedback control loop for a blown film system.

The operation of this rather simple feed back loop is set forth in flowchart form in FIG. 36. The process starts at software block 771, and continues at software block 773, wherein IBC controller 753 receives an operator command from either an operator interface 757 on IBC controller 753, or an operator interface 759 on variable speed drive 731. Next, values provided by mass air flow sensors 737 and 747 are recorded in memory, in accordance with software block 775. Then in accordance with step 777, operation set points are derived. For example, a particular ratio between the mass air flow detected at mass air flow sensor 737 and mass air flow sensor 747 may be derived. Then, in accordance with step 779, IBC controller 75 monitors signals from mass air flow sensors 737 and 747 for changes in mass air flow, which are principally due to changes in the ambient temperature, humidity, and barometric pressure. Once a change is detected, in accordance with step 781 IBC controller 753 synchronously adjusts the variable speed drives 759, 731, 751 in order to affect the value of the mass air flow of ambient air which has been entrained and which is flowing through air flow passage way 755 in a manner which returns operation to the set point values derived in step 777. For example, variable speed drive 731, 751 may be utilized to increase or decrease the volume of air entrained by supply blower 729 and/or exhausted by exhaust blower 749. In accordance with step 783, this process is repeated until an additional operator command is received. Such commands may include an instruction to obtain a new operation set point, or to discontinue the feed back loop until instructed otherwise. A cooling coil 738 may also be provided in communication with air flow path 745, and may be adjusted in response to IBC controller 753 to adjust the value of mass air flow.

FIG. 31 depicts an alternative to the embodiment of FIG. 30 wherein mass air flow sensors are utilized to control both the internal cooling air supply to the interior of blown film tube 703 and an external cooling air stream which is supplied to the exterior surface of blown film tube 703 from air ring 721. The figures differ in that, in addition of having a control system for internal cooling air, a control system for external cooling air is also provided with a mass air flow sensor 747 positioned in air flow path 741 between air ring blower 723 and cooling air ring 721. Mass air flow sensor 747 provides a measurement of the mass air flow of the air flowing within air flow path 745. This measurement is provided to IBC controller 753 and compared to a set point value which has been either manually entered by the operator at operator interface 757 or which has been automatically obtained in response to an operator command made at operator interface 757. IBC controller 753 supplies a control signal to variable speed drive 744 which is utilized to adjust the operating condition of air ring blower either upward or downward in order to maintain the established set point. If the mass air flow sensor 747 indicates to IBC controller 753 that the total mass air flow has been diminished (perhaps due to changes in temperature, humidity, and barometric pressure), then IBC controller 753 may supply a command signal to variable speed drive 744 which increases the throughput of air ring blower 723 in a manner which compensates for the diminishment in mass air flow as detected by mass air flow sensor 747. If mass air flow sensor 747 detects an increase in the mass air flow, IBC controller 753 may provide a command signal to variable speed drive 744 which increases the throughput of air ring blower 723 in a manner which compensates for the diminishment in mass air flow a detected by mass air flow sensor 747. If mass air flow sensor 747 detects an increase in the mass air flow, IBC controller 753 may provide a command signal to variable speed drive 744 which reduces the throughput of air ring blower 723, thus diminishing the amount of mass air flow in order to make it equal to the set point maintained in memory in response to an operator command. This simple feedback loop is also characterized by the flowchart depiction in FIG. 36. Since changes in ambient temperature, ambient humidity, and barometric pressure are rather slow, it is not necessary that this feedback loop be a very fast loop. It is sufficient that every few minutes the value for the mass air flow sensor be monitored to determine the numeric value of the mass air flow, that this value be compared to a set point recorded in memory, and that an appropriate command be provided to blower in order to adjust the mass air flow upward or downward to make it equivalent to the set point value. This allows a program which implement the present invention to be "piggy backed" onto the IBC controller 753. The calculations required to compare mass air flow values to set points is trivial and these operations need only be performed every few minutes, so the IBC controller can spend the vast majority of its computational power of controlling the blown film line, with only a de minimis portion expended to occasional checking and adjusting of the mass air flow. Additionally, a cooling coil 74 may be provided in communication with air flow path 745, and may be provided in communication with air flow path 745, and may be adjusted in response to IBC controller 753 to adjust the value of mass air flow.

The present invention can also be utilized in far simpler blow film extrusion systems which utilize only external cooling air to remove heat from a molten blown film tube. Four particular embodiments are depicted in FIGS. 32, 33, 34, and 35. In each of these embodiments, a mass air flow sensor is positioned intermediate and external cooling air ring and a blower for entraining and supplying air to the cooling ring. Additionally an adjustable air flow attribute modifier is provided in the air flow path for selectively modifying the air mass per unit time. This adjustable air flow attribute modifier may comprise any mechanism for adjusting for modifying the mass air flow, but in particular will most probably comprise a cooling coil system which chills the cooling air, or an air flow control device which restricts or enlarges the quantity of air available for entrainment by the supply blower, or a fluid injection system which modifies the humidity of the cooling air. Each of these three principle alternative embodiments will be discussed in detail herebelow in connection with FIGS. 32, 33, 34, and 35.

Figure 32:
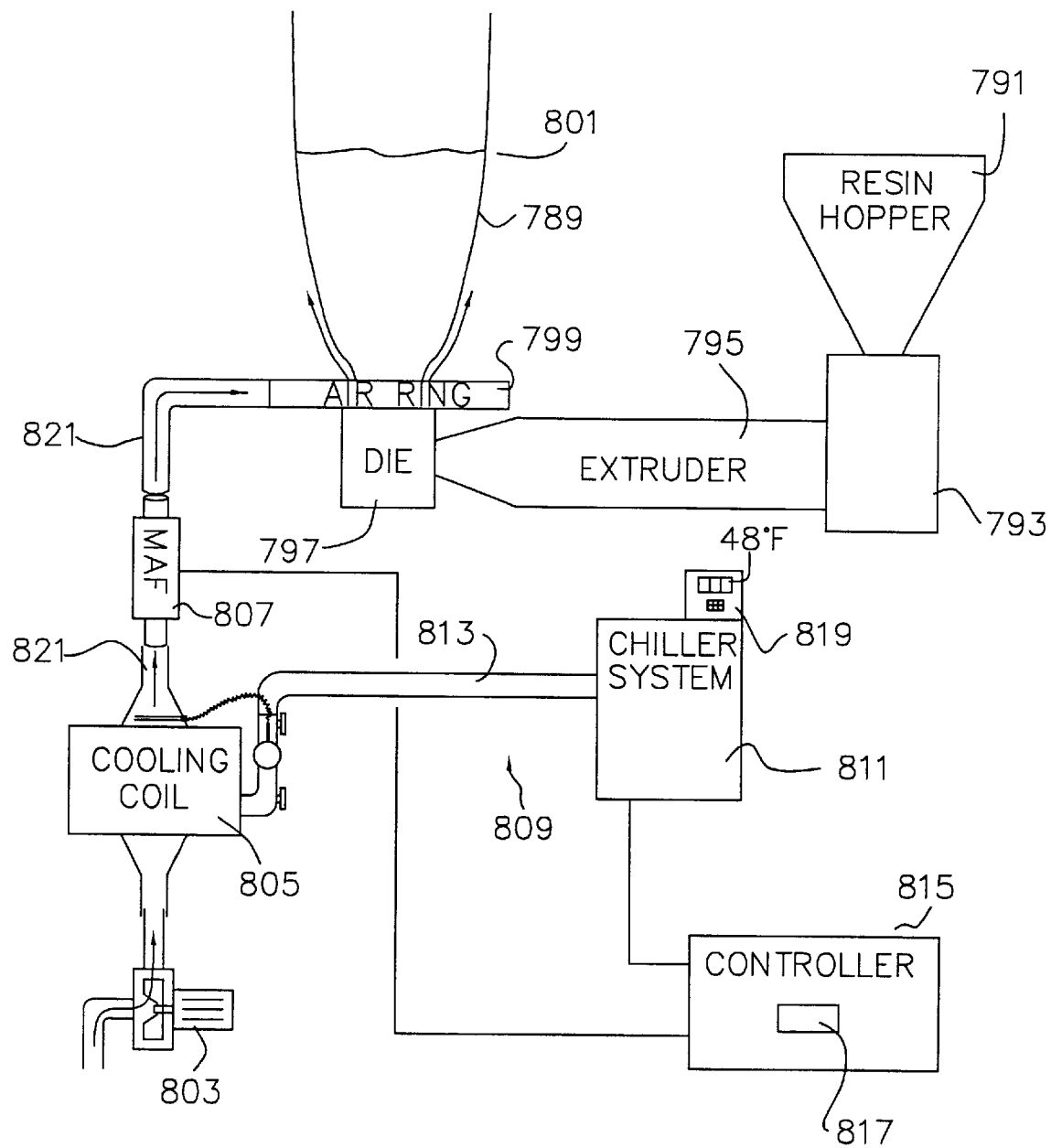
FIGS. 32, 33, 34, and 35 are schematic depictions of an external cooling air system for a blown film extrusion line, with a mass air flow sensor provided to allow control over an adjustable air flow attribute modifier.
Figure 33:
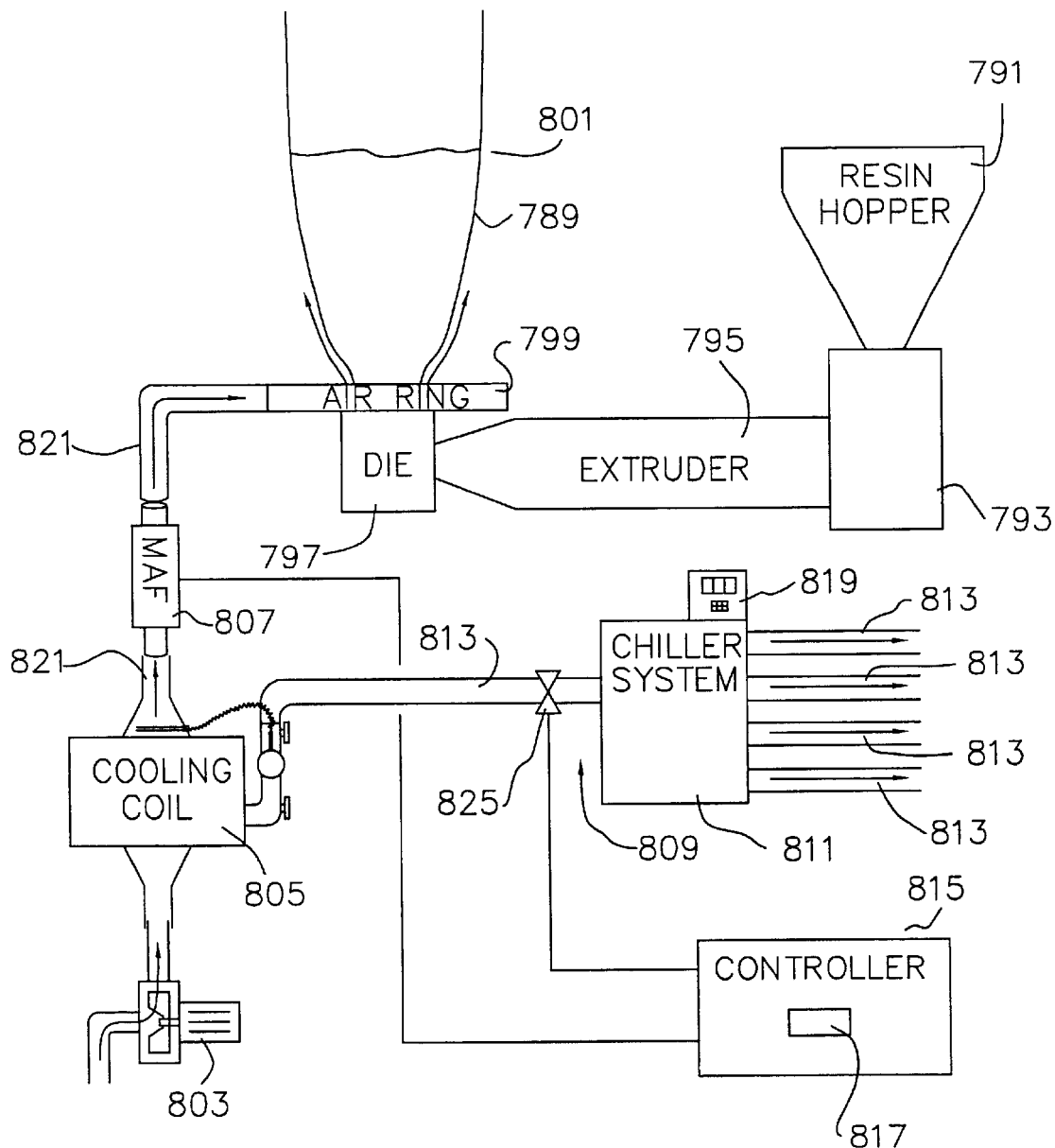

Turning first to FIG. 32, an external cooling blown film extrusion line is depicted in schematic form. Plastic pellets are loaded into resin hopper 791, passed through heating apparatus 793, and driven by extruder 795 through die 797 to form a molten extruded film tube 789, with a portion of the extruded film tube 789 below frost line 801 being in a molten state, and that portion above frost line 801 being in a solid state. Air ring 799 is positioned adjacent die 797 and adapted to route cooling air along the exterior surface of blown film tube 789. Air ring 799 is supplied with cooling air which is entrained by air ring blower 803, routed through cooling coils 805 of cooling system 809, and through mass air flow sensor 807. Preferably, mass air flow sensor 807 is positioned in air flow path 821 intermediate cooling coils 805 and external cooling air ring 799. Cooling coils 805 are adapted to receive chilled water 813 from chiller system 811. Controller 815 is provided for receiving a signal from mass air flow sensor 807 which is indicative of the mass air flow of the cooling air flowing through air flow path 821, and for providing a command signal to chiller system 811 which adjusts the temperature of chilled water 813 which is routed through cooling coil 805. A feed back loop is established about a set point selected by the operator when a set point selection command button 817 is depressed. Controller 815 will respond to the command by recording in memory the mass air flow value provided by mass air flow sensor 807, and by adjusting the chiller system 811 upward or downward in temperature in order to maintain the mass air flow value of cooling air flowing through air flow path 821 at a value established by the set point. Of course, the operator has an operator interface for chiller system 811 which allows for the operator setting of the temperature of chiller system 811. This system works once the operator has established that sufficient cooling has been obtained, and should provide an equivalent level of cooling from the external cooling air provided by air ring 799 even though the ambient air changes its density through relatively slow changes in temperature, humidity, and barometric pressure. The embodiment of FIG. 32 is especially suited for blown film extrusion lines which have a dedicated chiller system. The embodiment of FIG. 33 depicts a more common scenario, wherein a single chiller system is shared by multiple blown film lines. In this event, the configuration differs insofar as chiller system 811 is utilized to provide chilled water 813 for delivery to multiple heat exchange cooling coils, with a flow valve, such as flow valve 825, being provided of each set of heat exchange cooling coils to increase or decrease the flow o circulating heat exchange fluid in order to alter the temperature of the cooling air in air flow path 821. In the embodiment depicted in FIG. 33, controller 815 provides an electrical command signal to an electrically-actuated flow valve 825 in order to increase or decrease the flow of chilled water 813 from chiller system 811 to cooling coil 805. Similar to the embodiment of FIG. 32, the operator instructs controller 815 to record the mass air flow value from mass air flow sensor 807, and to utilize that as a set point for operation. Thereafter, changes in the mass air flow property of the cooling air passing through air flow path 821, such as changes caused by changes in temperature, humidity, and barometric pressure, are accommodated by increasing or diminishing the flow of chilled water from chiller system 811 to heat exchange cooling coil 805. Increases in mass air flow will result in the controller 815 providing a command to electrically-actuated flow valve 825 to diminish the flow of chilled water; in contrast, decreases in mass air flow as detected by mass air flow sensor 807 will result in controller 815 providing a command signal to electrically-actuated flow valve 825 to increase the flow of chilled water from chiller system 811 to heat exchange cooling coils 805.

Figure 34:
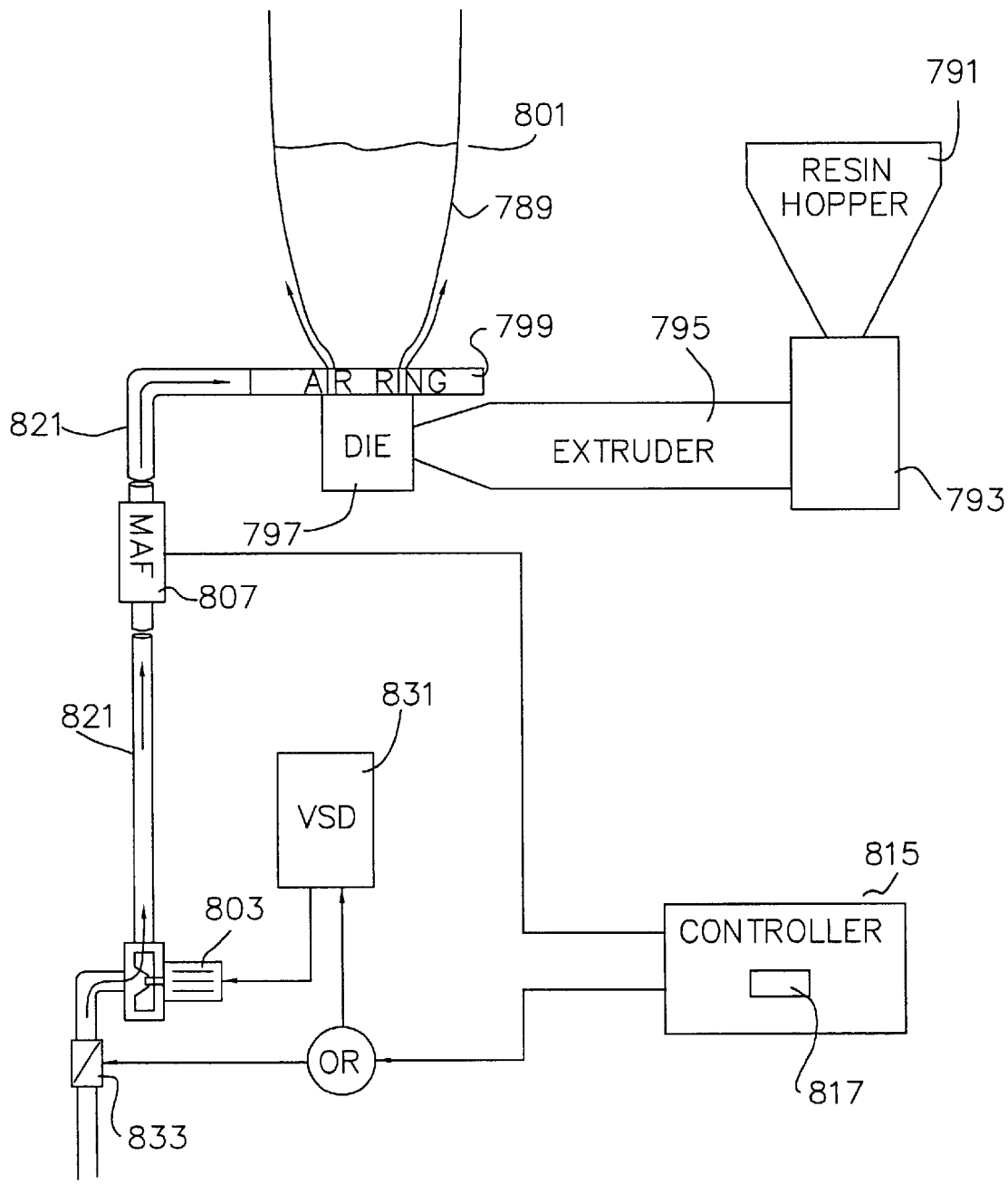

FIG. 34 is a schematic depiction of an external air blown film extrusion line, with blown film tube 789 extending upward from die 797 and being cooled by an air stream in contact with an exterior surface of blown film tube 789 which is provided by air flow path 821. Air flow path 821 includes mass air flow sensor 807 which provides a numerical indication of the mass air flow of the air passing through air flow path 821. It provides this numerical indication to controller 815, which in turn supplies a command signal to either variable speed controller 831 or air flow control device 833 (such as that depicted in FIGS. 28 & 29 above), each of which can effect the volume of air which is entrained by air ring blower 803. Controller 815 includes a manual control 817 which is utilized by the operator to establish a set point of operation. Typically, the operator will get the blown film line operating in an acceptable condition, and then will actuate the set point command 817, causing controller 815 to record in memory the value provided by mass air flow sensor 807. Thereafter, changes in the mass air flow due to changes in temperature, humidity, or barometric pressure will be compensated for by variation in the amount of air entrained by air ring blower 803, in order to maintain mass air flow value at or about the set point value. For example, if the mass air flow value decreases, as determined by the mass air flow sensor 807, variable speed controller 831 or air flow control device 833 are provided with command signals from controller 815 to increase the volume of air flowing through air flow path 821; however, if the mass air flow value increases, as determined by mass air flow sensor 807, controller 815 provides a command signal to either variable speed controller 831 or air flow control device 833 in order to decrease the volume of air entrained by air ring blower 803. In this manner, controller 815 may intermittently check the value of the mass air flow, compare it to a set point value recorded in memory, and adjust the volume of air entrained by air ring blower 803 in order to maintain a mass air flow value at or about the set point. In this manner, the cooling ability the air stream in contact with the exterior of extruded film tube 789 is maintained at a constant level notwithstanding gradual or dramatic changes in temperature, humidity, and barometric pressure.

Figure 35:
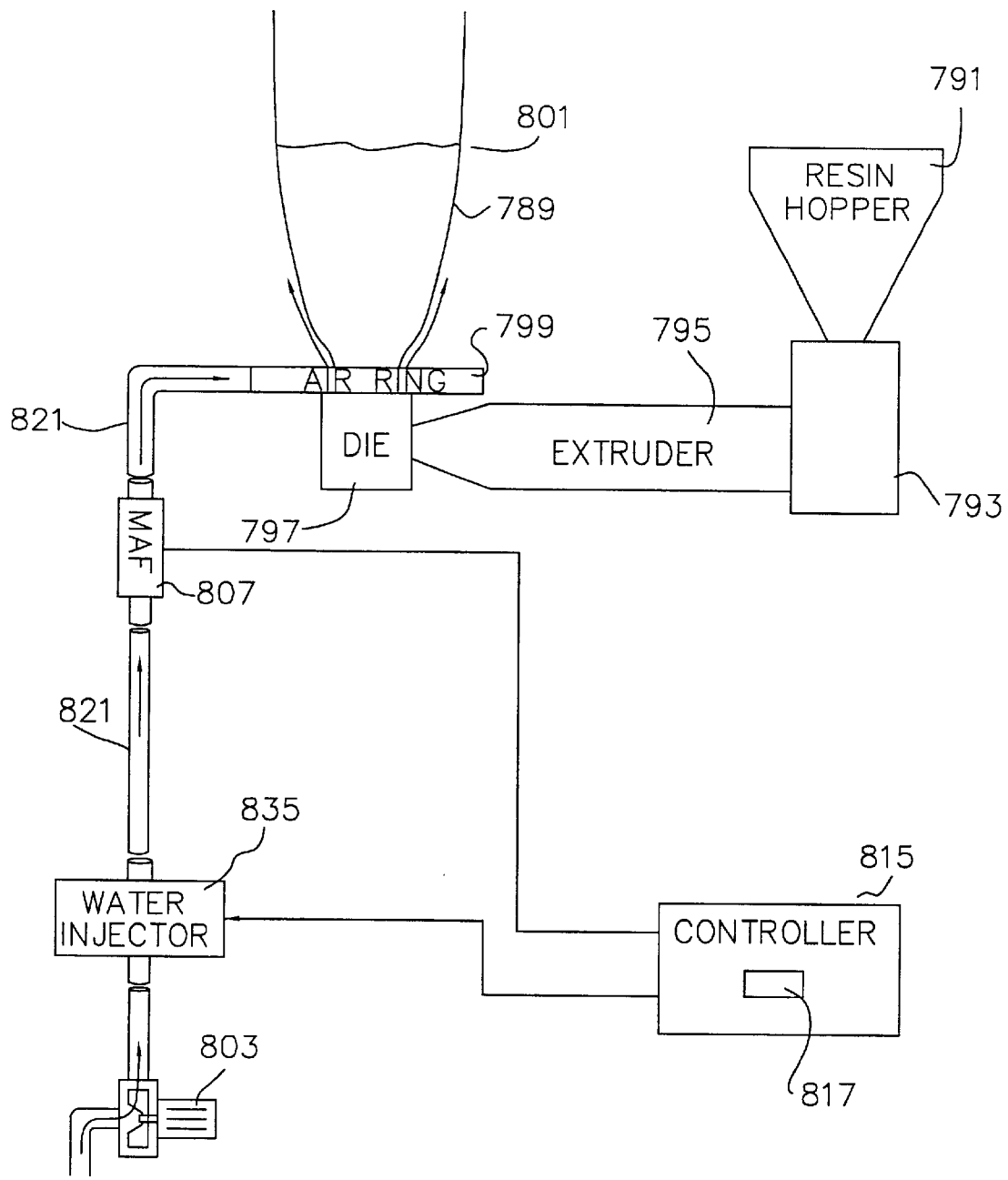

FIG. 35 depicts yet another embodiment of the invention, wherein an external cooling blown film extrusion line is depicted in the schematic form, with extruded film tube 789 extending upward from annular die 797, which is cooled by an air stream provided by cooling air ring 799 Cooling air ring 799 receives its cooling air from air flow path 821. Mass air flow sensor 807 is positioned in air flow path 821, and is adapted to provide a signal indicative of the mass air flow of air flowing through this passage way, to controller 815. Controller 815 provides a command signal to water injector 835 which is also in communication with the air passing through air flow path 821. Water injector 835 is adapted to increase the humidity of the air entrained by blower 803 in response to a command from controller 815. In accordance with this embodiment of this invention, the operator depresses a set point control 817 on controller 815 in order to establish a set point o operation for controller 815. Controller 815 records in memory the value of mass air flow sensor 807, and thereafter continuously monitors the values provided by mass air flow sensor 807 in comparison to the set point. When an increase in mass air flow is required, controller 815 provides a command signal to water injector 835 which provides a predetermined amount of moisture which is immediately absorbed by the air entrained by air ring blower 803. When no additional humidity is required, controller 815 will no provide such a command. In this manner, the mass air flow value for air entrained in air flow path 821 may be moderated by operation of controller 815. Since this system easily allows an increase in the mass air flow value, without allowing a corresponding decrease in the mass air flow value, it is particularly useful in very hot and dry climates.

In all embodiments, it is advisable to provide a predetermined time interval of time interval of monitoring before the set point is recorded and established. This allows the operator to make changes in the operating condition of the various blowers and other equipment in the blown film line prior to requesting that a set point be established. It takes many minutes (5, 10, or 20 minutes) in order for the system to reach a quiescent condition of operation. Having a pre-defined interval of time after request for a set point, during which the mass air flow values are monitored but not recorded, allows the operator to change the operating state of the blown film line, and request a set point value, at the same time, without obtaining a set point value which is perhaps not stable or quiescent. In yet another more particular embodiment of the present invention, the controller may be programmed to monitor the rate of change of the mass air flow value for predetermined time interval in order to determine for itself that a quiescent condition has been obtained. For example, a 10 or 20 minute interval may be provided after operator request of a set point, during which the controller continuously polls the mass air flow sensor, calculates a rate of change for a finite time interval, and records it in memory. Only when the rate of change reaches an acceptable level will the controller determine that a quiescent interval has been obtained, and thereafter record the mass air flow value in memory for utilization as a set point, or in the derivation of a set point, about which the feedback loop is established.

FIG. 37A is a pictorial and schematic representation of the prior art technique for controlling an extruded film tube during startup operations. In the prior art, a linear ratio controller is utilized by a human operator in order to determine and set the balance condition of a supply blower and an exhaust blower in a blown film extrusion apparatus. The prior art operates by utilizing human-set potentiometers in order to balance the supply component 1003, load component 1005, and the exhaust component 1007 in a linear ratio controller 1001. Determining the balance condition of a supply blower and an exhaust in a blown film extrusion apparatus is complicated by the fact that the blowers are non-linear. This is graphically depicted in FIGS. 37B and 37C. FIG. 37B is a graph 1009 of the response curve 1015 of a supply blower, with the X-axis 1011 representative of the air flow in units of cubic feet per minute, and the Y-axis 1013 representative of pressure in inches of water. As is shown in FIG. 37B, the response curve 1015 is not linear. FIG. 37C is a graph 1017 of the response curve 1023 of an exhaust blower, with the X-axis 1019 representative of air flow in cubic feet per minute, and the Y-axis 1021 representative of pressure in inches of water. As is clear from FIG. 37C, the response curve 1023 of the exhaust blower is not linear.

Figure 37D:
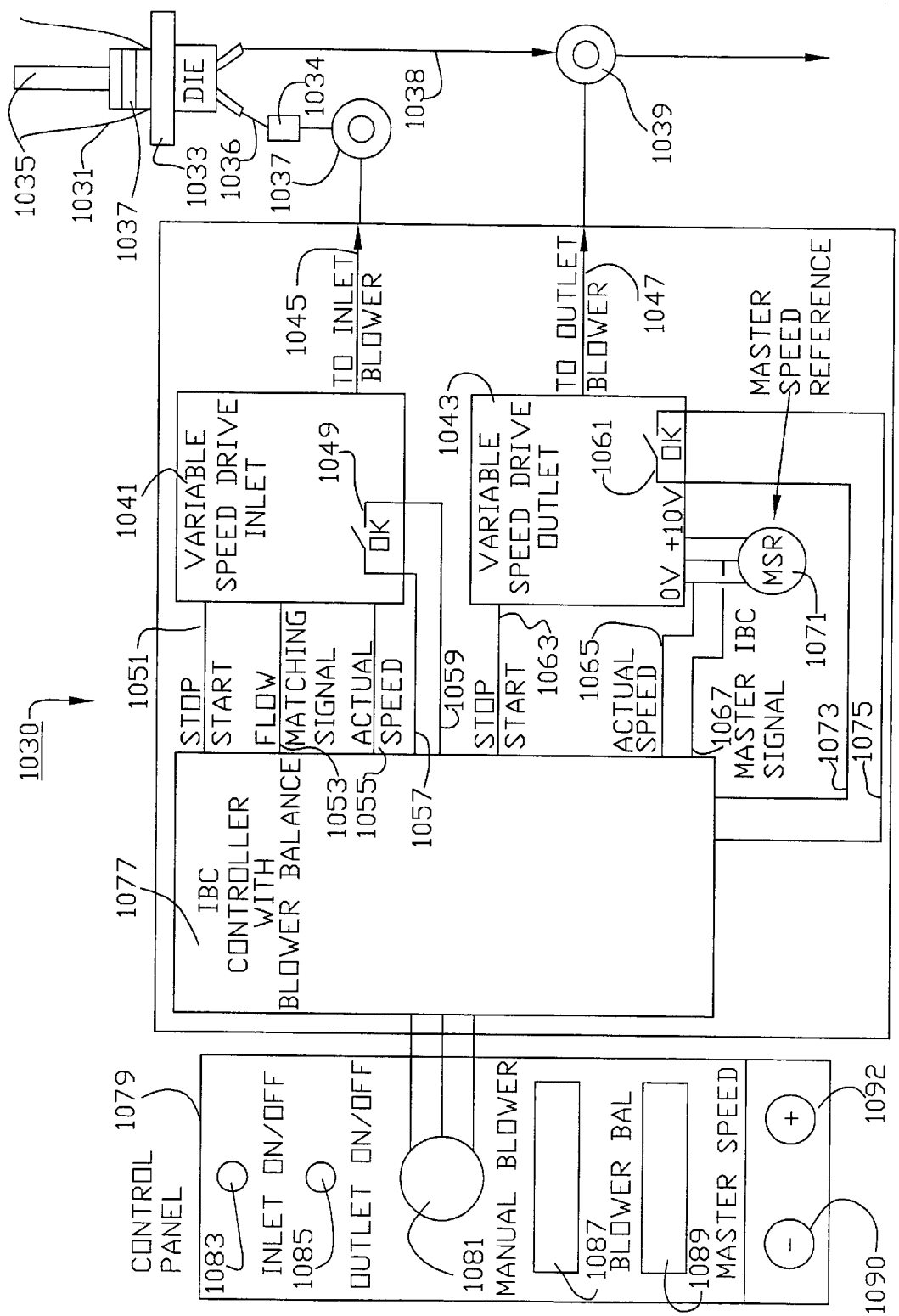
FIG. 37D is a block diagram and schematic representation of the startup control apparatus of the present invention.

FIG. 37D is a schematic and block diagram representation of the startup control apparatus 1030 of the present invention. As is shown, a die 1033 receives molten material and extrudes film tube 1031. Air is supplied to the interior of extruded film tube 1031 via supply inlet 1035, and air is exhausted from extruded film tube 1031 through exhaust outlet 137. During production operations, a balance between the supply and exhaust must be maintained (in fact, the balance is slightly biased toward supply) in order to maintain the extruded film tube 1031 at a predetermined and substantially constant circumference. As is shown in FIG. 37D, supply blower 1037 communicates through air flow pathway 1036 to supply air to the interior of extruded film tube 1031. In accordance with the preferred embodiment of the present invention, valve member 1034 is provided within air flow pathway 1036 in order to provide for adjustment of the supply in order to allow for fine control over the circumference of the extruded film tube 1031, as has been discussed in detail above. Valve 1034 may comprise a rotary valve (as discussed above) or an air flow control member which includes selectively-expandable flow restriction members (also as discussed above). Exhaust blower 1039 communicates with the interior of extruded film tube 1031 through air flow pathway 1038. Supply blower 1037 and exhaust blower 1039 are under the control of variable speed drive 1041 and variable speed drive 1043 through control lines 1045, 1047. Supply control signals are directed to supply blower 1037 via control line 1045 to increase or decrease its output. Likewise, exhaust control signals are directed via exhaust control line 1047 to exhaust blower 1039 in order to increase or decrease its output. In accordance with the present invention, variable speed drives 1041, 1043 are under control of controller 1077.

Controller 1077 communicates with variable speed drive 1041 through stop/start line 1051 which stops/starts variable speed drive 1041, flow matching signal 1053 which communicates a control signal to variable speed drive 1041, actual speed line 1055 which provides an indication of the actual speed of supply blower 1037 to controller 1077, and OK switch 1049 which communicates through lines 1057, 1059 to controller 1077 which provides a signal to controller 1077 when variable speed drive 1041 is operating correctly.

Controller 1077 communicates with variable speed drive 1043 through stop/start line 1063 which provides a stop or start signal to variable speed drive 1043, actual speed line 1065 which provides an indication of the actual speed of exhaust blower 1039 to controller 1077, and master IBC signal 1067 which communicates through master speed reference 1071 (which is an operator-adjustable potentiometer) which provides operator input to controller 1077 regarding the operating conditions of the supply blower 1077 and exhaust blower 1039 during startup operations. Additionally, controller 1037 is provided with a status indication via lines 1073, 1079 and switch 1061 which provides an indication of the operating condition of variable speed drive 1043.

Controller 1077 communicates with control panel 1079 which provides data to the operator, and which allows for operator input and commands. Control panel 1079 includes inlet on/off switch 1083 and outlet on/out switch 1085 which allow the operator to stop and start the supply blower 1037 and exhaust blower 1039. Preferably, control panel 1079 also includes manual blower input means 1091 which allows for manual control of the blowers. Additionally, control panel 1079 includes a blower balance display 1087 and master speed display 1089. Preferably, and additionally, control panel 1079 includes decrease button 1090, and increase button 1092, which allow the operator to manually adjust either or both the supplier blower 1037 and exhaust blower 1039 during certain operations (but in the preferred embodiment, just the supply blower), as will be discussed in detail below.

The startup control apparatus 1030 of the present invention allows the operator to efficiently stabilize the extruded film tube by automatically coordinating the flow rate of the supply blower 1045 with the flow rate of the exhaust blower 1047. The startup control apparatus 1030 provides a special startup feature that minimizes the need to establish a separate setup of startup settings. Compensation for non-linear blower curves is managed by a combination of learned settings and an efficient means to verify the learned settings are still accurate. The startup control apparatus 1030 also includes a bubble break detector that allows the option of stopping the production line when a bubble break occurs. In accordance with the present invention, the startup control apparatus 1030 monitors the status of each of the supply blower 1045 and exhaust blower 1047 and uses such status to manage startup and shutdown.

Figure 37E:
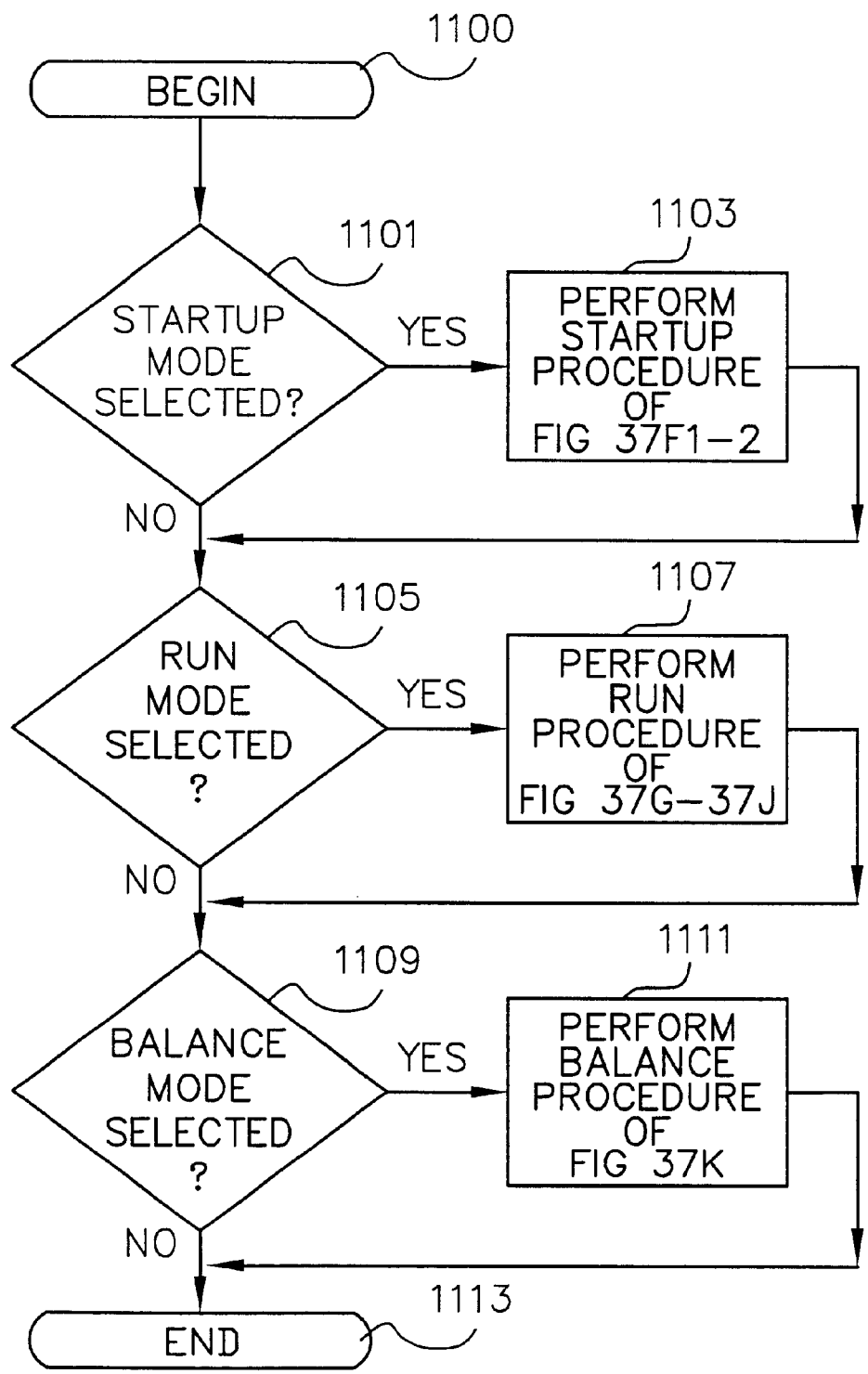
FIG. 37E is a flowchart representation of the control routine of the startup control apparatus of the present invention.

FIG. 37E is a flowchart representation of some of the routines utilized during startup procedures. The process begins at software block 1100 and continues at software block 1101, wherein controller 1077 determines whether a startup mode of operation has been selected; if so, control passes to software block 1103, wherein the startup procedure of FIG. 37F(1) through 37F(2) is performed. If it is determined in software 1101 that the startup mode has not been selected, control passes to software block 1105, wherein controller 1077 determines whether the run mode has been selected; if the run mode has been selected, control passes to software block 1107, where controller 1077 performs the run procedures of FIGS. 37G through 37J. If it is determined in software block 1105 that the run mode has not been selected, control passes to software block 1109, which determines whether the balance mode of operation has been selected. If the balance mode of operation has been selected, control passes to software block 1111, wherein controller 1077 performs the balance procedure of FIG. 37K. If it is determined in software block 1109 that the balance mode has not been selected, control passes to software block 1113, where the process ends.

Turning now to FIGS. 37F(1) and 37F(2), the startup mode will be explained with reference to the flowchart. The process begins at software block 1121 and continues at software block 1123, wherein the operator activates the inlet blower. Next, in accordance with software block 1125, controller 1077 fetches a start percent parameter which is recorded in memory. In accordance with the preferred embodiment of the present invention, the start percent parameter is a predetermined percentage of the value of the master speed control displayed on master speed display 1089 (of FIG. 37D). In accordance with software block 1127, controller 1077 sends control signals through variable speed drive 1041 to supply blower 1037 in order to ramp supply blower 1037 up to the start percent parameter. In accordance with the present invention, a predetermined ramping function 1128 is stored in memory of controller 1077 which provides a bumpless ramp function which is followed in the ramping up of supply blower 1037. In the preferred embodiment of the present invention, the ramp function is non-linear to improve the blower response and to reduce the chance of overshooting the start percent value. An example of the ramp function 1128 is depicted adjacent software block 1127.

Next, in accordance with software block 1129, controller 1077 deactivates an outlet blower stop circuit in order to allow exhaust blower 1039 to start up. Next, in accordance with software blocks 1131 and 1133, controller 1077 determines whether the operator has adjusted the master speed reference potentiometer 1071 (of FIG. 37D). If so, the inlet blower is adjusted in accordance with software block 1133. The process continues at software block 1135, wherein the operator determines that the extruded film tube (or "bubble") is through the roller nips (as is depicted in FIG. 1). Next, in accordance with software block 1137, the operator activates the exhaust blower 1039 by actuating outlet on/off switch 1085. Next, in accordance with software block 1139, controller 1077 ramps the exhaust blower 1039 (through a predetermined ramping function 1140, which is preferably linear) to the full-rated value of the master speed reference potentiometer 1071 (of FIG. 37D). Controller 1077 then monitors the speeds of the supply blower 1037 and the exhaust blower 1039 in order to determine if the speeds are substantially equal, as set forth in software block 1141. If the speeds are not equal, monitoring and comparing operations continue. If it is determined in software block 1141 that the speeds of the supply blower and the exhaust blower are equal, control passes to software block 1143, wherein the inlet blower is ramped (again, in accordance with a predetermined function 1144 which is preferably non-linear) to the full-rated value of the master speed reference potentiometer 1071 (of FIG. 37D) as displayed on master speed display 1089 (also of FIG. 37D). Next, in accordance with software block 1145, controller 1077 monitors the position of the extruded film tube. Next, and in accordance with software block 1147, controller 1077 determines whether the extruded film tube is within range of a predetermined sensor (preferably, the cage sensor). If the extruded film tube is not within range, control passes back to software block 1145; however, if the extruded film tube is within a predetermined range, control passes to software block 1149, wherein controller 1077 is utilized to adjust the supply blower 1037 to place the valve 1036 in the middle of its linear operating range.

In accordance with the present invention, valve 1036 may comprise either a rotary valve or the "bladder" valve discussed above. Each of these valves has a preferred and substantially linear operating range, but the valves are generally not linear over their entire operating range. Therefore, in accordance with the present invention, the linear operating range of a particular valve might be determined empirically in a laboratory, and controller 1077 will be programmed to maintain the valve in its relatively linear operating range. When a "bladder" valve is utilized, that linear range represents a closure condition in the range of 28% to 32%. Operation outside of that narrow range of closure conditions would be less than optimal. Since valve 1036 is utilized for fine control over the circumference of the extruded film tube, it is relatively important that the valve be operated over its optimal and linear range of operation. This will allow for better control of the extruded film tube during production operations which follow startup, and which have a significant impact on the product quality produced by the blown film line and the product quantity produced by the blown film line. Optimization of the valve will be discussed in greater detail below. The process then ends at software block 1151.

Figure 37G:
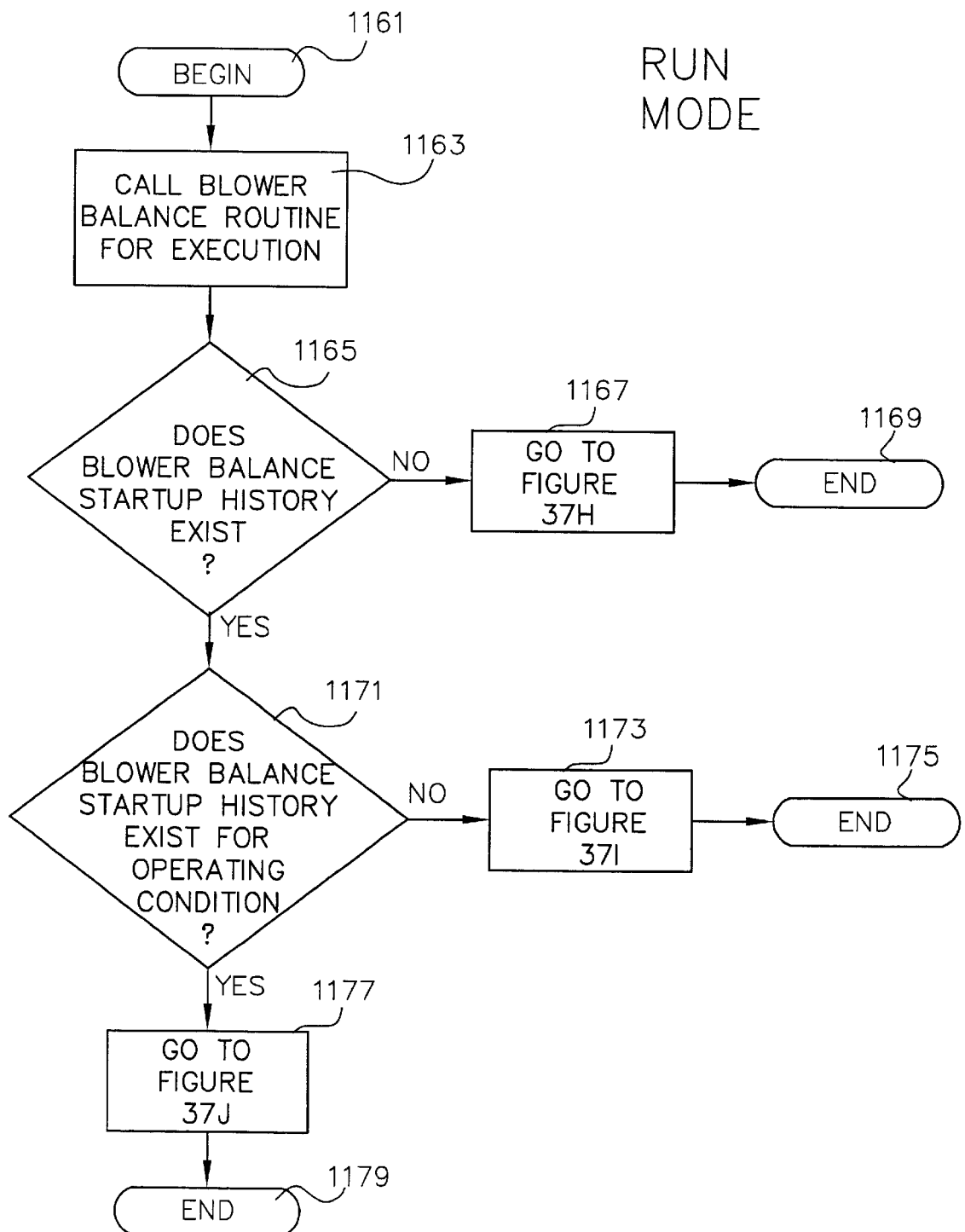

The run mode of operation is depicted in flowchart form commencing at FIG. 37G. The process commences in software block 1161, and continues at software block 1163, wherein controller 1077 calls the blower balance routine for execution. In broad overview, the controller 1077 works to balance the supply and exhaust blowers 1037, 1039 by first looking for a recorded value for the operating condition and associated supply blower setting from the last time the system was running. In accordance with the present invention, a plurality of values for prior production runs are stored in memory for use during the run mode of operation. An array of such recorded historical run settings is depicted in simplified form in FIG. 37L. As is shown, three columns are recorded, including the master speed potentiometer setting 1301, supply speed 1303, and reference volts 1305. For each master speed potentiometer setting available, there is possibly a corresponding recorded historical value of supply speed 1303 and its associated reference voltage 1305. Several dozen to several hundred historical values may be recorded. These values represent prior optimum settings of the supply blower 1037 for different operating conditions. Since these particular settings were used in prior production runs, it is presumed that they were satisfactory settings. In order to increase the efficiency and accuracy of startup procedures, controller 1077 will first look to historical and recorded values, if those values exist.

Returning now to FIG. 37G, the process continues to software block 1165, wherein controller 1077 determines whether a blower balance startup history exists. In other words, controller 1077 determines whether there are any prior historical and recorded values for the setting of supply blower 1037. If not, control passes to software block 1167, and the process ends at software block 1169. However, if it is determined that a history does exist, control passes to software block 1171, wherein controller 1077 examines the blower balancing startup history to determine whether there is a value which has been recorded for the current operating condition as set by the master speed potentiometer setting. If no particular historical value corresponds to the current settings, then control passes to software block 1173, and the process ends at software block 1175. However, if it is determined that a prior recorded historical value exists for the operating condition of the supply blower 1037, control passes to software block 1177, and the process ends at software block 1179.

Figure 37H:
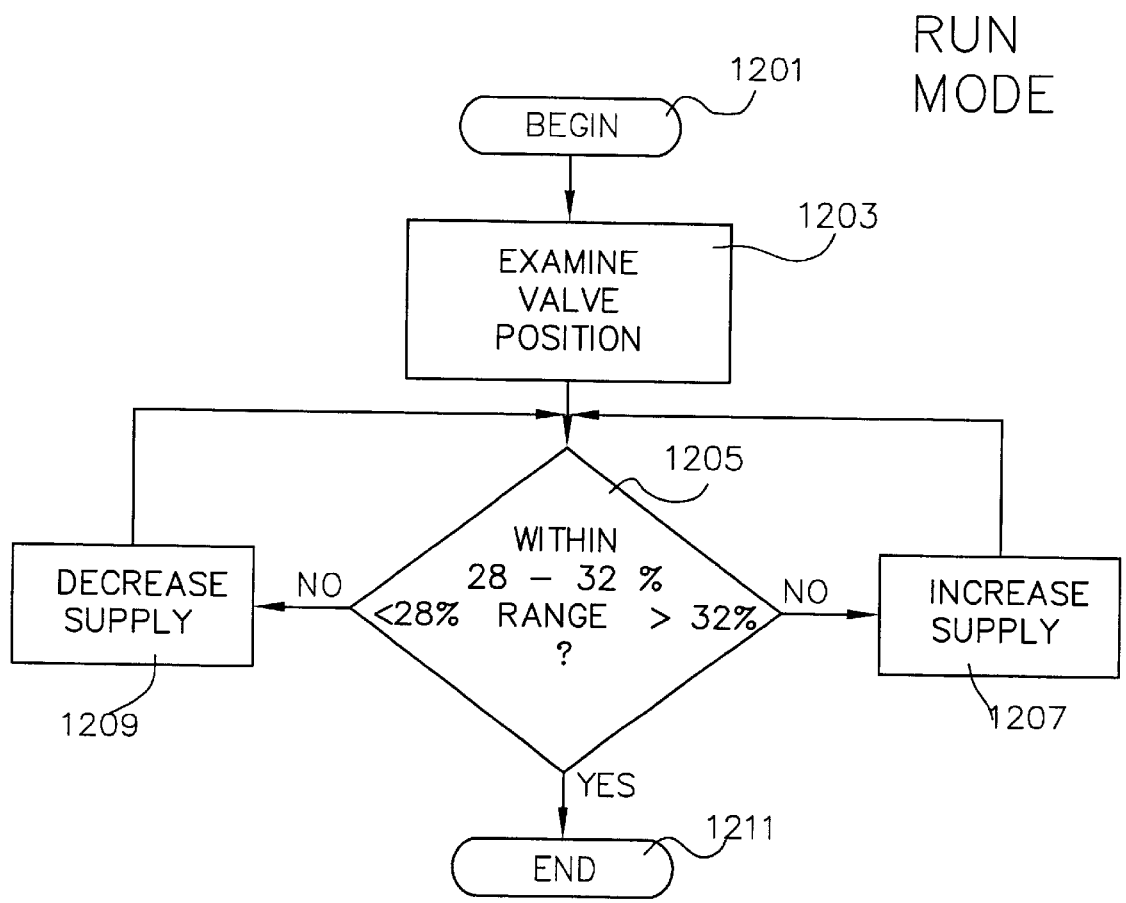
Figure 371:
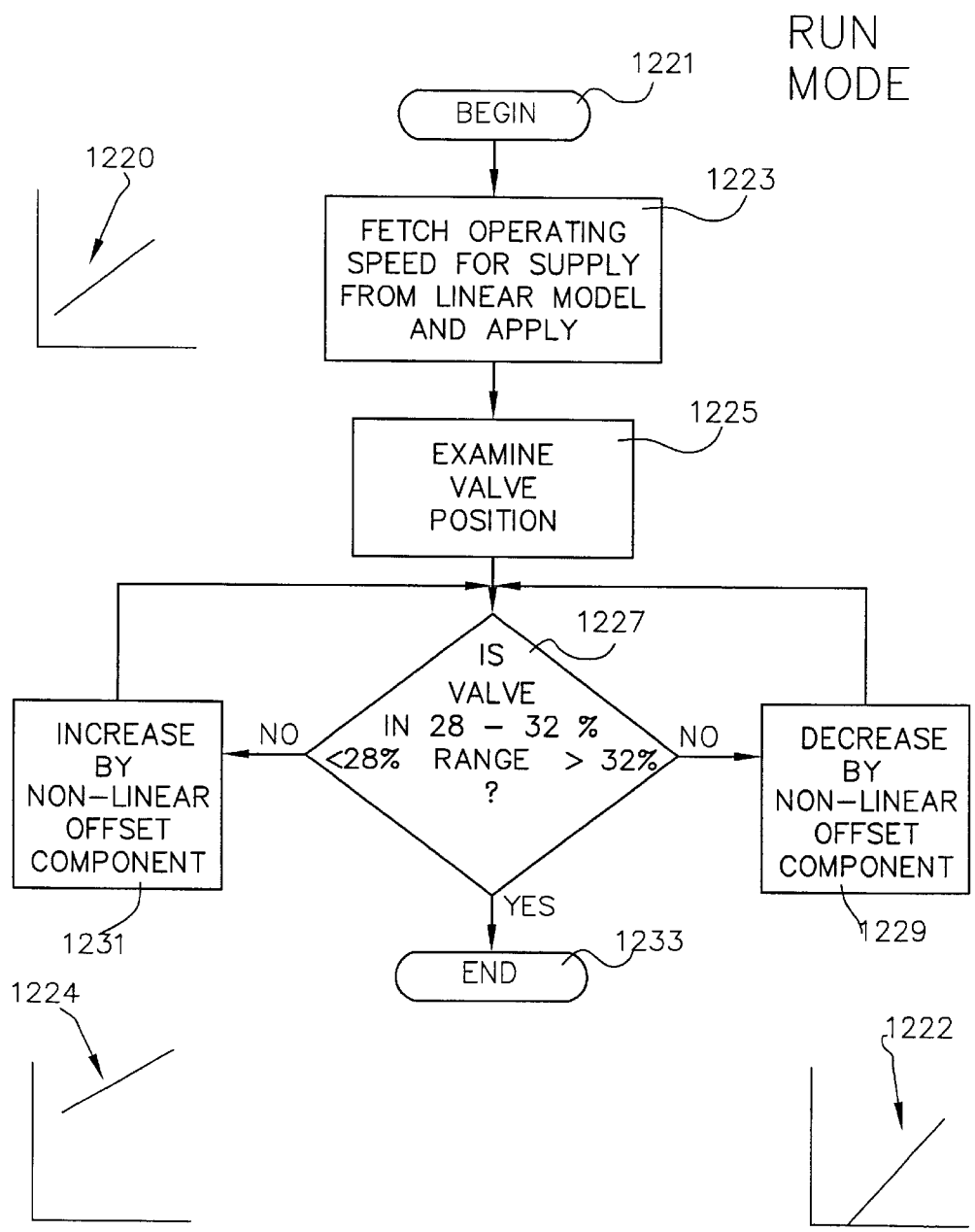

FIG. 37H is a flowchart representation of software block 1167 of FIG. 37G. This routine is executed if a blower balance startup history exists. The process being at software block 1201, and continues to software block 1203, wherein controller 1077 examines the position of valve 1034 (of FIG.

37D). Next, in accordance with software block 1205, controller 1077 determines whether valve 1034 is within its 28–32% state of closure. As discussed above, this range represents the optimum and linear operating range of a "bladder" valve which is described herein. If it is determined in software block 1205 by controller 1077 that valve 1034 is within its optimum range of operation, the process ends at software block 1211. However, if it is determined in software block 1205 that valve 1034 is not within its optimum and linear operating range, the particular percentage of closure is examined to determine whether it falls above or below the 28–32% range. If the closure state is greater than 30%, control passes to software block 1027, wherein the operating rate of supply blower 1037 is increased by a predetermined amount. Control will then pass back to software block 1205 in order to reexamine the operating condition of valve 1034. If it is determined at software block 1205 that valve 1034 is below 28% closure, control passes to software block 1209 wherein the rate of operation of supply blower 1037 is decreased by a predetermined amount. Control would then return to software block 1205 in order to allow for reexamination of the operating condition of valve 1034. This process will repeat until valve 1034 is placed within its optimum and substantially linear operating state.

FIG. 37I is a flowchart representation of software block 1173 of FIG. 37G. This routine corresponds to a situation wherein a blower balance startup history does exist, but no recorded and historical value exists which directly corresponds to the current setting established for the blown film extrusion line. The process begins at software block 1221, and continues at software block 1223, wherein controller 1077 fetches the operating speed for the supply blower 1037 from a linear model. Function 1220 is a graphical representation of such a linear model which maps values of the master speed potentiometer setting to supply speeds (or the reference voltages which correspond to the supply speeds). The model is a simple function (y=mx). The model value which corresponds to the current speed potentiometer setting is then applied to supply blower 1037. Next, in accordance with software block 1225, controller 1077 examines the position of valve 1034 to determine its current state. Then, control passes to software block 1227, wherein controller 1077 is utilized to determined whether valve 1034 is within its optimum and substantially linear operating range of 28% to 32% (for the "bladder" type valve discussed above). If the valve 1034 is operating within its optimum and substantially linear operating range, control passes to software block 1233, wherein the process ends. However, if it is determined in software block 1227 that valve 1034 is not within its preferred operating range, the closure state of the valve is examined to determine whether it falls above or below the preferred operating range. If the closure is greater than 32%, control passes to software block 1229 wherein the operating condition of supply blower 1037 is decreased by a non-linear offset component which is depicted by function 1222 (in the preferred embodiment, a predetermined constant is added to the previous function in order to generate a function of y=mx+b). If it is determined in software block 1229 that the valve is operating below the 28% closure condition, control passes to software block 1231, wherein the operation of supply blower 1037 is increased by a non-linear offset component (in this situation, and in the preferred embodiment of the present invention, a constant term is added to the previous function in order to utilize a function of y=mx−b). This process is repeated until the valve 1034 is placed in its optimum range of operation.

Figure 37J:
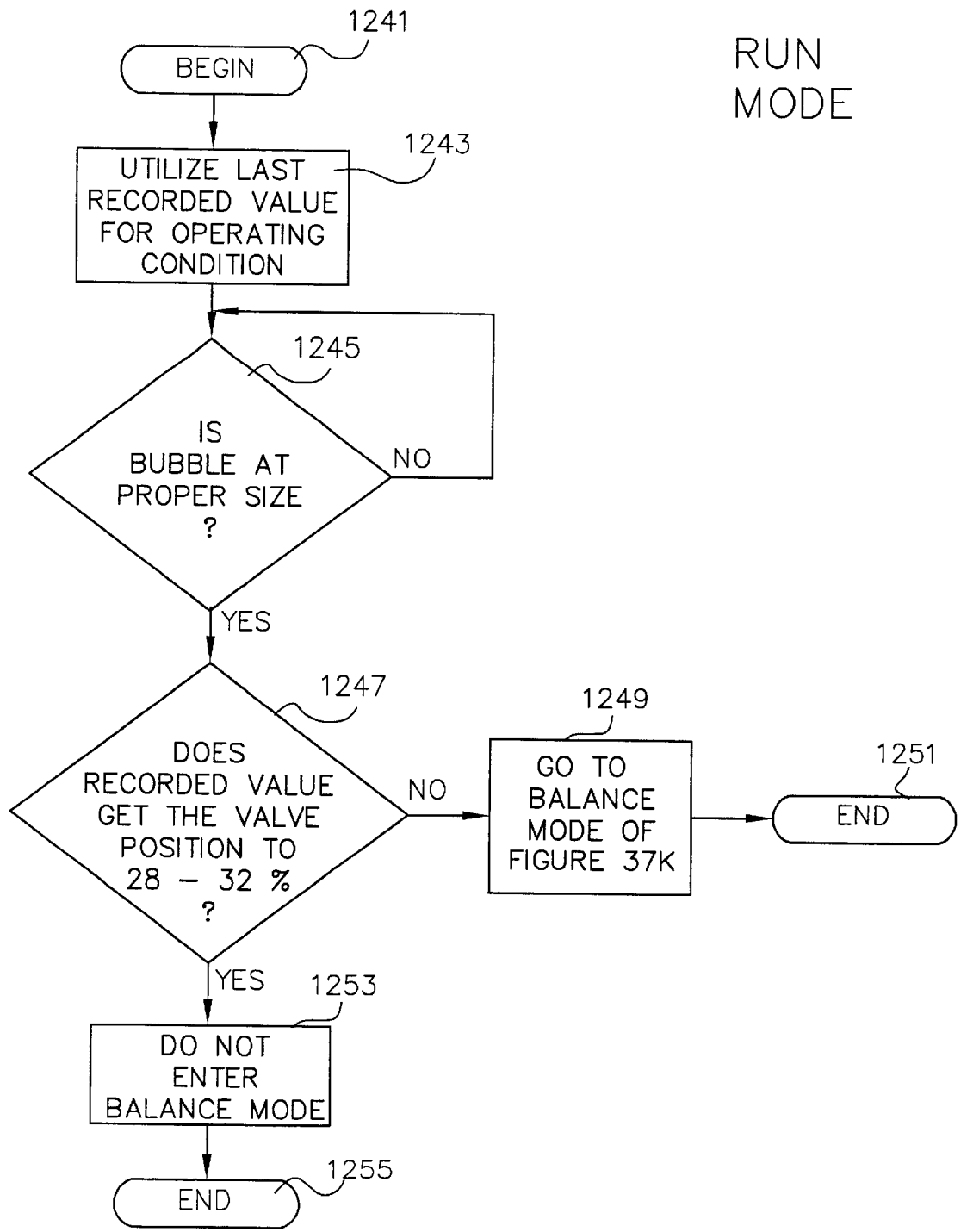

FIG. 37J is a flowchart representation of software block 1177 of FIG. 37G. In this situation, controller 1077 has determined that a blower balance startup history does exist, and that there is a value in the historical log which directly corresponds to the current master speed potentiometer setting. The process begins at software block 1241 and continues at software block 1243, wherein controller 1077 utilizes the last recorded value for the operating condition of supply blower 1037. Then, in accordance with software block 1245, the controller determines whether the extruded film tube (or "bubble") is at its proper size. Next, in accordance with software block 1247, controller 1077 determines whether the recorded value which is utilized for establishing the setting of supply blower 1037 places valve 1034 within its optimum range of operation (which, in the preferred embodiment for "bladder" type valves, is 28% to 32%). If it is determined in software 1247 that valve 1034 is not operating in its preferred range of positions, control passes to software block 1249, and the process ends at software block 1251. However, if it is determined in software block 1247 that the valve is indeed operating within its preferred range of positions, control passes to software block 1253, wherein the balance mode is not entered, and the process ends at software block 1255.

Figure 37K:
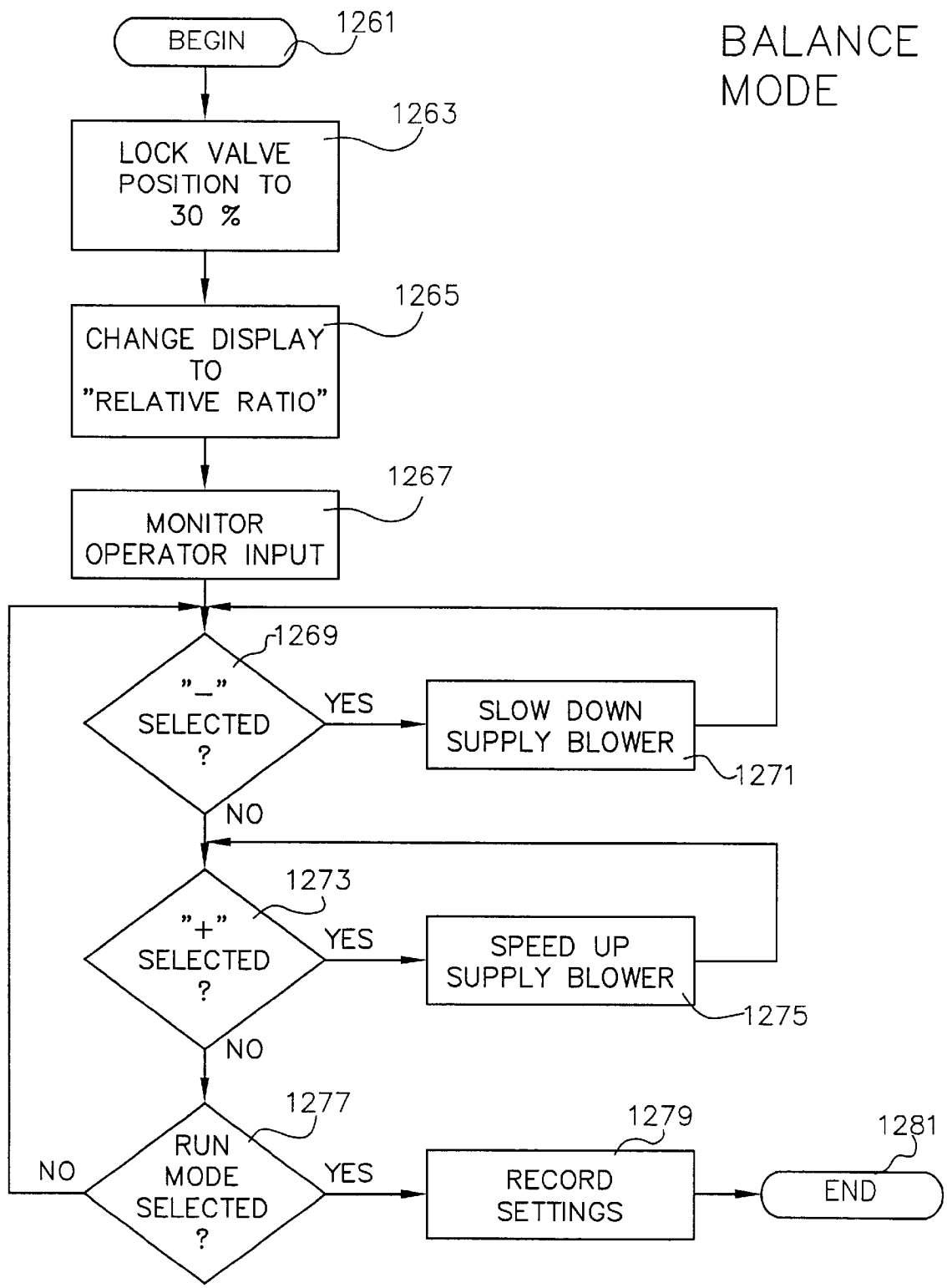
FIG. 37K is a flowchart representation of the balance mode of FIG. 37E.
Figure 37L:
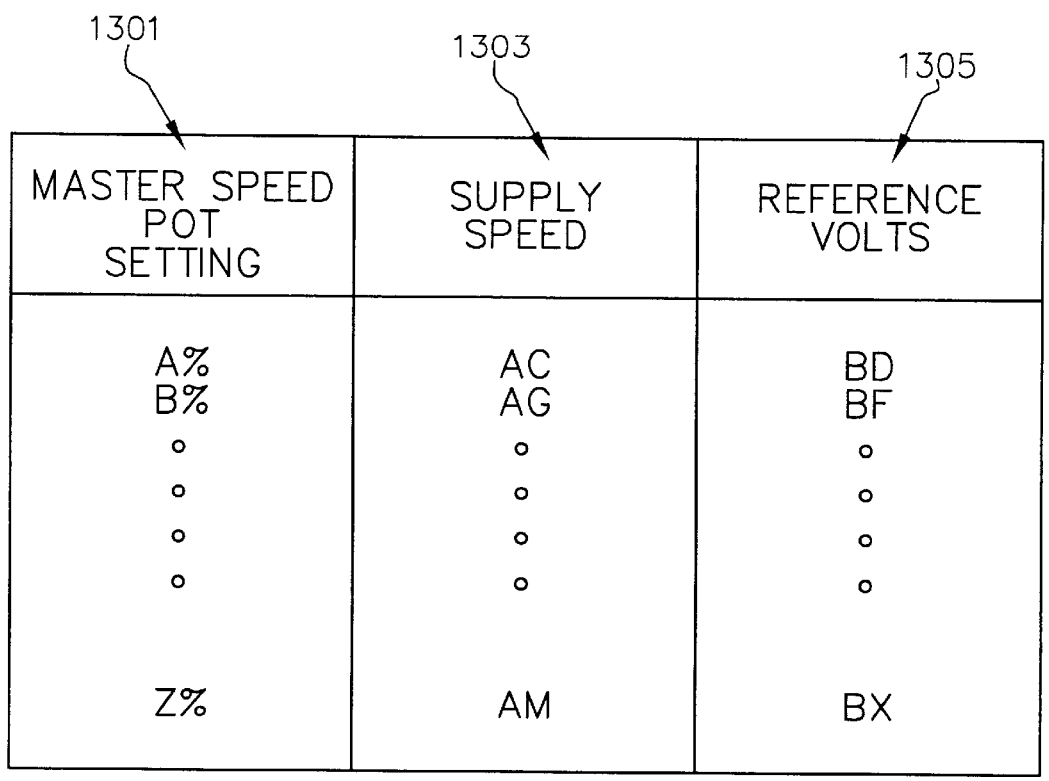
FIG. 37L is a pictorial representation of an array of recorded prior control settings for the supply and exhaust blowers.

FIG. 37K is a flowchart representation of software block 1249 of FIG. 37J, and describes the balance mode of operation in accordance with the preferred embodiment of the present invention. The balance mode of operation is entered if the historical recorded value for the setting of supply blower 1037 does not place the valve in its preferred range of operation. The purpose of the balance mode of operation is to allow the operator to obtain direct control over the operating condition of supply blower 1034. In the balance mode of operation, the position of valve 134 is locked to 30%. In control panel 1079, a ratio is displayed which represents the ratio of the running speeds of the supply blower 1037 and the exhaust blower 1039. An indication of 50% means that both blowers are running at the same speed. An indication greater than 50% means that the supply blower is running faster than the exhaust blower (which is the normal condition). An indication of less than 50% means that the supply blower is running slower than the exhaust blower. The operator can manually adjust the balance by using buttons 1097, 1092 (of FIG. 37D). Selecting the negative button will cause the supply blower to slow down.

With reference to FIG. 37K, the process commences at software block 1261 and continues at software block 1263, wherein controller 1077 locks the valve position to 30%. Next, in accordance with software block 1265, control panel 1079 is utilized to display the "relative ratio" number. Then, in accordance with software block 1067, controller 1077 monitors for operator input through depression of either the negative button 1090 or the positive button 1092. In software block 1269, controller 1077 monitors for selection of the negative button. If the negative button is selected, control passes to software block 1271, wherein the supply blower is slowed down. In accordance with software block 1273, controller 1077 monitors for selection of the positive button. If the positive button is selected, control passes to software block 1275, wherein the supply blower is speeded up. In accordance with software block 1277, controller 1077 monitors for selection of a production mode of operation by the operator. If the production mode is selected, in accordance with software block 1279, controller 1077 records the setting in memory (in the table of FIG. 37L) and the process ends at software block 1281.

Figure 37M:
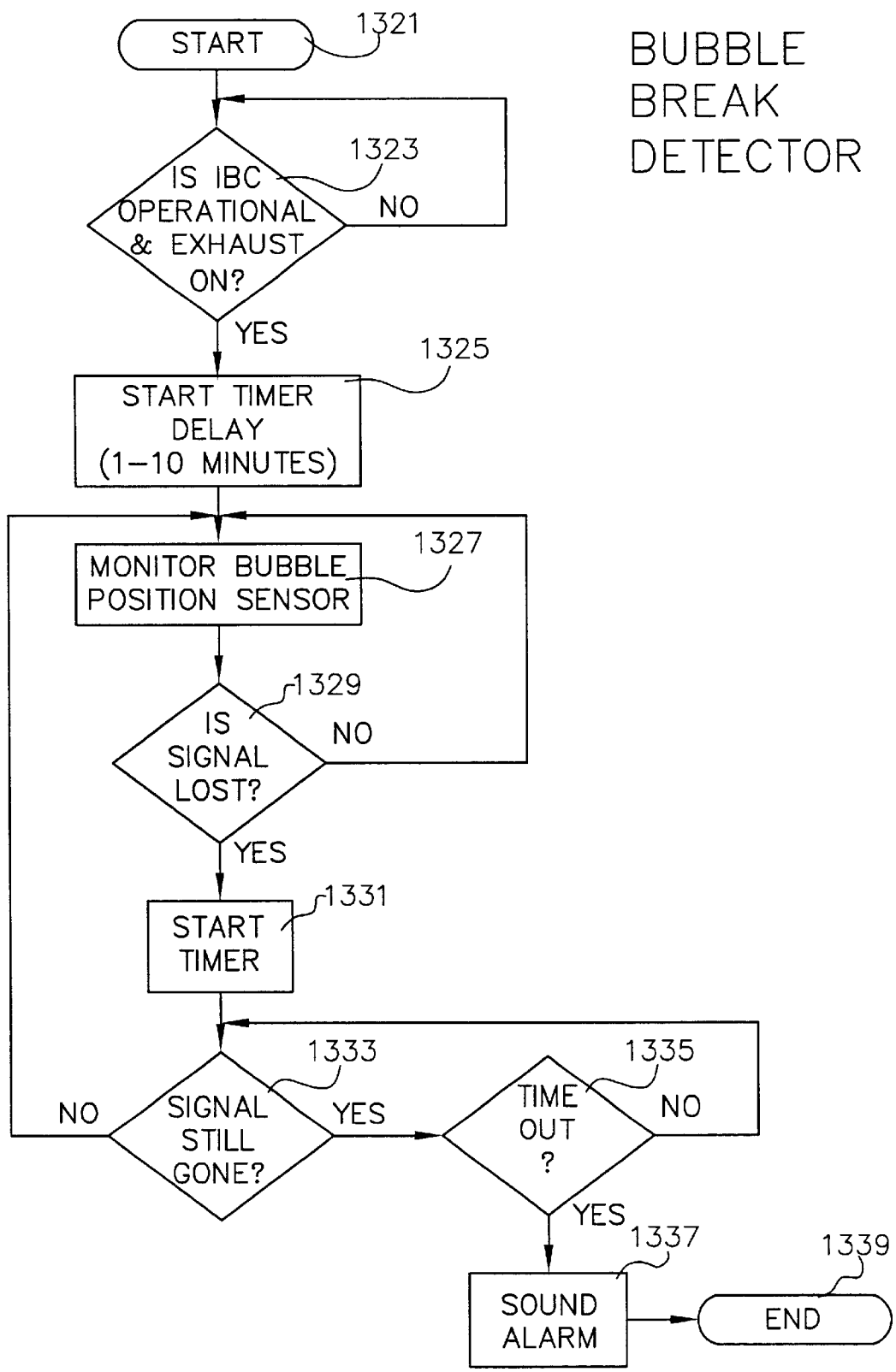
FIG. 37M is a flowchart representation of a bubble break detection routine.

FIG. 37M is a flowchart representation of a bubble break routine which is utilized after the initial steps of startup have been concluded in order to detect bubble break or collapse, sound an alarm, and optionally shut down the blown film line. The bubble break detection routine is suppressed during early phases of the startup in order to allow the operator to get the bubble started. The process commences at software block 1321, wherein the bubble break routine is called for execution. Next, in accordance with software block 1323, controller 1077 determines whether the blown film line is operational, and the exhaust blower is in an on condition. In this way, the bubble break routine is suppressed until the operator manually activates the exhaust blower. In accordance with software block 1325, controller 1077 starts a timer delay (which is operator-configurable in the range of 1–10 minutes) which allows an amount of time sufficient for the operator to get the blown film line started. In accordance with software block 1327, controller 1077 monitors the bubble position sensor in order to determine the location of the bubble. In accordance with software block 1329, the bubble position sensor is monitored to determine whether there is a loss of signal. If no signal loss occurs, control returns to software block 1327. However, if the position sensor signal is lost, control passes to software block 1331, wherein a software timer is initiated. Then, in accordance with software block 1333, controller 1077 determines whether the signal is still gone. If not, control passes to software block 1327. If so, control passes to software block 1339, wherein controller 1077 determines whether the second software timer has "timed out". If not, control returns to software block 1333; if so, control passes to software block 1337, where an alarm is sounded. Alternatively, and concurrently with the sounding of the alarm, the blown film line may be disabled. The routine ends at software block 1339. In accordance with the present invention, controller 1077 is utilized to continuously monitor the condition of the exhaust blower throughout the entire process. Any change in condition of the exhaust blower will automatically reset the bubble break detection routine to its initial condition. In this manner, the bubble break routine will only run after the operator has been provided with a sufficient time in which to get the extruded film tube within the nips, but only becomes operational if the exhaust blower has been activated. Once the position signal has been lost for a sufficiently long time interval, the bubble break detector will at least sound an alarm in order to warn of likely break or collapse of the bubble. Since the system automatically resets itself upon any change in condition of the exhaust blower, it will become initialized for the next startup.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. In a blown film extrusion apparatus in which film is extruded as a tube from an annular die and then pulled along a path, an apparatus for startup of said extruded film tube, comprising:
(a) means for varying a quantity of air within said extruded film tube, including:
(1) a supply blower which supplies air to said extruded film tube in an amount corresponding to a supply control signal, and
(2) an exhaust blower which exhausts air from said extruded film tube in an amount corresponding to an exhaust control signal; and
(b) a controller member including executable program instructions which define at least one control routine for automatic and coordinated control of said means for varying during starting of said extruded film tube by directing a series of supply control signals to said supply blower and exhaust control signals to said exhaust blower in order to independently and concurrently control said supply blower and said exhaust blower; and
(c) a valve member, under control of said controller, for varying admission of air into said extruded film tube for controlling the circumference of said extruded film tube;
(d) wherein at least one control routine includes a valve optimization routine during which:
(1) said controller member determines a current closure condition for said valve member;
(2) based upon said current closure condition of said valve, said controller sends at least one of (a) said supply control signals and (b) said exhaust control signals to at least one of (a) said supply blower and (b) said exhaust blower, in order to establish operating rates which allow said valve member to operate in a substantially linear portion of its range of closure conditions.

2. An apparatus according to claim 1, further comprising:
(e) a control interface for receiving operator instructions during startup of said extruded film tube; and
(f) wherein said controller member further includes program instructions for receiving said operator instructions and integrating said operator instructions into said at least one control routine.

3. An apparatus according to claim 1, wherein said at least one control routine further comprises at least one of the following routines:
(1) a startup routine wherein said controller member initiates operation of said supply blower and said exhaust blower by first initiating operation of said supply blower in accordance with at least one supply operating parameter, and then initiating said exhaust blower in accordance with at least one exhaust operating parameter; and
(2) a blower optimization routine wherein at least one of (1) said supply control signal, and (2) said exhaust control signal is determined at least in part from at least one prior recorded control signal.

4. An apparatus according to claim 3, wherein said startup routine includes executable program instructions for:
(1) initially increasing air supplied by said supply blower to said extruded film tube in accordance with a supply ramping function until said extruded film tube is substantially filled; and
(2) then increasing air exhausted by said exhaust blower from said extruded film tube in accordance with an exhaust ramping function.

5. An apparatus according to claim 4, wherein said startup routine further includes executable program instructions for:
(3) continued increasing operation of at least one of said supply blower and said exhaust blower in accordance with at least one function.

6. An apparatus according to claim 1, wherein said at least one control routine further comprises at least one of the following routines:

(1) a startup routine wherein said controller member initiates operation of said supply blower and said exhaust blower by first initiating operation of said supply blower in accordance with at least one supply operating parameter, and then initiating said exhaust blower in accordance with at least one exhaust operating parameter; and (2) a blower optimization routine wherein at least one of (1) said supply control signal, and (2) said exhaust control signal is determined at least in part from at least one prior recorded control signal.

7. An apparatus according to claim 1, further comprising:

(e) at least one transducer for producing a signal corresponding to a detected position of said extruded film tube;

(f) wherein said at least one control routine further includes:

(1) a bubble break detection routine wherein said signal generated by said at least one transducer is utilized in combination with at least one software timer in order to detect a break in said extruded film tube.

8. An apparatus for extruding a film tube, comprising:

(a) a die member;

(b) means for supplying molten film to said die member;

(c) a supply blower for supplying air to said extruded film tube in an amount corresponding to a supply control signal;

(d) an exhaust blower for exhausting air, from said extruded film tube in an amount corresponding to an exhaust control signal;

(e) a valve for controlling air flow from said supply blower to said extruded film tube in response to a valve control signal;

(f) a position sensor for providing a signal indicative of the size of said extruded film tube;

(g) a controller member including executable instructions which define at least one control routine;

(h) a control interface for receiving operator instructions; and (i) said at least one control routine including:

a valve optimization routine during which:

(1) said controller member determines a current closure condition for said valve member;

(2) based upon said current closure condition of said valve, said controller sends at least one of (a) said supply control signals and (b) said exhaust control signals to at least one of (a) said supply blower and (b) said exhaust blower, in order to establish operating rates which allow said valve member to operate in a substantially linear portion of its range of closure conditions.

9. An apparatus according to claim 8, wherein said at least one control routine includes:

(1) a startup routine wherein said controller member initiates operation of said supply blower and said exhaust blower by first initiating operation of said supply blower in accordance with at least one supply operating parameter, and then initiating operation of said exhaust blower in accordance with at least one exhaust operating parameter; and (2) a blower optimization routine wherein at least one of (a) said supply control signal, and (b) said exhaust control signal is determined at least in part from at least one prior recorded control signal.

10. An apparatus according to claim 9, wherein said startup routine includes executable program instructions for:

(a) initially increasing air supplied by said supply blower to said extruded film tube in accordance with a supply ramping function until said extruded film tube is substantially filled; and (b) then increasing air exhausted by said exhaust blower from said extruded film tube in accordance with an exhaust ramping function.

11. An apparatus according to claim 10, wherein said startup routine includes executable program instructions for:

(c) continued increasing operation of at least one of said supply blower and said exhaust blower in accordance with at least one function.

12. An apparatus according to claim 9, wherein said at least one control routine further includes:

(3) a bubble break detection routine wherein said signal generated by said position sensor is utilized in combination with at least one software timer in order to detect a break in said extruded film tube.

13. In a blown film extrusion apparatus in which film is extruded as a tube from an annular die and then pulled along a path, an apparatus for controlling said blown film extrusion apparatus, comprising:

(a) an air supply subsystem for varying a quantity of air within said extruded film tube, including:

(1) a supply blower which supplies air to said extruded film tube in an amount corresponding to a supply control signal, and (2) an exhaust blower which exhausts air from said extruded film tube in an amount corresponding to an exhaust control signal; and (3) a valve member for controlling air flow from the supply blower to the extruded film tube; and (b) a controller member including executable program instructions which define at least one control routine for automatic and coordinated control of said air supply subsystem by;

(1) examining the closure condition of said valve member;

(2) based upon the determined closure condition of said valve member, automatically directing at least one of a series of supply control signals to said supply blower and exhaust control signals to said exhaust blower in order to independently and concurrently control said supply blower and said exhaust blower, in order to maintain automatically said supply blower and said exhaust blower in operating ranges which allow said valve member to operate in a linear range of operation.

14. An apparatus according to claim 13, further comprising:

(c) a control interface for receiving operator instructions; and (d) wherein said controller member further includes program instructions for receiving said operator instructions and integrating said operator instructions into said at least one control routine.

15. An apparatus according to claim 13:

(c) wherein said at least one control routine comprises at least one of the following routines:

(1) a startup routine wherein said controller member initiates operation of said supply blower and said exhaust blower by first initiating operation of said supply blower in accordance with at least one supply operating parameter, and then initiating said exhaust blower in accordance with at least one exhaust operating parameter; and (2) a blower optimization routine wherein at least one of (1) said supply control signal, and (2) said exhaust control signal is determined at least in part from at least one prior recorded control signal.

16. An apparatus according to claim 15:
(d) wherein said startup routine includes executable program instructions for:
  (1) initially increasing air supplied by said supply blower to said extruded film tube in accordance with a supply ramping function until said extruded film tube is substantially filled; and
  (2) then increasing air exhausted by said exhaust blower from said extruded film tube in accordance with a predetermined exhaust ramping function.

17. An apparatus according to claim 16:
(e) wherein said startup routine further includes executable program instructions for:
  (3) continued increasing operation of at least one of said supply blower and said exhaust blower in accordance with at least one function.

18. An apparatus according to claim 13, wherein said valve member comprises:
a valve member, under control of said controller member, for varying admission of air into said extruded film tube and for controlling the circumference of said extruded film tube.

19. An apparatus according to claim 18:
(c) wherein said at least one control routine comprises at least one of the following routines:
  (1) a startup routine wherein said controller member initiates operation of said supply blower and said exhaust blower by first initiating operation of said supply blower in accordance with at least one supply operating parameter, and then initiating said exhaust blower in accordance with at least one exhaust operating parameter; and
  (2) a blower optimization routine wherein at least one of (1) said supply control signal, and (2) said exhaust control signal is determined at least in part from at least one prior recorded control signal.

20. An apparatus according to claim 13, further comprising:
(c) at least one transducer for producing a signal corresponding to a detected position of said extruded film tube;
(d) wherein said at least one control routine includes:
  (1) a bubble break detection routine wherein said signal generated by said at least one transducer is utilized in combination with at least one software timer in order to detect a break in said extruded film tube.

21. An apparatus for extruding a film tube, comprising:
(a) a die member;
(b) means for supplying molten film to said die member;
(c) a supply blower for supplying air to said extruded film tube in an amount corresponding to a supply control signal;
(d) an exhaust blower for exhausting air from said extruded film tube in an amount corresponding to an exhaust control signal;
(e) a valve for controlling air flow from said supply blower to said extruded film tube in response to a valve control signal;
(f) a position sensor for providing a signal indicative of the size of said extruded film tube;
(g) a controller member including executable instructions which define at least one control routine;
(h) a control interface for receiving operator instructions; and
(i) said at least one control routine including:
  (1) a blower control routine for automatic and coordinated control of said supply blower and said exhaust blower during startup of said extruded film tube in order to independently and concurrently control said supply blower and said exhaust blower; and
  (2) a valve optimization routine during which: (a) said controller member determines a current closure condition for said valve; and (b) based upon said current closure condition of said valve, said controller automatically establishes an operating rate for at least one of said supply blower and said exhaust blower in order to allow said valve to operate in a substantially linear portion of a range of closure conditions.

22. An apparatus according to claim 21:
(j) wherein said at least one control routine includes:
  (1) a startup routine wherein said controller member initiates operation of said supply blower and said exhaust blower by first initiating operation of said supply blower in accordance with at least one supply operating parameter, and then initiating operation of said exhaust blower in accordance with at least one exhaust operating parameter; and
  (2) a blower optimization routine wherein at least one of (a) said supply control signal, and (b) said exhaust control signal is determined at least in part from at least one prior recorded control signal.

23. An apparatus according to claim 22:
(k) wherein said blower control routine includes executable program instructions for:
  (1) initially increasing air supplied by said supply blower to said extruded film tube in accordance with a supply ramping function until said extruded film tube is substantially closed; and
  (2) then increasing air exhausted by said exhaust blower from said extruded film tube in accordance with an exhaust ramping function.

24. An apparatus according to claim 23:
(l) wherein said blower control routine includes executable program instructions for:
  (3) continued increasing operation of at least one of said supply blower and said exhaust blower in accordance with at least one function.

25. An apparatus according to claim 22:
(k) wherein said at least one control routine further includes:
  (3) a bubble break detection routine wherein said signal generated by said position sensor is utilized in combination with at least one software timer in order to detect a break in said extruded film tube.

26. An apparatus for extruding a film tube, comprising:
(a) a die member;
(b) means for supplying molten film to said die member;
(c) a supply blower for supplying air to said extruded film tube in an amount corresponding to a supply control signal;
(d) an exhaust blower for exhausting air from said extruded film tube in an amount corresponding to an exhaust control signal;
(e) a valve for controlling air flow from said supply blower to said extruded film tube in response to a valve control signal;
(f) a position sensor for providing a signal indicative of the size of said extruded film tube;

(g) a controller member including executable instructions which define at least one control routine;
(h) a control interface for receiving operator instructions; and
(i) an inlet variable speed drive for receiving control signals from said controller member and for determining an operating speed for said supply blower;
(j) an outlet variable speed drive for receiving control signals from said controller member and for determining an operating speed for said exhaust blower;
(k) wherein at least one control routine comprises a valve optimization routine which automatically establishes an operating speed for at least one of said supply blower and said exhaust blower in order to allow said valve member to operate in a substantially linear range of closure conditions.

27. An apparatus according to claim 26, wherein said at least one control routine includes:
(1) a startup routine wherein said controller member initiates operation of said supply blower and said exhaust blower by first initiating operation of said supply blower in accordance with at least one supply operating parameter, and then initiating operation of said exhaust blower in accordance with at least one exhaust operating parameter; and
(2) a blower optimization routine wherein at least one of (a) said supply control signal, and (b) said exhaust control signal is determined at least in part from at least one prior recorded control signal.

28. An apparatus according to claim 27, wherein said startup routine includes executable program instructions for:
(a) initially increasing air supplied by said supply blower to said extruded film tube in accordance with a supply ramping function until said extruded film tube is substantially closed; and
(b) then increasing air exhausted by said exhaust blower from said extruded film tube in accordance with an exhaust ramping function.

29. An apparatus according to claim 28, wherein said startup routine includes executable program instructions for:
(c) continued increasing operation of at least one of said supply blower and said exhaust blower in accordance with at least one function.

30. An apparatus according to claim 27, wherein said at least one control routine further includes:
(3) a bubble break detection routine wherein said signal generated by said position sensor is utilized in combination with at least one software timer in order to detect a break in said extruded film tube.

31. In a blown film extrusion apparatus in which film is extruded as a tube from an annular die and then pulled along a path, an apparatus for controlling said blown film extrusion apparatus, comprising:
(a) an air supply subsystem for varying a quantity of air within said extruded film tube, including:
(1) a supply blower which supplies air to said extruded film tube in an amount corresponding to a supply control signal, and
(2) an exhaust blower which exhausts air from said extruded film tube in an amount corresponding to an exhaust control signal; and
(3) a valve member for controlling air flow from the supply blower to the extruded film tube;
(4) an inlet variable speed drive for receiving control signals and for determining an operating speed for said supply blower;
(5) an outlet variable speed drive for receiving control signals and for determining an operating speed for said supply blower;
(b) a controller member including executable program instructions which define at least one control routine for automatic and coordinated control of said air supply subsystem by directing a series of supply control signals to said inlet variable speed drive for said supply blower and said outlet variable speed drive for said exhaust control signals to said exhaust blower in order to independently and concurrently control said supply blower and said exhaust blower in order to maintain automatically said supply blower and said exhaust blower in operating ranges which allow said valve member to operate in a linear range of operation.

32. An apparatus according to claim 31, further comprising:
(c) a control interface for receiving operator instructions; and
(d) wherein said controller member further includes program instructions for receiving said operator instructions and integrating said operator instructions into said at least one control routine.

33. An apparatus according to claim 31:
(c) wherein said at least one control routine comprises at least one of the following routines:
(1) a startup routine wherein said controller member initiates operation of said supply blower and said exhaust blower by first initiating operation of said supply blower in accordance with at least one supply operating parameter, and then initiating said exhaust blower in accordance with at least one exhaust operating parameter; and
(2) a blower optimization routine wherein at least one of (1) said supply control signal, and (2) said exhaust control signal is determined at least in part from at least one prior recorded control signal.

34. An apparatus according to claim 33:
(d) wherein said startup routine includes executable program instructions for:
(1) initially increasing air supplied by said supply blower to said extruded film tube in accordance with a supply ramping function until said extruded film tube is substantially filled; and
(2) then increasing air exhausted by said exhaust blower from said extruded film tube in accordance with a predetermined exhaust ramping function.

35. An apparatus according to claim 34:
(e) wherein said startup routine further includes executable program instructions for:
(3) continued increasing operation of at least one of said supply blower and said exhaust blower in accordance with at least one function.

36. An apparatus according to claim 31, wherein said valve member comprises:
a valve member, under control of said controller member, for varying admission of air into said extruded film tube and for controlling the circumference of said extruded film tube.

37. An apparatus according to claim 36:
(c) wherein said at least one control routine further comprises at least one of the following routines:
(1) a startup routine wherein said controller member initiates operation of said supply blower and said exhaust blower by first initiating operation of said supply blower in accordance with at least one supply operating parameter, and then initiating said exhaust blower in accordance with at least one exhaust operating parameter; and (2) a blower optimization routine wherein at least one of (1) said supply control signal, and (2) said exhaust control signal is determined at least in part from at least one prior recorded control signal.

38. An apparatus according to claim 37, further comprising:

(c) at least one transducer for producing a signal corresponding to a detected position of said extruded film tube;

(d) wherein said at least one control routine includes:

(1) a bubble break detection routine wherein said signal generated by said at least one transducer is utilized in combination with at least one software timer in order to detect a break in said extruded film tube.

39. An apparatus for extruding a film tube, comprising:

(a) a die member;

(b) means for supplying molten film to said die member;

(c) a supply blower for supplying air to said extruded film tube in an amount corresponding to a supply control signal;

(d) an exhaust blower for exhausting air from said extruded film tube in an amount corresponding to an exhaust control signal;

(e) a valve for controlling air flow from said supply blower to said die member in response to a valve control signal;

(f) a position sensor for providing a signal indicative of the size of said extruded film tube;

(g) a controller member including executable instructions which define at least one control routine;

(h) said at least one control routine including:

a valve optimization routine during which, based upon current closure condition of said valve, said controller sends at least one of (a) said supply control signals and (b) said exhaust control signals to at least one of (a) said supply blower and (b) said exhaust blower, in order to establish operating rates which allow said valve member to operate in a substantially linear portion of its range of closure conditions.

40. An apparatus according to claim 39, wherein said at least one control routine includes:

(1) a startup routine wherein said controller member initiates operation of said supply blower and said exhaust blower by first initiating operation of said supply blower in accordance with at least one supply operating parameter, and then initiating operation of said exhaust blower in accordance with at least one exhaust operating parameter; and (2) a blower optimization routine wherein at least one of (a) said supply control signal, and (b) said exhaust control signal is determined at least in part from at least one prior recorded control signal.

41. An apparatus according to claim 40, wherein said startup routine includes executable program instructions for:

(a) initially increasing air supplied by said supply blower to said extruded film tube in accordance with a supply ramping function until said extruded film tube is substantially closed; and (b) then increasing air exhausted by said exhaust blower from said extruded film tube in accordance with an exhaust ramping function.

42. An apparatus according to claim 41, wherein said startup routine includes executable program instructions for:

(c) continued increasing operation of at least one of said supply blower and said exhaust blower in accordance with at least one function.

43. An apparatus according to claim 40, wherein said at least one control routine further includes:

(3) a bubble break detection routine wherein said signal generated by said position sensor is utilized in combination with at least one software timer in order to detect a break in said extruded film tube.

* * * * *